(12) United States Patent
Yamada

(10) Patent No.: US 9,142,156 B2
(45) Date of Patent: Sep. 22, 2015

(54) CONTROL DEVICE, DISPLAY DEVICE, ELECTRONIC APPARATUS AND CONTROL METHOD

(75) Inventor: Yusuke Yamada, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 408 days.

(21) Appl. No.: 13/541,276

(22) Filed: Jul. 3, 2012

(65) Prior Publication Data
US 2013/0010005 A1 Jan. 10, 2013

(30) Foreign Application Priority Data

Jul. 4, 2011 (JP) ................................ 2011-148559

(51) Int. Cl.
G09G 3/20 (2006.01)
G09B 5/06 (2006.01)
G09G 3/34 (2006.01)

(52) U.S. Cl.
CPC .............. G09G 3/2051 (2013.01); G09B 5/062 (2013.01); G09G 3/344 (2013.01); *G09G 2300/08* (2013.01)

(58) Field of Classification Search
CPC . G09G 3/2048; G09G 3/2059; G09G 3/2044; G09G 3/2051; G09G 3/344
USPC .................................................. 345/690, 107
See application file for complete search history.

(56) References Cited

U.S. PATENT DOCUMENTS

| 2008/0117198 | A1* | 5/2008 | Furihata et al. | ................ | 345/212 |
| 2009/0021462 | A1* | 1/2009 | Furihata et al. | ................ | 345/89 |
| 2011/0221794 | A1* | 9/2011 | Kim et al. | ..................... | 345/690 |
| 2011/0249041 | A1* | 10/2011 | Otsuki et al. | .................. | 345/690 |
| 2012/0274628 | A1* | 11/2012 | Lim et al. | ...................... | 345/419 |

FOREIGN PATENT DOCUMENTS

JP 2007-206267 A 8/2007

* cited by examiner

*Primary Examiner* — Amare Mengistu
*Assistant Examiner* — Sarvesh J Nadkarni
(74) *Attorney, Agent, or Firm* — Maschoff Brennan

(57) ABSTRACT

A control device includes: a first storage device storing a dither matrix of two-dimensionally arranged dither values; a second storage device storing data of a-gradation levels; a first correction device that performs a first correction processing of calculating a first correction value for correcting gradation blurring-out from the target pixel to an adjacent pixel; a second correction device that performs a second correction processing of calculating a second correction value for correcting gradation blurring-in from the adjacent pixel to the target pixel; and a gradation value deciding device that decides a gradation value of the target pixel expressed in the b-gradation levels by using a value obtained by adding a corresponding one of the dither values stored in the first storage device, a corresponding one of the gradation values stored in the second storage device and at least one of the first correction value and the second correction value.

3 Claims, 68 Drawing Sheets

FIG. 6A

Data (16 gradation levels)

| 8 | 8 | 8 | 8 |
|---|---|---|---|
| 8 | 8 | 8 | 8 |
| 8 | 8 | 8 | 8 |
| 8 | 8 | 8 | 8 |

FIG. 6B

Dither

| 1 | 8 | 3 | 10 |
|---|---|---|----|
| 14 | 5 | 12 | 7 |
| 4 | 11 | 2 | 9 |
| 13 | 8 | 15 | 6 |

FIG. 6C

Data + Dither

| 9 | 16 | 11 | 18 |
|---|----|----|----|
| 22 | 13 | 20 | 15 |
| 12 | 19 | 10 | 17 |
| 21 | 16 | 23 | 14 |

FIG. 6D

Data (two gradation levels)

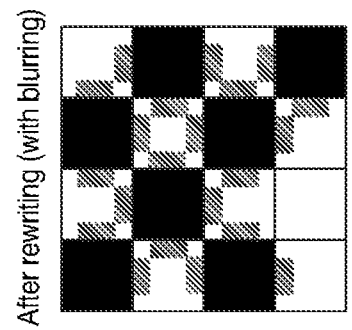
FIG. 7B
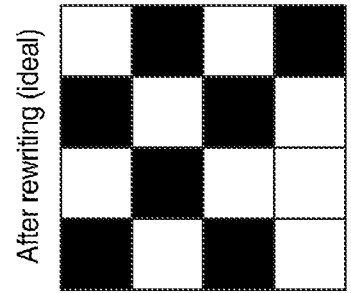
FIG. 7D
FIG. 7A
FIG. 7C

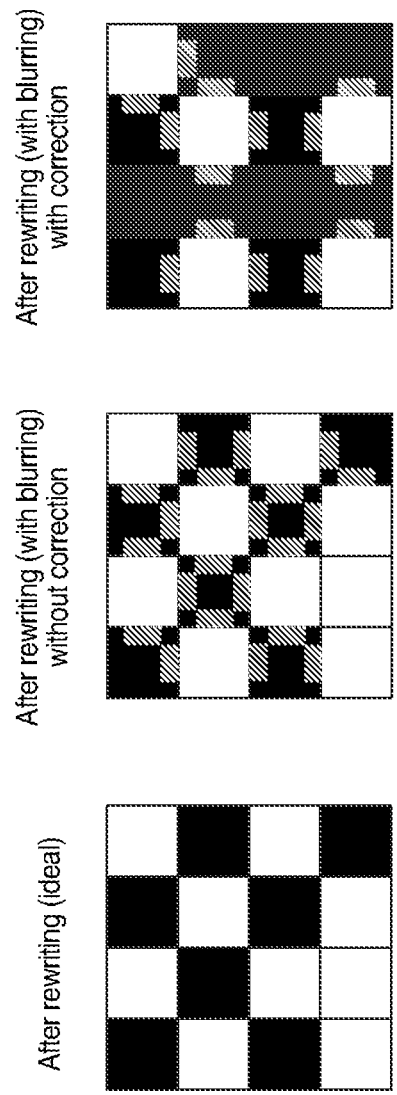

State before rewriting

FIG. 44A

Data

| 13 | 13 | 13 | 13 |
| 13 | 13 | 13 | 13 |
| 13 | 13 | 13 | 13 |
| 13 | 13 | 13 | 13 |

FIG. 44B

Upward blurring-out U(j,i)

| 0 | 0 | 0 | 0 |
| 0 | 0 | 0 | 0 |
| 2 | 0 | 2 | 0 |
| 0 | 0 | 0 | 0 |

FIG. 44C

Downward blurring-out D(j,i)

| 2 | 0 | 2 | 0 |
| 0 | 0 | 0 | 0 |
| 2 | 0 | 2 | 0 |
| 0 | 0 | 0 | 0 |

FIG. 44D

Leftward Blurring-out L(j,i)

| 0 | 0 | 2 | 0 |
| 0 | 0 | 0 | 0 |
| 0 | 0 | 2 | 0 |
| 0 | 0 | 0 | 0 |

FIG. 44E

Rightward blurring-out R(j,i)

| 2 | 0 | 2 | 0 |
| 0 | 0 | 0 | 0 |
| 2 | 0 | 2 | 0 |
| 0 | 0 | 0 | 0 |

FIG. 44F

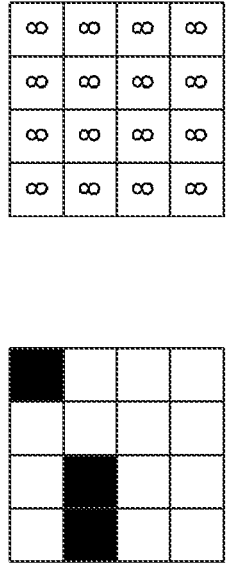

FIG. 64A State before rewriting

| ■ |   |   |   |
|---|---|---|---|
|   |   |   |   |
|   | ■ |   |   |
|   | ■ |   |   |

FIG. 64B Data

| 8 | 8 | 8 | 8 |
|---|---|---|---|
| 8 | 8 | 8 | 8 |
| 8 | 8 | 8 | 8 |
| 8 | 8 | 8 | 8 |

FIG. 64C Dither

| 1  | 8  | 3  | 10 |
|----|----|----|----|
| 14 | 5  | 12 | 7  |
| 4  | 11 | 2  | 9  |
| 13 | 8  | 15 | 6  |

FIG. 64D Binary data after process

| 16 |    |   |   |
|----|----|---|---|
| ■  | 18 |   |   |
| ■  | 20 |   |   |
|    |    |   |   |

FIG. 64E Upward blurring-out U(j, i)

| 0 | 0 | 0 | 0 |
|---|---|---|---|
| 0 | 2 | 0 | 0 |
| 0 | -2| 0 | 0 |
| 0 | 0 | 0 | 0 |

FIG. 64F Downward blurring-out D(j, i)

| 0 | 0 | 0 | 0 |
|---|---|---|---|
| 0 | 2 | 0 | 0 |
| 0 | 2 | 0 | 0 |
| 0 | 0 | 0 | 0 |

FIG. 64G Leftward Blurring-out L(j, i)

| 0 | -2| 0 | 0 |
|---|---|---|---|
| 0 | 2 | 0 | 0 |
| 0 | 0 | 0 | 0 |
| 0 | 0 | 0 | 0 |

FIG. 64H Rightward blurring-out R(j, i)

| 2 | 0 | 0 | 0 |
|---|---|---|---|
| -2| 2 | 0 | 0 |
| 0 | 0 | 0 | 0 |
| 0 | 0 | 0 | 0 |

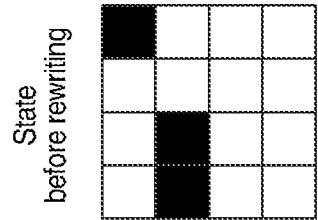

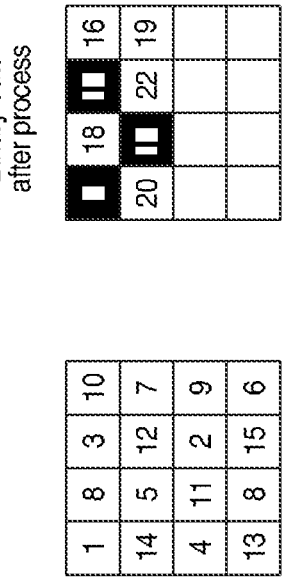
FIG. 66A
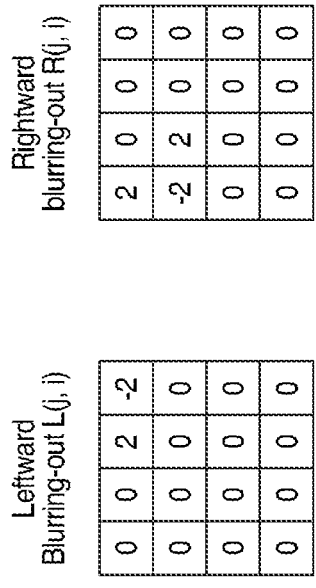
FIG. 66B
FIG. 66C
FIG. 66D
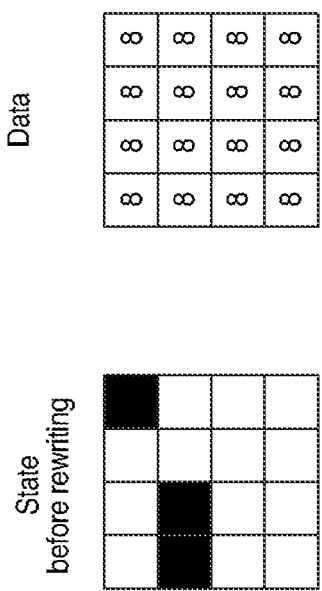
FIG. 66E
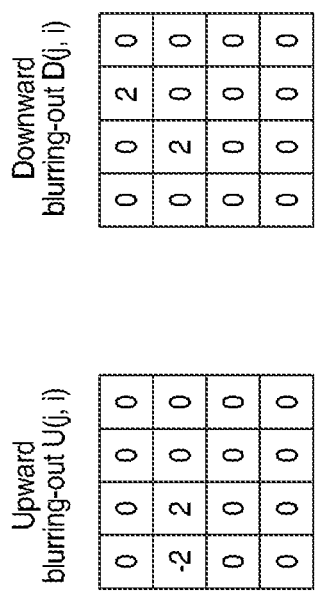
FIG. 66F
FIG. 66G
FIG. 66H

CONTROL DEVICE, DISPLAY DEVICE, ELECTRONIC APPARATUS AND CONTROL METHOD

BACKGROUND

1. Technical Field

The present invention relates to technologies for controlling a display device that uses data of a-gradation levels to display an image with b-gradation levels.

2. Related Art

Display devices using display elements such as electrophoretic elements are known. It has been known that, when a pixel is rewritten from one gradation level (for example, white) to another gradation level (for example, black), gradation blurring-out occurs at pixels adjacent to the pixel rewritten. Japanese Laid-open Patent Application 2007-206267 describes a partial rewriting operation for alleviating afterimages upon erasure that occur at the time of image switching.

However, even when the partial rewriting operation is performed, gradation blurring-out may occur at pixels adjacent to rewritten pixels. The gradation blurring-out of this kind affects gradations to be actually displayed at a display device when halftones are to be displayed by a color reduction process using a dither matrix.

SUMMARY

In accordance with some aspects of the invention, there is provided a technology for reducing the influence of gradation blurring-out at pixels adjacent to rewritten pixels which occurs when halftones are to be expressed by a color reduction process using a dither matrix.

In accordance with an embodiment of the invention, a control device includes a first storage device that stores a dither matrix of two-dimensionally arranged dither values to be used for a color reduction process for converting data of a-gradation levels to data of b-gradation levels (a>b); a second storage device that stores data of the a-gradation levels indicative of gradation values expressed in the a-gradation levels for each of a plurality of two-dimensionally arranged pixels; a first correction device that performs a first correction processing of calculating a first correction value for correcting gradation blurring-out from a target pixel that is a pixel specified in a predetermined order among the plurality of pixels to an adjacent pixel; a second correction device that performs a second correction processing of calculating a second correction value for correcting gradation blurring-in from the adjacent pixel to the target pixel; a gradation value deciding device that decides a gradation value of the target pixel expressed in the b-gradation levels by using a value obtained by adding a corresponding one of the dither values stored in the first storage device, a corresponding one of the gradation values stored in the second storage device and at least one of the first correction value and the second correction value; and an output device that outputs, based on the gradation value decided by the gradation value deciding device, a signal for controlling a gradation value of a corresponding one of display elements corresponding to the plurality of pixels of a display device. According to the control device, the influence of gradation blurring-out at pixels adjacent to a rewritten pixel.

In accordance with an aspect of the embodiment, the first correction device may perform the first correction for the target pixel when a summed value of the gradation value stored in the second storage device and the dither value stored in the first storage device indicates that a gradation value of the target pixel expressed in the b-gradation levels is to be changed. According to the control device of the preferred embodiment, when the correction processing is performed after it has been judged as to whether the gradation value of the target pixel is to be changed, the influence of gradation blurring-out at pixels adjacent to the rewritten pixel.

In accordance with an aspect of the embodiment, the control device may include a third storage device that stores a correction value for blurring-out of each of the plurality of pixels to an adjacent pixel; a write device that writes the correction value for gradation blurring-out from the target pixel to the adjacent pixel to the third storage device, when the gradation value decided by the gradation value deciding device indicates that the gradation value of the target pixel expressed in the b-gradation levels is to be changed; and a third correction device that performs, when the summed value on which neither the first correction processing or the second correction processing is performed indicates that the gradation value of the target pixel expressed in the b-gradation levels is not to be changed, a third correction processing of adding, to the summed value, a corresponding one of the correction values stored in the third storage device indicative of gradation blurring-out from the target pixel to an adjacent pixel. According to this control device, the influence of gradation blurring-out accumulated upon previous rewiring operations can be reduced.

In accordance with an aspect of the embodiment, the second correction device may perform the second correction processing, using the correction values stored in the third memory device. According to this control device, the storage capacity of the memory device can be reduced, compared with the case of storing correction values for the second correction processing and correction values for the third correction processing independently in different storage devices.

In accordance with an aspect of the embodiment, the first correction device may perform the first correction processing for a pixel among pixels adjacent to the target pixel, which satisfies a predetermined blurring-out condition. According to this control device, the first correction processing can be performed for the pixel that satisfies the blurring-out condition.

In accordance with an aspect of the embodiment, the blurring-out condition may include a condition in which the gradation value of an adjacent pixel expressed in the b-gradation levels is different from the gradation value of the target pixel expressed in the b-gradation levels. According to this control device, the first correction processing can be performed for a pixel expressed in the b-gradation levels having a gradation value different from that of an adjacent pixel.

In accordance with an aspect of the embodiment, the second correction device may perform the second correction processing for a pixel among pixels adjacent to the target pixel which satisfies a predetermined blurring-in condition. According to this control device, the second correction processing can be performed for the pixel that satisfies the blurring-in condition.

In accordance with an aspect of the embodiment, the blurring-in condition may include a condition in which the gradation value of an adjacent pixel expressed in the b-gradation levels is different from the gradation value of the target pixel expressed in the b-gradation levels. According to this control device, the second correction processing can be performed for a pixel expressed in the b-gradation levels having a gradation value different from that of an adjacent pixel.

In accordance with still another aspect of the embodiment, the control device may include a third storage device that stores a correction value for blurring-out of each of the plurality of pixels to an adjacent pixel, and a write device that writes, to the third storage device, a correction value for gradation blurring-out from the target pixel to an adjacent pixel when the gradation value decided by the gradation value deciding device indicates that the gradation value of the target pixel expressed in the b-gradation levels is to be changed. The first correction device may perform the first correction processing when the gradation of an adjacent pixel processed prior to the target pixel is the same as the gradation of the target pixel prior to the process, and the second correction device may perform the second correction processing when the gradation of the adjacent pixel is different from the gradation of the target pixel prior to the process, and the correction value for gradation blurring-out from the adjacent pixel to the target pixel stored in the third storage device is not 0. According to this control device, when the correction processing is performed after it has been judged as to whether the gradation value of the target pixel is to be changed, the influence of gradation blurring-out at pixels adjacent to the written pixel can be reduced.

In a preferred aspect, the first correction device may perform the first correction processing for a pixel, among pixels adjacent to the target pixel, which is processed prior to the target pixel in the predetermined order. According to the control device, the first correction processing can be performed for pixels that are processed prior to the target pixel in the predetermined order.

In a preferred aspect, the second correction device may perform the second correction processing for a pixel, among pixels adjacent to the target pixel, which has been processed prior to the target pixel in the predetermined order. According to the control device, the second correction processing can be performed for pixels that are processed prior to the target pixel in the predetermined order.

In accordance with another embodiment of the invention, a control device includes a first storage device that stores a dither matrix of two-dimensionally arranged dither values to be used for a color reduction process for converting data of a-gradation levels to data of b-gradation levels (a>b); a second storage device that stores data of the a-gradation levels indicative of gradation values expressed in the a-gradation levels for each of a plurality of two-dimensionally arranged pixels; a third storage device that stores a correction value for blurring-out of each of the plurality of pixels to an adjacent pixel; a first correction device that performs a first correction processing of calculating a first correction value for correcting gradation blurring-out from a target pixel that is a pixel specified in a predetermined order among the plurality of pixels to an adjacent pixel; a second correction device that performs a second correction processing of calculating a second correction value for correcting gradation blurring-in from the adjacent pixel to the target pixel; a third correction device that performs a third correction processing of calculating a third correction value indicative of gradation blurring-out from the target pixel to the adjacent pixel from among correction values stored in the third storage device; a gradation value deciding device that decides a gradation value of the target pixel expressed in the b-gradation levels by using a value obtained by adding a corresponding one of the dither values stored in the first storage device, a corresponding one of the gradation values stored in the second storage device and at least one of the first correction value and the second correction value; a write device that writes, when the gradation value decided by the gradation value deciding device indicates that the gradation value of the target pixel expressed in the b-gradation levels is to be changed, the correction value for gradation blurring-out from the target pixel to the adjacent pixel to the third storage device; and an output device that outputs, based on the gradation value decided by the gradation value deciding device, a signal for controlling a gradation value of a corresponding one of display elements corresponding to the plurality of pixels of a display device. According to the control device, in the case of judging as to whether the gradation value of the target pixel is to be changed after the correction processing has been performed, the influence of gradation blurring-out at pixels adjacent to a rewritten pixel can be reduced.

In accordance with a preferred aspect of the embodiment, the control device may execute, for the target pixel, one of the first correction processing by the first correction device, the second correction processing by the second correction device and the third correction processing by the third correction device. According to this control device, the process can be simplified, compared to the case where all of the first through third processes are executed.

In accordance with a preferred aspect of the embodiment, the first correction device may perform the first correction processing when the gradation of an adjacent pixel processed prior to the target pixel is the same as the gradation of the target pixel prior to the process, the second correction device may perform the second correction processing when the gradation of the adjacent pixel is different from the gradation of the target pixel prior to the process, and the correction value for gradation blurring-out from the adjacent pixel to the target pixel stored in the third storage device is not 0, and the third correction device may perform the third correction processing when the gradation of the adjacent pixel is different from the gradation of the target pixel prior to the process, the second correction processing is not performed, and the correction value for gradation blurring-out from the target pixel to the adjacent pixel stored in the third storage device is not 0. According to the control device, the influence of gradation blurring-out can be reduced depending on the relation with respect to adjacent pixels processed prior to the target pixel.

Also, in accordance with another embodiment of the invention, there is provided a display apparatus having one of the control devices recited above and the display device described above. According to the display apparatus, the influence of gradation blurring-out accumulated at the time of previous rewriting operations can be reduced.

Furthermore, in accordance with another embodiment of the invention, an electronic apparatus having the display apparatus described above is provided. According to the display apparatus, the influence of gradation blurring-out accumulated at the time of previous rewriting operations can be reduced.

Moreover, in accordance with still another embodiment of the invention, there is provided a control method for controlling a display device having a first storage device that stores a dither matrix of two-dimensionally arranged dither values to be used for a color reduction process for converting data of a-gradation levels to data of b-gradation levels (a>b), and a second storage device that stores data of the a-gradation levels indicative of gradation values expressed in the a-gradation levels for each of a plurality of two-dimensionally arranged pixels. The control method includes the steps of: performing a first correction processing of calculating a first correction value for correcting gradation blurring-out from a target pixel that is a pixel specified in a predetermined order among the plurality of pixels to an adjacent pixel; performing a second correction processing of calculating a second correction value for correcting gradation blurring-in from the adjacent pixel to the target pixel; deciding a gradation value of the target pixel expressed in the b-gradation levels by using a value obtained by adding a corresponding one of the dither values stored in the first storage device, a corresponding one of the gradation values stored in the second storage device and at least one of the first correction value and the second correction value; and outputting, based on the gradation value decided, a signal for controlling a gradation value of a corresponding one of display elements corresponding to the plurality of pixels of a display device. According to the control method, the influence of gradation blurring-out at pixels adjacent to a rewritten pixel.

In accordance with yet another embodiment of the invention, there is provided a control method for controlling a control device that includes a first storage device that stores a dither matrix of two-dimensionally arranged dither values to be used for a color reduction process for converting data of a-gradation levels to data of b-gradation levels (a>b); a second storage device that stores data of the a-gradation levels indicative of gradation values expressed in the a-gradation levels for each of a plurality of two-dimensionally arranged pixels; and a third storage device that stores a correction value for blurring-out for each of the plurality of pixels to an adjacent pixel. The control method includes steps of: performing a first correction processing of calculating a first correction value for correcting gradation blurring-out from a target pixel that is a pixel specified in a predetermined order among the plurality of pixels to an adjacent pixel; performing a second correction processing of calculating a second correction value for correcting gradation blurring-in from the adjacent pixel to the target pixel; performing a third correction processing of calculating a third correction value indicative of gradation blurring-out from the target pixel to the adjacent pixel from among correction values stored in the third storage device; deciding a gradation value of the target pixel expressed in the b-gradation levels by using a value obtained by adding a corresponding one of the dither values stored in the first storage device, a corresponding one of the gradation values stored in the second storage device and at least one of the first correction value and the second correction value; writing the correction value for gradation blurring-out from the target pixel to the adjacent pixel to the third storage device, when the gradation value decided indicates that the gradation value of the target pixel expressed in the b-gradation levels is to be changed; and outputting, based on the gradation value decided, a signal for controlling a gradation value of a corresponding one of display elements corresponding to the plurality of pixels of a display device. According to the control method, the influence of gradation blurring-out at pixels adjacent to a rewritten pixel can be reduced.

BRIEF DESCRIPTION OF THE DRAWINGS

FIGS. 6A-6D are views for describing a color reduction process using a dither matrix.

FIGS. 7A-7D are views for describing flaws caused by blurring.

FIGS. 43A, 43B and 43C are views for comparing results obtained with the correction processing and without the correction processing.

FIGS. 44A-44F show conditions of an example 3.

FIGS. 63A-63H show conditions of an example 4.

FIGS. 64A-64H show states obtained when the process on a pixel (1, 2) is completed in the example 4.

FIGS. 65A-65H show states obtained when the process on a pixel (3, 2) is completed in the example 4.

FIGS. 66A-66H show states obtained when the process on a pixel (4, 2) is completed in the example 4.

DESCRIPTION OF EXEMPLARY EMBODIMENTS

1. Configuration

Figure 1:
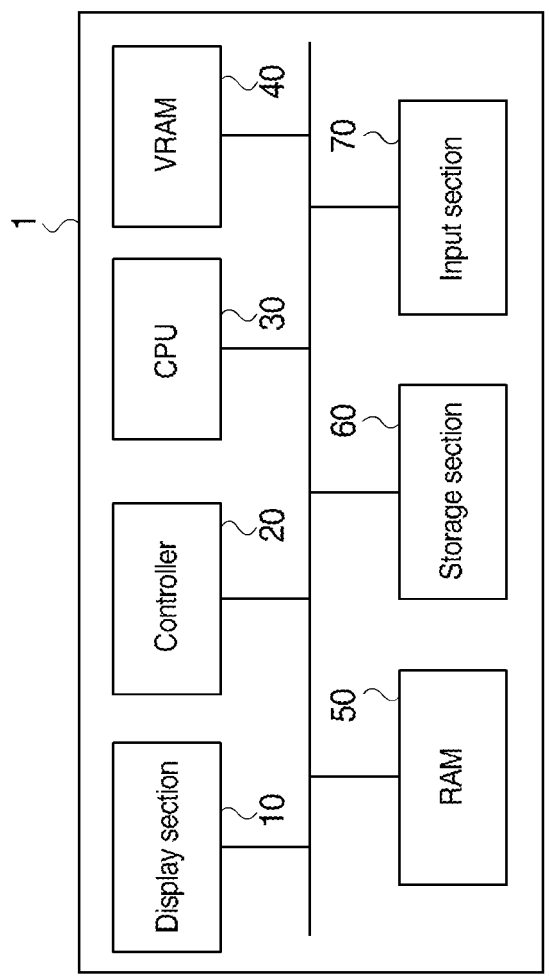
FIG. 1 is a block diagram of a hardware configuration of an electrophoretic apparatus 1.

FIG. 1 is a block diagram of a hardware configuration of an electronic apparatus 1. The electronic apparatus 1 is a display device that displays images. In this example, the electronic apparatus 1 is a device for reading electronic books (an example of documents), in other words, an electronic book reader. The electronic apparatus 1 includes a display section 10, a controller 20, a CPU 30, a VRAM 40, a RAM 50, a storage section 60, and an input section 70. The display section 10 has a display panel including display elements for displaying an image. In this example, the display elements include display elements using electrophoretic particles, as display elements having the memory-property that retains a display state without supplying energy through voltage application or the like. The display section 10 displays an image in monochrome multiple gradation levels (in this example, two gradation levels of black and white) with the display elements. The controller 20 controls the display section 10. The CPU 30 is a device that controls each of the sections of the electronic apparatus 1.

The CPU 30 uses the RAM 50 as a work area, and executes a program stored in a ROM (not shown) or the storage section 60. The VRAM 40 is a memory that stores image data indicative of an image to be displayed on the display section 10. The RAM 50 is a volatile memory that stores data. The storage section 60 is a storage device that stores various data and application programs, in addition to data of electronic books (book data), and includes an HDD or a nonvolatile memory such as a flash memory. The storage section 60 is capable of storing data of a plurality of electronic books. The input section 70 is an input device for inputting user's instructions, and includes, for example, a touch screen, key pads, buttons or the like. The components described above are interconnected through a bus.

Figure 2:
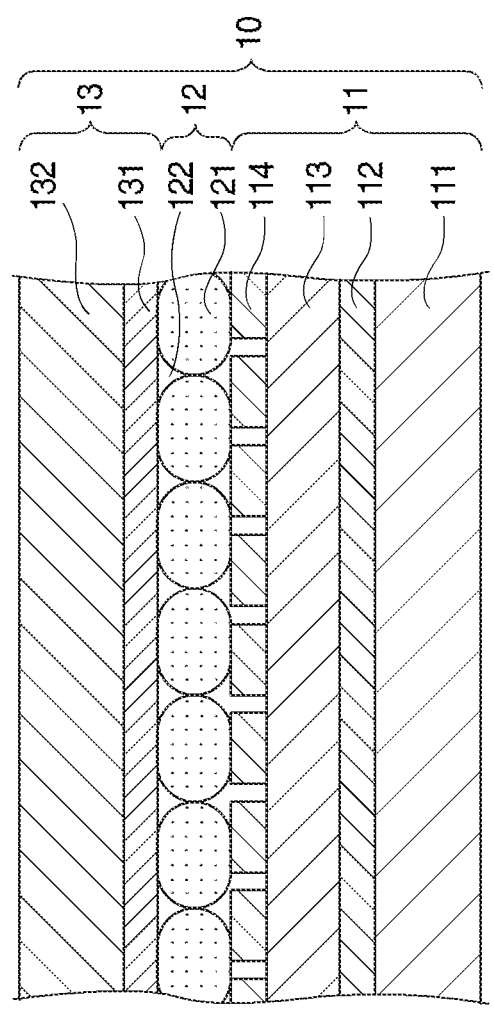
FIG. 2 is a schematic view of a cross-sectional structure of a display section 10.

FIG. 2 is a schematic view of a cross-sectional structure of the display section 10. The display section 10 includes a first substrate 11, an electrophoretic layer 12, and a second substrate 13. The first substrate 11 and the second substrate 13 are substrates for retaining the electrophoretic layer 12.

The first substrate 11 includes a substrate 111, a bonding layer 112 and a circuit layer 113. The substrate 111 is made of a material having dielectric property and flexibility, for example, a polycarbonate substrate. It is noted that the substrate 111 may be made of any resin material that is lightweight, flexible, elastic and dielectric, without any particular limitation to polycarbonate. As another example, the substrate 111 may be formed from glass material without flexibility. The bonding layer 112 is a layer that bonds the substrate 111 and the circuit layer 113 together. The circuit layer 113 is a layer having a circuit for driving the electrophoretic layer 12. The circuit layer 113 has pixel electrodes 114.

The electrophoretic layer 12 includes microcapsules 121 and a binder 122. The microcapsules 121 are fixed by the binder 122. The binder 122 may be made of any material that has good affinity with the microcapsules 121, excellent adhesion to the electrodes, and dielectric property. Each of the microcapsules 121 is a capsule containing a dispersion medium and electrophoretic particles. The microcapsules 121 may preferably be made of a material having flexibility, such as, composites of gum arabic and gelatin, urethane compounds, and the like. It is noted that an adhesive layer made of adhesive may be provided between the microcapsules 121 and the pixel electrodes 114.

As the dispersion medium, it is possible to use any one of materials including water; alcohol solvents (such as, methanol, ethanol, isopropanol, butanol, octanol, and methyl cellosolve); esters (such as, ethyl acetate and butyl acetate); ketones (such as, acetone, methyl ethyl ketone, and methyl isobutyl ketone); aliphatic hydrocarbons (such as, pentane, hexane, and octane); alicyclic hydrocarbons (such as, cyclohexane and methylcyclohexane); aromatic hydrocarbons (such as, benzene, toluene, long-chain alkyl group-containing benzenes (such as, xylenes, hexylbenzene, heptylbenzene, octylbenzene, nonylbenzene, decylbenzene, undecylbenzene, dodecylbenzene, tridecylbenzene, and tetradecylbenzene)); halogenated hydrocarbons (such as, methylene chloride, chloroform, carbon tetrachloride, and 1,2-dichloroethane); and carboxylates. Also, the dispersion medium may be made of any one of other various oils. The dispersion medium may use any of the materials described above in combination, and may be further mixed with a surfactant.

The electrophoretic particles are particles (polymer or colloid) having a property in which the particles move in the dispersion medium by electric fields. In the present embodiment, white electrophoretic particles and black electrophoretic particles are contained in each of the microcapsules 121. The black electrophoretic particles are particles including black pigments, such as, for example, aniline black, carbon black and the like, and are positively charged in the present embodiment. The white electrophoretic particles are particles including white pigment, such as, for example, titanium dioxide, aluminum oxide and the like, and are negatively charged in the present embodiment.

The second substrate 13 includes a common electrode 131 and a film 132. The film 132 seals and protects the electrophoretic layer 12. The film 132 may be formed from a material that is transparent and has a dielectric property, such as, for example, polyethylene terephthalate. The common electrode 131 is made of a transparent conductive material, such as, for example, indium tin oxide (ITO).

Figure 3:
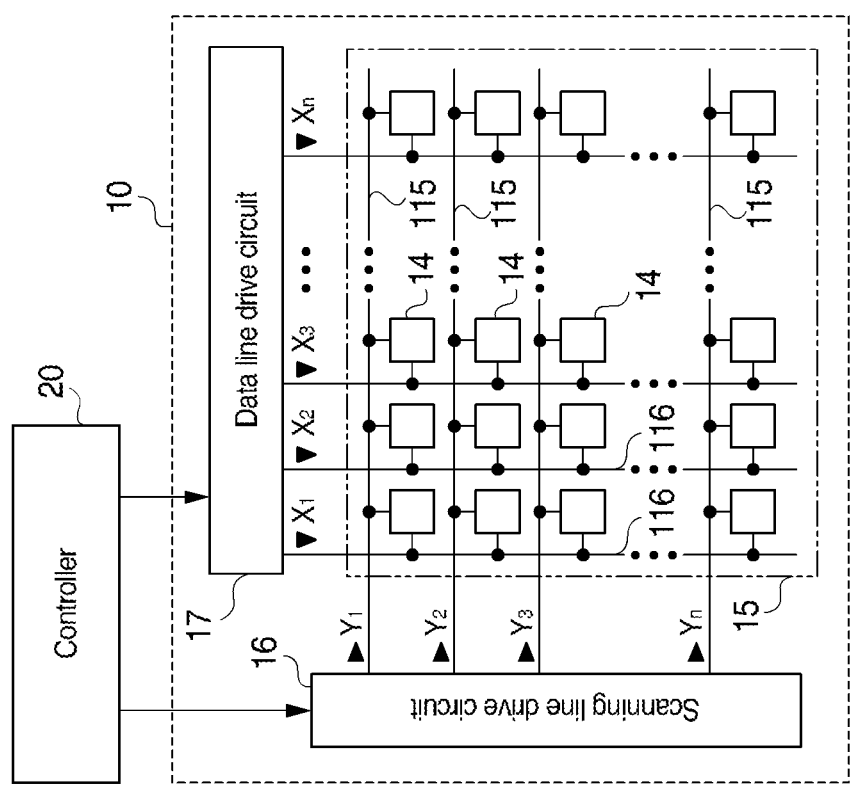
FIG. 3 is a diagram of a circuit configuration of the display section 10.

FIG. 3 is a diagram showing a circuit configuration of the display section 10. The display section 10 includes m scanning lines 115, n data lines 116, m×n pixels 14, a scanning line drive circuit 16, and a data line drive circuit 17. The scanning line drive circuit 16 and the data line drive circuit 17 are controlled by the controller 20. The scanning lines 115 are arranged along a row direction (x direction), and transmit a scanning signal. The scanning signal is a signal that sequentially, exclusively selects one scanning line 115 from among the m scanning lines 115. The data lines 116 are arranged along a column direction (y direction), and transmit data signals. The data signals are signals indicative of gradation levels of each pixel. The scanning lines 115 are insulated from the data lines 116. The pixels 14 are provided at positions corresponding to intersections between the scanning lines 115 and the data lines 116, and exhibit gradations according to the respective data signals. It is noted that, when one scanning line 115 among the plurality of scanning lines 115 needs to be distinguished from the others, it is called the scanning line 115 in the first row, the second row, . . . , or the m-$^{th}$ row. The data lines 116 may be similarly distinguished. The m×n pixels 14 form a display region 15. Among the display region 15, when a pixel 14 at the i-$^{th}$ row and the j-$^{th}$ is to be distinguished from the others, it is referred to as a pixel (j, i). Parameters that have one-to-one correspondence with the pixels 14, such as, gradation values and the like are similarly expressed.

The scanning line drive circuit 16 outputs a scanning signal Y for sequentially, exclusively selecting one scanning line 115 from among the m scanning lines 115. The scanning signal Y is a signal that sequentially, exclusively becomes to be H (High) level. The data line drive circuit 17 outputs data signals X. The data signals X are signals indicative of data voltages corresponding to gradation values of pixels. The data line drive circuit 17 outputs data signals indicative of data voltages corresponding to pixels in a row selected by the scanning signal. The scanning line drive circuit 16 and the data line drive circuit 17 are controlled by the controller 20.

Figure 4:
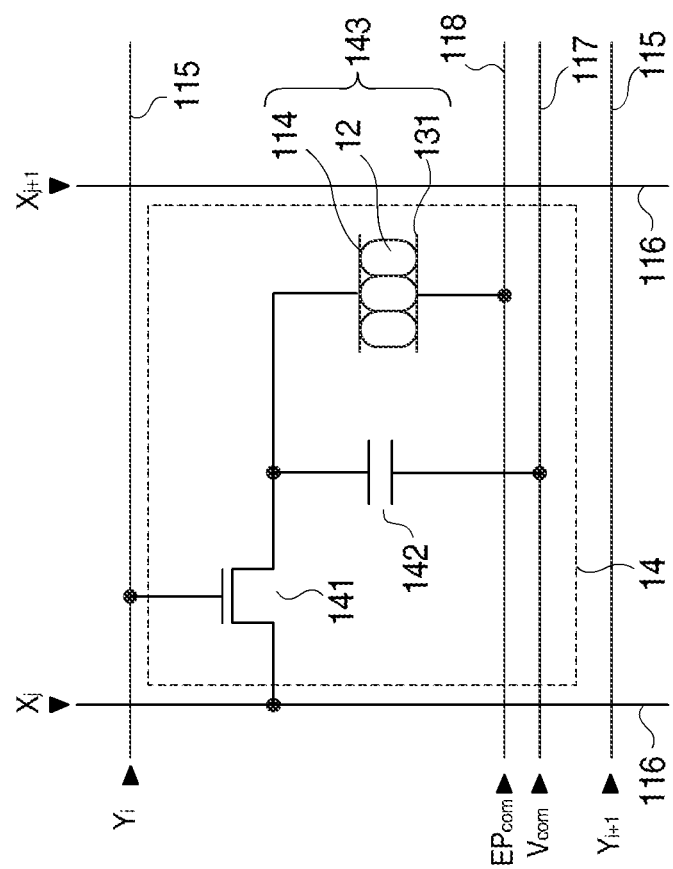
FIG. 4 is a diagram of an equivalent circuit of a pixel 14.

FIG. 4 is a diagram showing an equivalent circuit of the pixel 14. The pixel 14 includes a transistor 141, a capacitance 142, a pixel electrode 114, an electrophoretic layer 12, and a common electrode 131. The transistor 141 is a switching element for controlling data writing to the pixel electrode 114, for example, an n-channel TFT (Thin Film Transistor). The transistor 141 includes a gate, a source and a drain, connected to the scanning line 115, the data line 116 and the pixel electrode 114, respectively. When a scanning signal at L (Low) level (non-selection signal) is inputted in the gate, the source and the drain of the transistor 61 are insulated from each other. When a scanning signal at L (Low) level (non-selection signal) is inputted in the gate, the source and the drain of the transistor 141 become insulated from each other. When a scanning signal at H (High) level (selection signal) is inputted in the gate, the source and the drain of the transistor 141 become conductive to each other, and a data voltage is written to the pixel electrode 114. Also, the drain of the transistor 141 connects to the capacitance 142. The capacitance 142 retains a charge according to the data voltage. The pixel electrode 114 is provided at each of the pixels 14, and disposed opposite the common electrode 131. The common electrode 131 is commonly shared by the entire pixels 14, and is given a potential EPcom. The electrophoretic layer 12 is held between the pixel electrode 114 and the common electrode 131. The pixel electrode 114, the electrophoretic layer 12 and the common electrode 131 form an electrophoretic element 143. A voltage corresponding to a potential difference between the pixel electrode 114 and the common electrode 131 is applied to the electrophoretic layer 12. In the microcapsules 121, the electrophoretic particles move according to a voltage applied to the electrophoretic layer 12, thereby expressing a gradation. When the potential on the pixel electrodes 114 is positive (for example, +15V) with respect to the potential EPcom on the common electrode 131, the negatively charged white electrophoretic particles move toward the pixel electrode 114, and the positively charged black electrophoretic particles move toward the common electrode 131. As the display section 10 is viewed from the side of the second substrate 13, the pixels appear in black. When the potential on the pixel electrodes 114 is negative (for example, −15V) with respect to the potential EPcom on the common electrode 131, the positively charged black electrophoretic particles move toward the pixel electrodes 114, and the negatively charged white electrophoretic particles move toward the common electrode 131. In this instance, the pixels appear in white.

In the following description, a period starting from the selection of the scanning line in the 1$^{st}$ row by the scanning line drive circuit 16 until the completion of the selection of the scanning line in the m-$^{th}$ row is referred to as a "frame period" or, simply a "frame." Each of the scanning lines 115 is selected once in each frame, and a data signal is supplied to each of the pixels 14 once in each frame.

Figure 5:
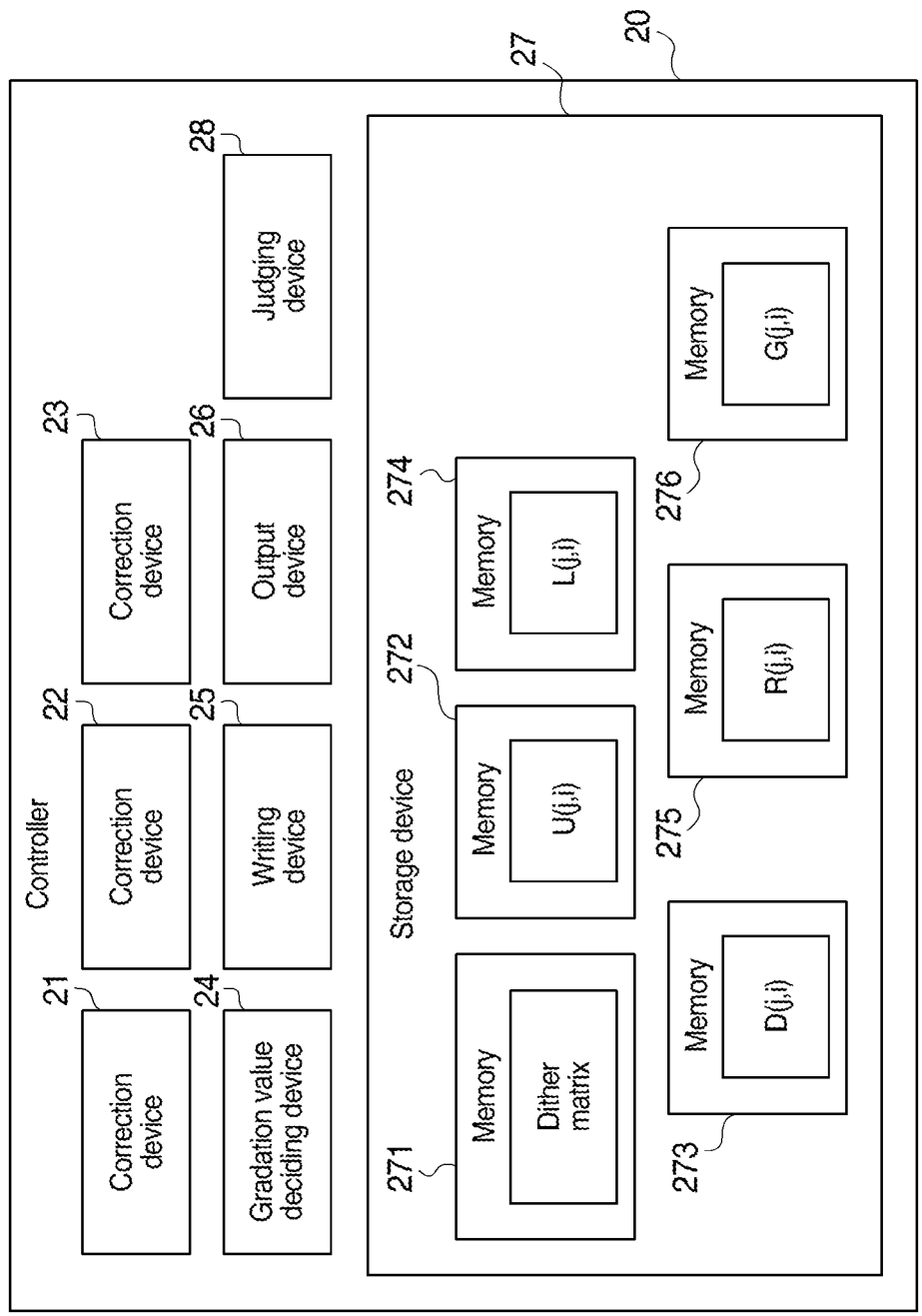
FIG. 5 is a diagram of a functional configuration of a controller 20.

FIG. 5 is a block diagram showing a functional configuration of the controller 20. The controller 20 includes a correction device 21, a correction device 22, a correction device 23, a gradation value deciding device 24, a writing device 25, an output device 26, a storage device 27, and a judging device 28. The storage device 27 includes a memory 271, a memory 272, a memory 273, a memory 274, a memory 275, and a memory 276. The memory 271 (an example of the first storage device) stores a dither matrix of two-dimensionally arranged dither values. The dither matrix is used for a color reduction process for converting data of a-gradation levels to data of b-gradation levels (a and b are natural numbers that satisfy a>b≧2). The memory 272 stores a correction value U for correcting upward blurring-out for each of the pixels. The memory 272 (an example of the third storage device) has memory regions corresponding to the respective pixels in m rows by n columns. Each of the memory regions corresponding to a pixel (j, i) stores a correction value U (j, i). The correction value U (j, i) is indicative of a correction value for correcting blurring-out from the pixel (j, i) to a pixel (j, (i−1)). The memory 273 (an example of the third storage device) stores a correction value D for correcting downward blurring-out for each of the pixels. The memory 273 has memory regions corresponding to the respective pixels in m rows by n columns. Each of the memory regions corresponding to a pixel (j, i) stores a correction value D (j, i). The correction value D (j, i) is indicative of a correction value for correcting blurring-out from the pixel (j, i) to a pixel (j, (i+1)). The memory 274 (an example of the third storage device) stores a correction value L for correcting leftward blurring-out for each of the pixels. The memory 274 has memory regions corresponding to the respective pixels in m rows by n columns. Each of the memory regions corresponding to a pixel (j, i) stores a correction value L (j, i). The correction value L (j, i) is indicative of a correction value for correcting blurring-out from the pixel (j, i) to a pixel ((j−1), i). The memory 275 (an example of the third storage device) stores a correction value R for correcting rightward blurring-out for each of the pixels. The memory 275 has memory regions corresponding to the respective pixels in m rows by n columns. Each of the memory regions corresponding to a pixel (j, i) stores a correction value R (j, i). The correction value R (j, i) is indicative of a correction value for correcting blurring-out from the pixel (j, i) to a pixel ((j+1), i). The memory 276 (an example of the second storage device) stores gradation values G (j, i) (gradation values after the color reduction process) for the respective pixels. The judging device 28 judges for a target pixel that is a pixel specified in a predetermined order among a plurality of two-dimensionally arranged pixels as to whether its gradation value expressed in the b-gradation levels is to be changed. This judgment is performed by using a summed value of the gradation value stored in the memory 276 plus the dither value stored in the memory 271. When the judging device 28 judges that the gradation value expressed in the b-gradation levels is to be changed, the correction device 21 performs a first correction processing of adding, to the summed value, a correction value for correcting gradation blurring-out from the target pixel to an adjacent pixel. The correction device 22 performs a second correction processing of adding, to the summed value, a correction value for correcting gradation blurring-in from an adjacent pixel to the target pixel. In this example, the correction device 22 performs the second correction processing with the correction values stored in the memories 272-275. When the summed value to which neither the first correction processing or the second correction processing has been applied indicates that the gradation value of the target pixel expressed in the b-gradation levels is not to be changed (in other words, when the judging device 28 judges that the gradation value of the target pixel is not to be changed), the correction device 23 performs a third correction processing of adding, to the summed value, a correction value indicative of gradation blurring-out from the target pixel to an adjacent pixel selected from among the correction values stored in the memories 272-275. The gradation value deciding device 24 decides a gradation value of the target pixel expressed in the b-gradation levels by using the summed value that has been corrected by the first correction processing, the second correction processing or the third correction processing. When none of the first through third correction processings has been performed, the gradation value deciding device 24 decides a gradation value of the target pixel expressed in the b-gradation levels by using the summed value with which no correction processing has been performed. When the gradation value decided by the gradation value deciding device 24 indicates that the gradation value of the target pixel expressed in the b-gradation levels is to be changed, the writing device 25 writes, to the memories 272-275, correction values for gradation blurring-out from the target pixel to adjacent pixels. Also, the writing device 25 writes the gradation values decided by the gradation value deciding device 24 to the memory 276. The output device 26 outputs signals for controlling the gradation values of display elements (for example, the electrophoretic elements 143) corresponding to the plural pixels in a display device (for example, the display section 10), based on the gradation values stored in the memory 276.

2. Outline of Color Reduction Process and Blurring

FIGS. 6A-6D are views for describing a color reduction process using a dither matrix. The color reduction process is a process for converting data of a-gradation levels to data of b-gradation levels (a and b are natural numbers of 2 or greater that satisfy a>b). This section describes an example in which data of an original image expressed in 16 gradation levels is changed to data of 2 gradation levels by a color reduction process. FIG. 6A is a view of an example of image data that is original data of an image. The image has pixels arranged in 4 rows by 4 columns. Each of the pixels is expressed with 16 gradation levels (0-15). This example shows an image in which the gradation value of the entire pixels is "8." FIG. 6B is a view showing an example of a dither matrix. FIG. 6B shows a Bayer type dither matrix. In the dither matrix, basically, numerical values corresponding to the gradation values (16 numerical values from 0 to 15, which are hereunder referred to as "dither values") are arranged according to a certain rule. It is noted that, in the example shown in FIG. 6B, a dither value "0" is not used, and 15 numerical values of 1 through 15 are used. For this reason, dither values "8" which correspond to an intermediate gradation appear twice.

A binarization process using a dither matrix is performed in the following manner. First, a gradation value of the original data and a dither value of the dither matrix are added. The addition is performed for each of the corresponding pixels and cells. For example, the gradation value of a pixel at the i$^{-th}$ row and the j$^{-th}$ column of the original data and the dither value of a cell at the i$^{-th}$ row and the j$^{-th}$ column of the dither matrix are added together. FIG. 6C shows a state in which the corresponding values are added together, respectively. Next, the summed value is binarized with a threshold value as reference. As the threshold value, a numerical value according to the number of gradation levels is used, for example, "16" is used in this example. More specifically, the gradation value of a pixel with the summed value being less than 16 is converted to "0," and the gradation value of a pixel with the summed value being 16 or more is converted to "1." FIG. 6D shows a state after binarization. In FIG. 6D, pixels in white (white pixels) correspond to the gradation value "1" and pixels in black (black pixels) correspond to the gradation value "0." It is noted that a dither value "0" is not used in the dither matrix in order to have the summed value for a pixel with the gradation value "15" always become greater than the threshold value. If the dither value "0" were added to a pixel with the gradation value "15," the summed value would be "15" which is not greater than the threshold value, leaving a possibility that the gradation of pixels having the maximum gradation value may be converted to "0." In order to avoid such a situation, the dither value "0" is not used.

FIGS. 7A-7D are views for describing flaws caused by blurring. FIG. 7A shows an image before rewriting. In this example, the image before rewriting is an all-white image (an image with the gradation value of the entire pixels being "1"). FIG. 7B shows an image to be written from now, in other words, an image after rewriting. In this example, the image after rewriting is an image with the gradation value of the entire pixels being "8." FIG. 7C shows an ideal display image. For the binarization process, the dither matrix shown in FIG. 6B is used. In the ideal display image, the gradation of each of the pixels is either white or black, and the gradation of the display image as a whole is expressed by area coverage modulation. FIG. 7D shows a display image with some blurring occurred. When blurring occurs, edge portions of pixels that are ideally supposed to be white assume a state of being stained with color by adjacent black pixels. In other words, the gradation of pixels supposed to be white becomes imperfect white. As a result, the image of pixels of 4 rows by 4 columns has a relatively blackish gradation as a whole, compared to the ideal display image. In reverse, when the image before rewriting is an all-black image (an image with the gradation value of the entire pixels being "0"), edge portions of pixels that are ideally supposed to be black assume a state of being stained with color by adjacent white pixels. In other words, the gradation of pixels supposed to be black becomes imperfect black. As a result, the image of pixels of 4 rows by 4 columns has a relatively whitish gradation as a whole, compared to the ideal display image. In other words, when an image with an intermediate gradation is to be displayed, the image actually displayed at the display section 10 may become different from what it should be due to the gradation of an image that has been displayed before the current image. In this specification, focusing on one pixel, when the gradation of that pixel influences the gradation of an adjacent pixel, such influence is referred to as gradation "blurring-out." On the other hand, when the gradation of that pixel is influenced by the gradation of an adjacent pixel, such influence is referred to as gradation "blurring-in." The blurring-out and the blurring-in are generally referred to as "blurring." The electronic apparatus 1 reduces the difference that may appear in an image to be displayed after rewriting, which depends on an image that has been displayed before rewriting.

3. Operation 3-1. Outline of Operation

Figure 8:
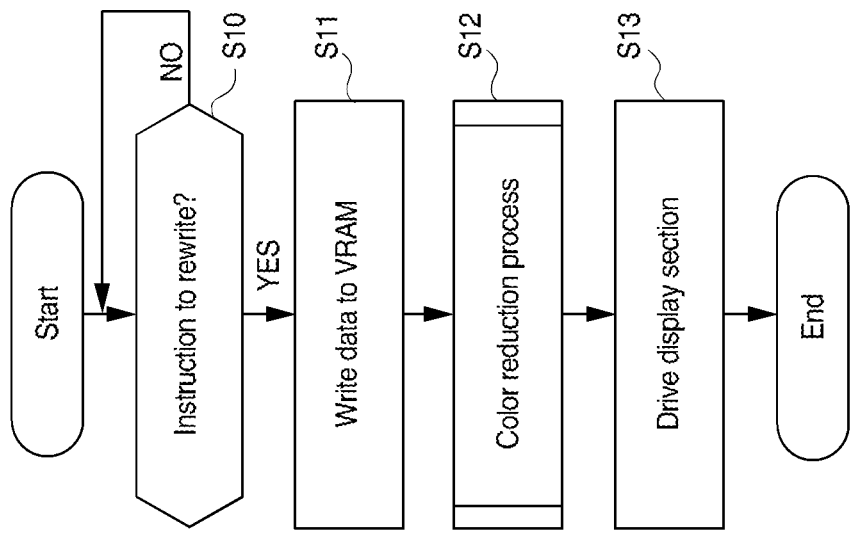
FIG. 8 is a flow chart showing operations of the electronic apparatus 1.

FIG. 8 is a flow chart of an operation of the electronic apparatus 1. In step S10, the CPU 30 judges as to whether rewriting of a screen has been instructed. The user inputs a rewriting instruction through the input section 70. For example, when the input section 70 has a page turning button, and the user pushes the button, the input section 70 outputs to the CPU 30 a signal indicating that page turning has been instructed. Upon receiving the signal, the CPU 30 judges that an instruction to rewrite the screen has been made. In step S11, the CPU 30 acquires data of an image to be rewritten from the storage section 60, and writes the acquired data to the VRAM 40. In this example, the data to be written to the VRAM 40 is data in 16 gradation levels. In step S12, the controller 20 performs a color reduction process for the data stored in the VRAM 40. The controller 20 converts the data in 16 gradation levels to data in two gradation levels by the color reduction process. In step S13, the display section 10 displays an image based on the data in two gradation levels.

Figure 9:
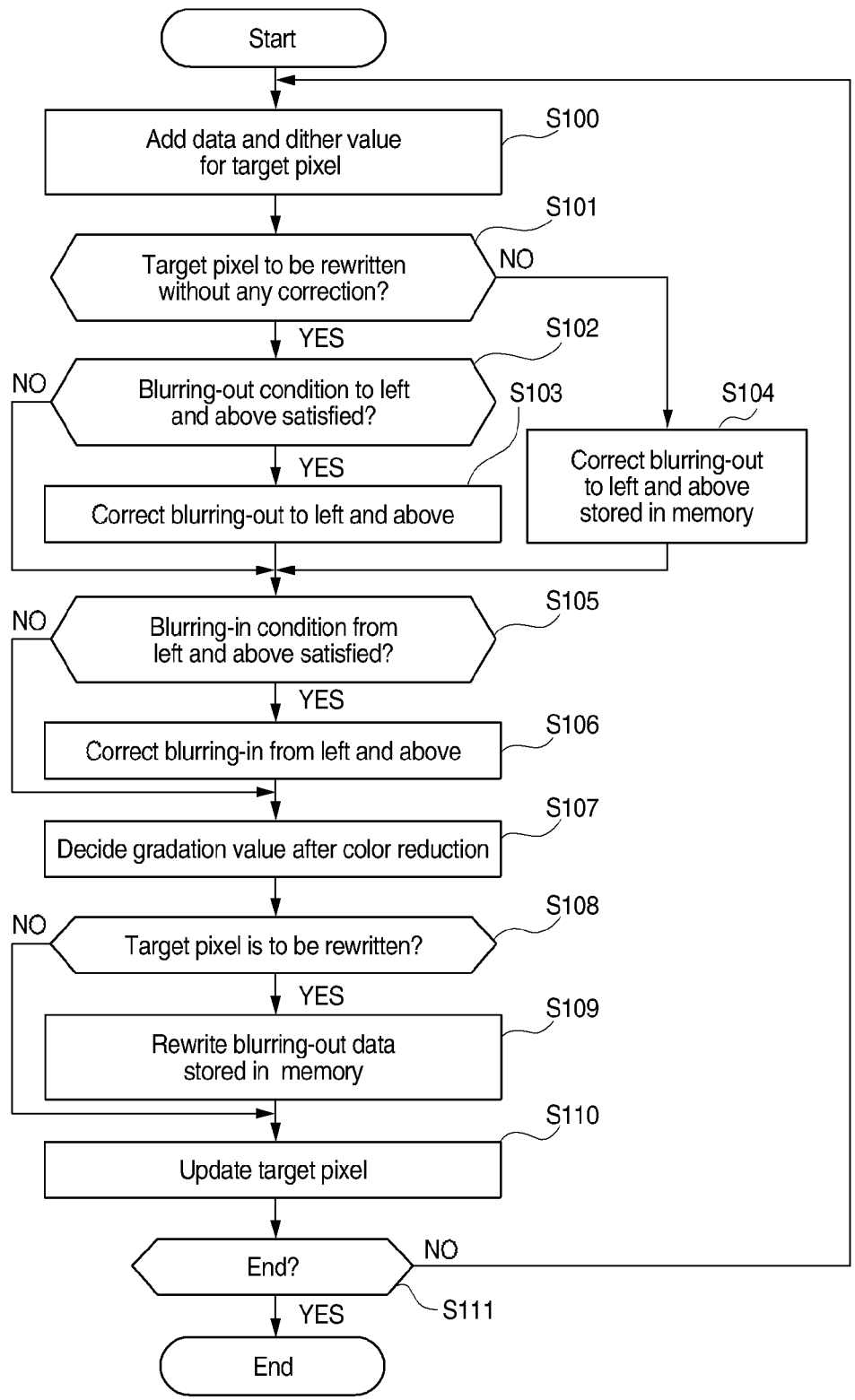
FIG. 9 is a flow chart showing details of a color reduction process.

FIG. 9 is a flow chart showing details of the color reduction process in step S12. In step S100, the controller adds a gradation value P (j, i) indicated by the data for a pixel (j, i) that is a target pixel and a dither value M (j, i) of the dither matrix together, thereby obtaining a summed value A (j, i). The target pixel is a pixel, among pixels in m rows by n columns, which is subject to processing. In this example, target rows are sequentially specified from the top, and target pixels in each row are sequentially specified from the left.

In step S101, the controller 20 judges as to whether the target pixel is to be rewritten when the binarization processing is performed using the summed value (without performing corrections to be described below). When the summed value is equal to the threshold value or greater, the target pixel is converted to a white pixel. In this case, when the target pixel was a white pixel before rewriting, the target pixel will not be rewritten. When the target pixel was a black pixel before rewriting, the target pixel would be rewritten from the black pixel to a white pixel. On the other hand, when the summed value is less than the threshold value, the target pixel would be converted to a black pixel. In this case, when the target pixel was a white pixel before rewriting, the target pixel would be rewritten from the white pixel to a black pixel. When the target pixel was a black pixel before rewriting, the target pixel will not be rewritten. When it is judged that the target pixel is to be rewritten (S101: YES), the controller 20 shifts the process to step S102. When it is judged that the target pixel is not to be rewritten (S101: NO), the controller 20 shifts the process to step S104.

In step S102, the controller 20 judges as to whether the target pixel satisfies a blurring-out condition. The blurring-out condition may be met, for example, if the gradation values of the target pixel and an adjacent pixel are different from each other after the color reduction process. The controller 20 judges as to whether pixels adjacent to the target pixel, more specifically, two adjacent pixels above and on the left of the target pixel in this example satisfy the aforementioned condition. Pixels are sequentially scanned from top to down, and from left to right. Therefore, the gradation values after rewriting and color reduction process, for the pixels above and on the left of the target pixel, have been decided at the time when the target pixel is being processed. However, the gradation value after rewriting and color reduction process, for the target pixel, has not yet been decided at the time when the target pixel is being processed. Therefore, for the target pixel, the judgment is made as to whether the aforementioned blurring-out condition is satisfied, assuming that the color reduction process was performed using the summed value A (j, i) at the time of step S102. When it is judged that the blurring-out condition is satisfied (S102: YES), the controller 20 shifts the process to step S103. When it is judged that the blurring-out condition is not satisfied (S102: NO), the controller 20 shifts the process to step S105.

In step S103 (an example of the first correction processing), for the target pixel, the controller 20 corrects blurring-out into the adjacent pixels. The correction value in this instance corresponds to a first correction value. The blurring-out into each of the pixels above and on the left of the target pixel is corrected by adding the correction values of blurring-out to the summed value of the target pixel. In this example, the correction values are decided in advance, and stored in a memory built in the controller 20. The processings in step S102 and step S103 are performed for each of the two pixels above and on the left of the target pixel (two times in total). It is noted that, in order to avoid complication of the drawings, FIG. 8 does not show the repeated processings. When the processing in step S103, the controller 20 shifts the process to step S105. The first correction processing, which combines step S102 and step S103, is performed for pixels that are processed in a predetermined order (in the order of scanning) before the target pixel, among pixels adjacent to the target pixel.

In step S104 (an example of the third correction processing), for the target pixel, the controller 20 corrects blurring-out into pixels on the left of and above the target pixel. The correction value in this instance corresponds to the third correction value. Correction of the blurring-out into the pixel on the left and the pixel above is performed by adding the correction values for the blurring-out to the summed value of the target pixel. The correction values used here are correction values stored in the memory 272 and the memory 274.

In step S105, the controller 20 judges as to whether the target pixel satisfies a blurring-in condition. The blurring-in condition may be met, for example, if the gradation values of the target pixel and an adjacent pixel are different from each other after the color reduction process. In this example, the blurring-in condition is the same as the blurring-out condition described above. Therefore, the judgment is performed in the same manner as the judgment of blurring-out condition. When it is judged that the blurring-in condition is satisfied (S105: YES), the controller 20 shifts the process to step S106. When it is judged that the blurring-in condition is not satisfied (S105: NO), the controller 20 shifts the process to step S107.

In step S106 (an example of the second correction processing), for the target pixel, the controller 20 corrects blurring-in from the pixels on the left of and above the target pixel. The correction value in this instance corresponds to the second correction value. Correction of the blurring-in from each of the pixel on the left and the pixel above is performed by adding the correction values for the blurring-in to the summed value of the target pixel. The correction value for blurring-in from the pixel on the left is stored in the memory 275. The correction value R ((j−1), i) stored in the memory 275 is a correction value for blurring-out from the pixel ((j−1), i) to the pixel (j, i). However, it can be said that the correction value R ((j−1), i) is a correction value for blurring-in from the pixel ((j−1), i) to the pixel (j, i), when considered with the pixel (j, i) as reference. Similarly, the correction value for blurring-in from the pixel above is stored in the memory 273. The controller 20 reads out these correction values from the memories, and adds the correction values readout to the summed value of the target pixel. The second correction processing, which combines step S105 and step S106, is performed for pixels that are processed in a predetermined order (in the order of scanning) before the target pixel, among pixels adjacent to the target pixel.

In step S107, the controller 20 decides the gradation value of the target pixel after color reduction, using the summed value after correction. When the summed value after correction is equal to the threshold value or greater, the target pixel is decided to be a white pixel; and when the summed value after correction is less than the threshold value, the target pixel is decided to be a black pixel.

In step S108, the controller 20 judges as to whether the target pixel is to be rewritten using the decided gradation value. The controller 20 compares, for the target pixel, the gradation value before rewriting and the gradation value after rewriting, thereby judging as to whether the target pixel is to be rewritten. When it is judged that the target pixel is to be rewritten (S108: YES), the controller 20 shifts the process to step S109. When it is judged that the target pixel is not to be rewritten (S108: NO), the controller 20 shifts the process to step S110. Also, in step S108, the controller 20 writes the gradation value of the target pixel after color reduction to the memory 276.

In step S109, the controller 20 rewrites data stored in the memories 272-275. When the target pixel is rewritten from a white pixel to a black pixel, a correction value Cb for blurring-out from the black pixel is used. The controller 20 reads values stored in the memories 272-275, adds the correction value Cb to each of the values readout, and writes the summed values to the memories 272-275, respectively. When the target pixel is rewritten from a black pixel to a white pixel, a correction value Cw for blurring-out from the white pixel is used. The controller 20 reads values stored in the memories 272-275, adds the correction value Cw to each of the values readout, and writes the summed values to the memories 272-275, respectively.

In step S110, the controller 20 updates the target pixel. More specifically, the controller 20 updates the parameter j that specifies the target pixel as j=j+1. When j>n, the controller 20 sets the value of the parameter to j=1, and then updates the parameter i as i=i+1.

In step S111, the controller 20 judges as to whether the process has been finished for the entire pixels. More specifically, the controller 20 judges as to whether i≤m is established. When i≤m, the controller 20 judges that there are still pixels for which the process has not been finished. When i>m, the controller 20 judges that the process has finished for the entire pixels. When it is judged that the process has been finished for the entire pixels (S111: YES), the controller 20 ends the process flow in FIG. 9. When it is judged that pixels for which the process has not been finished still remain (S111: NO), the controller 20 shifts the process to step S100.

Referring back to FIG. 8, in step S13, the controller 20 drives the display section 10 based on the data generated by the color reduction process.

3-2. Process Example 1

The operations in FIG. 9 will be described using a specific example. In this example, an all-white image (FIG. 7A) is rewritten to an image with its entire pixels being in halftone (FIG. 7B). In the following example, the correction value Cb for correcting blurring-out from a black pixel to a white pixel is +2 (Cb=+2). Because white pixels that are affected by gradation blurring-out from black pixels appear blackish, the purpose of this correction is to make gradation values of pixels to become greater in order to increase the probability of converting the pixels to white pixels. Also, in this example, at the time of starting the process, zero is stored as a correction value for each of the entire pixels in the memories 272-275. The state in which zero is stored as a correction value for each of the entire pixels in the memories 272-275 means that prior accumulation of blurring-out is zero. In other words, in this example, the summed value would not be changed even if the correction in step S104 is performed. Therefore, in this example, the description of the processing in step S104 is omitted.

Figure 10:
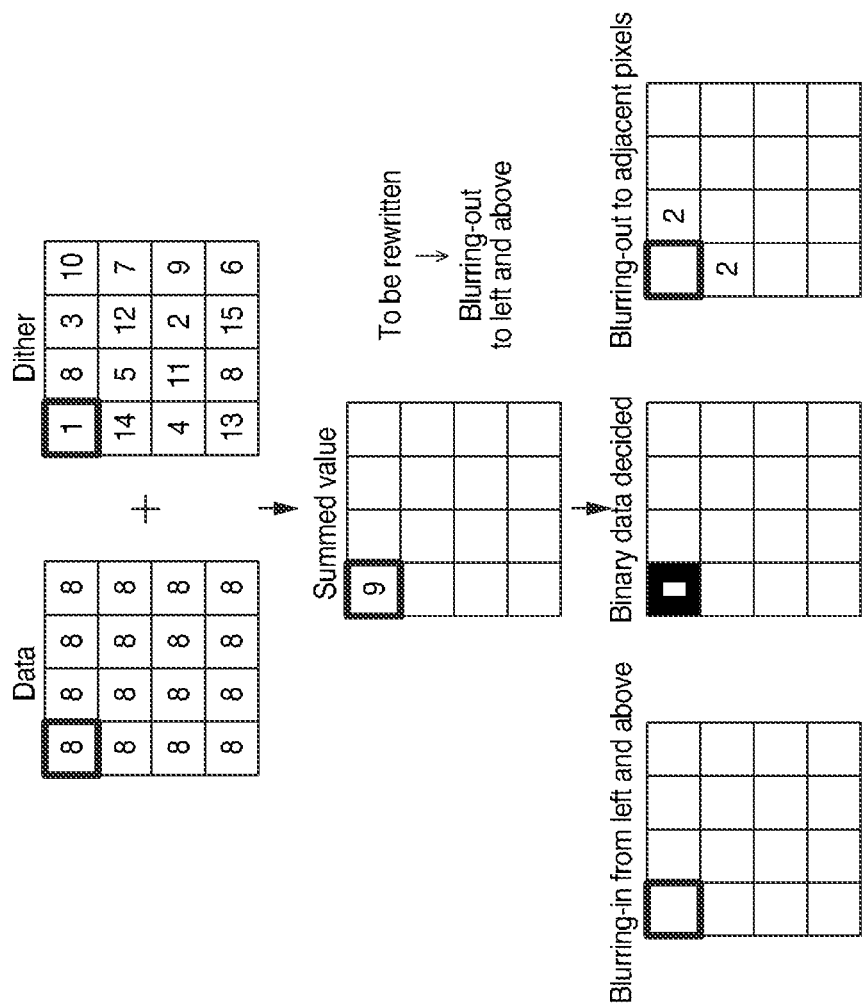
FIG. 10 shows a process executed in an example 1 when a pixel (1, 1) is a target pixel.

FIG. 10 shows processings performed when a pixel (1, 1) is the target pixel. In the following figures, the target pixel is indicated with a thick line frame. For the pixel (1, 1), the gradation value and the dither value are added. The summed value A is acquired as follows:

$$A(1,1)=P(1,1)+M(1,1)=8+1=9$$

The threshold value Th is 16 (Th=16). At this moment, A (1, 1)<Th, and therefore the target pixel would be converted to a black pixel unless any correction processing is performed. In other words, the target pixel would be rewritten (S101: YES). Then, it is judged as to whether the blurring-out condition is satisfied. As the pixel (1, 1) is a pixel located at the left upper corner, and no pixel exists above or on the left of the target pixel. Therefore, the blurring-out condition is not satisfied for the pixels above and on the left (S102: NO). Also, the blurring-in condition is not satisfied for the same reason (S105: NO). At this moment, A (1, 1)<Th, and therefore the pixel (1, 1) would be converted to a black pixel (S107). As the target pixel is rewritten (S108: YES), the memories 272-275 would be rewritten. Since no pixel exists above or on the left of the target pixel, the memories 272 and 274 are not rewritten. In the memories 273 and 275, the correction value Cb is written as a correction value for the target pixel as follows.

D (1, 1)=Cb=2
R (1, 1)=Cb=2

For describing the rewriting at the memories 272-275, the correction values for blurring-out are shown at the pixels on the right of and below the target pixel.

Figure 11:
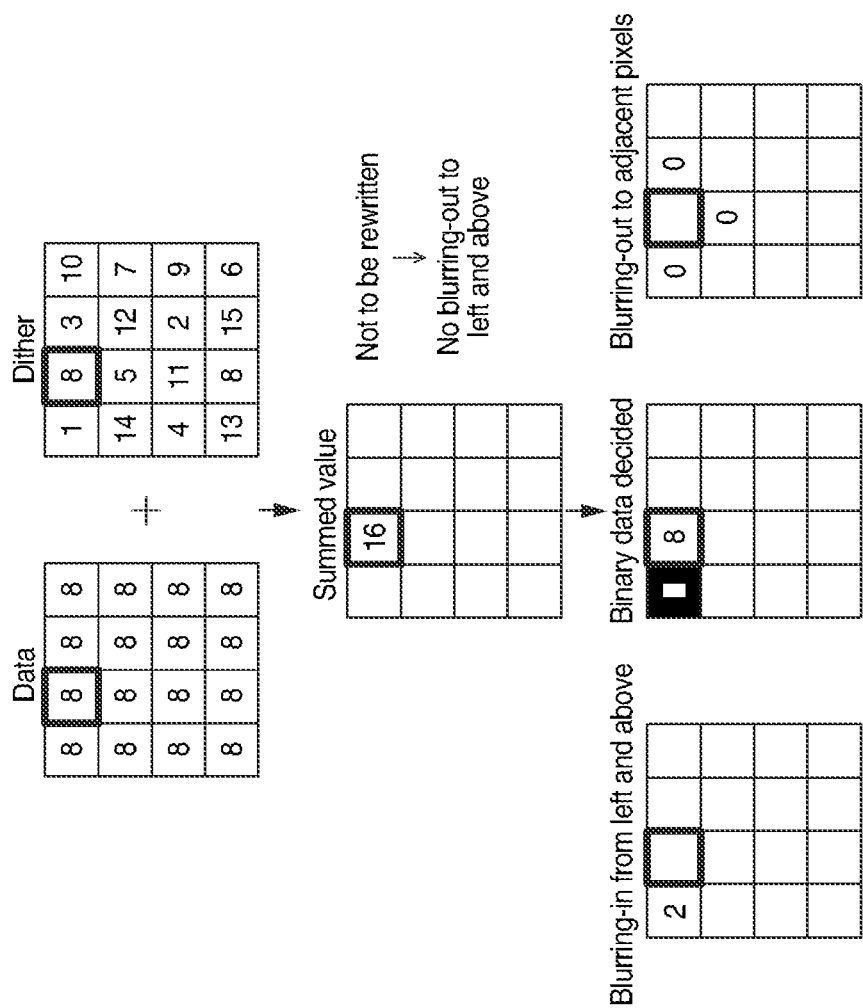
FIG. 11 shows a process executed in the example 1 when a pixel (2, 1) is a target pixel.

FIG. 11 shows processings performed when a pixel (2, 1) is the target pixel. The summed value A is acquired as follows:

$$A(2,1)=P(2,1)+M(2,1)=8+8=16$$

As A (2, 1)≥Th, the target pixel would be converted to a white pixel unless any correction processing is performed. In other words, the target pixel will not be rewritten (S101: NO). The blurring-in condition is satisfied for the pixel on the left (S105: YES). The blurring-in from the pixel on the left to the target pixel is equal to the blurring-out from the pixel on the left to the target pixel. Therefore, the correction value for blurring-in from the pixel on the left to the pixel (j, i) is equal to the correction value for blurring-out from the pixel ((j−1), i) to the pixel (j, i), in other words, R ((j−1), i). Similarly, the correction value for blurring-in from the pixel above to the pixel (j, i) is D (j, (i−1)). Therefore, the correction in step S106 is performed as follows.

$$A(2,1)=A(2,1)+D(2,0)+R(1,1)=16+0+2=18$$

It is noted that D (2, 0) indicates a correction value of a pixel that does not exist, but is set to zero for calculation.

At this moment, A (2, 1)≥Th, and therefore the pixel (2, 1) would be converted to a white pixel (S107). As the target pixel is not rewritten (S108: NO), the memories 272-275 will not be rewritten (zeros (0) as the correction values are shown in the pixels below, on the left and on the right of the target pixel in the figure).

Figure 12:
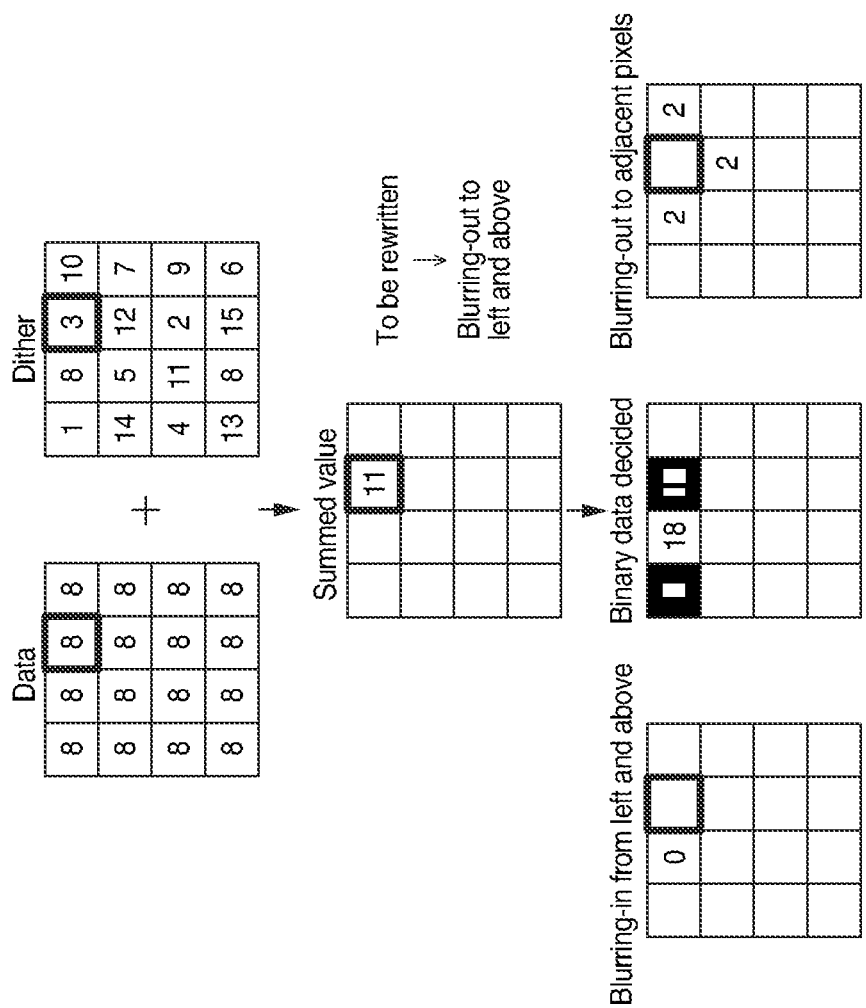
FIG. 12 shows a process executed in the example 1 when a pixel (3, 1) is a target pixel.

FIG. 12 shows processings performed when a pixel (3, 1) is the target pixel. The summed value A is acquired as follows:

$$A(3,1)=P(3,1)+M(3,1)=8+3=11$$

As A (3, 1)<Th, the target pixel would be converted to a black pixel unless any correction processing is performed. In other words, the target pixel would be rewritten (S101: YES). The blurring-out condition is satisfied for the pixel on the left. Therefore, the correction in step S103 is performed as follows.

$$A(3,1)=A(3,1)+Cb=11+2=13$$

Here, the blurring-in condition is satisfied for the pixel on the left (S105: YES). As no pixel exists above, the blurring-in condition is not satisfied. Therefore, the correction in step S106 is performed as follows.

$$A(3,1)=A(3,1)+D(3,0)+R(2,1)=13+0+0=13$$

At this moment, A (3, 1)<Th, and therefore the pixel (3, 1) would be converted to a black pixel. As the target pixel is rewritten (S108: YES), the memories 272-275 will be rewritten.

D (3, 1)=Cb=2
L (3, 1)=Cb=2
R (3, 1)=Cb=2

Figure 13:
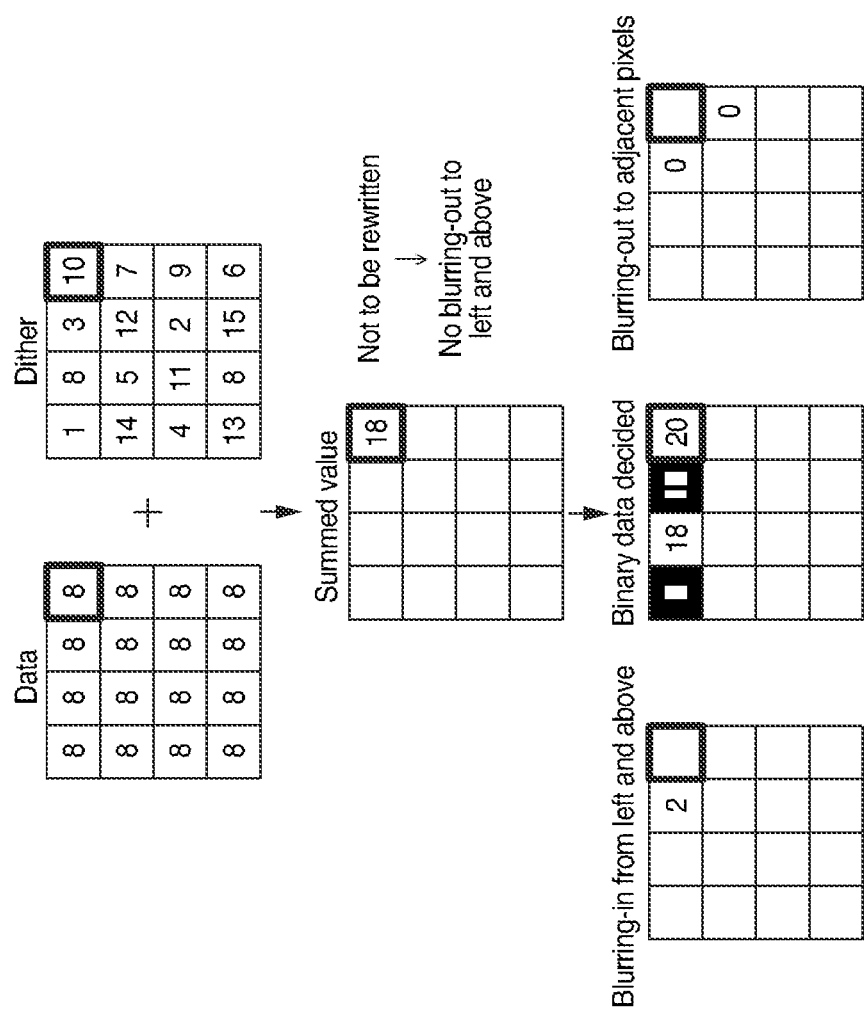
FIG. 13 shows a process executed in the example 1 when a pixel (4, 1) is a target pixel.

FIG. 13 shows processings performed when a pixel (4, 1) is the target pixel. The summed value A is acquired as follows:

$$A(4,1)=P(4,1)+M(4,1)=8+10=18$$

As A (4, 1)≥Th, the target pixel would be converted to a white pixel unless any correction processing is performed. In other words, the target pixel will not be rewritten (S101: NO). The blurring-in condition is satisfied for the pixel on the left (S105: YES). The correction in step S106 is performed as follows.

$$A(4,1)=A(4,1)+D(4,0)+R(3,1)=18+0+2=20$$

At this moment, since A (4, 1)≥Th, the pixel (4, 1) would be converted to a white pixel. As the target pixel is not rewritten (S108: NO), the memories 272-275 will not be rewritten.

Figure 14:
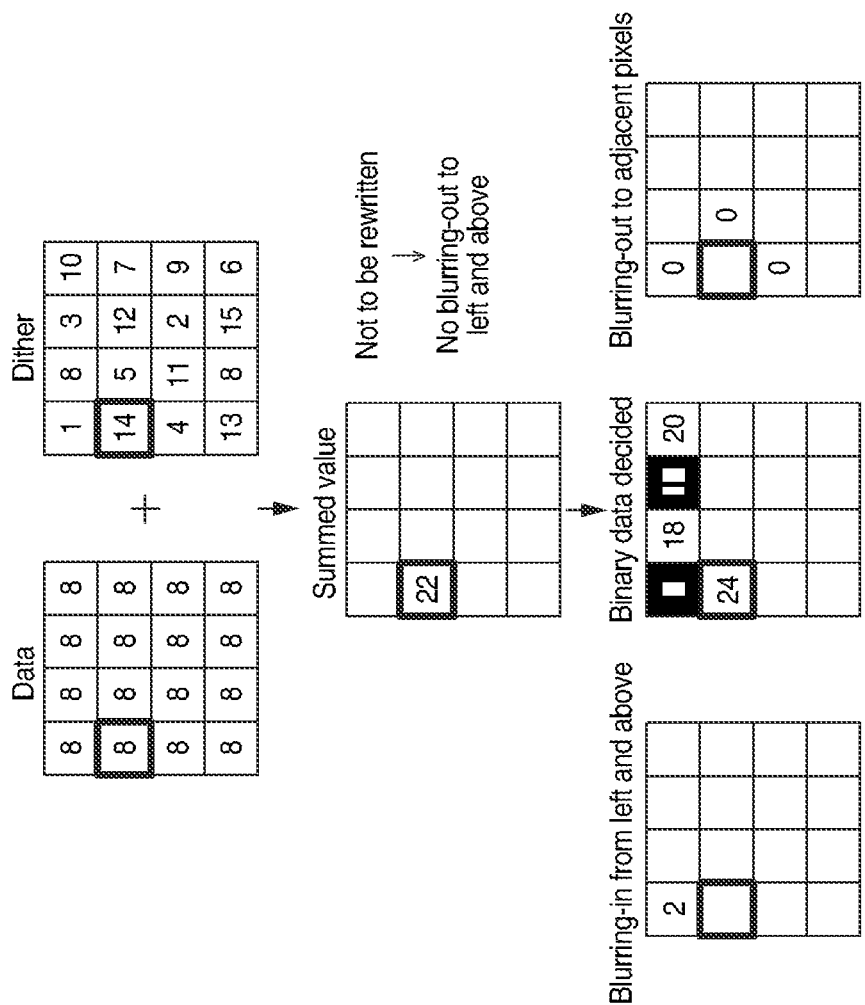
FIG. 14 shows a process executed in the example 1 when a pixel (1, 2) is a target pixel.

FIG. 14 shows processings performed when a pixel (1, 2) is the target pixel. The summed value A is acquired as follows:

$$A(1,2)=P(1,2)+M(1,2)=8+14=22$$

As A (1, 2)≥Th, the target pixel would be converted to a white pixel unless any correction processing is performed. In other words, the target pixel will not be rewritten (S101: NO). The blurring-in condition is satisfied for the pixel above (S105: YES). The correction in step S106 is performed as follows.

$$A(1,2)=A(1,2)+D(1,1)+R(0,2)=22+2+0=24$$

At this moment, A (1, 2)≥Th, and therefore the pixel (1, 2) would be converted to a white pixel. As the target pixel is not rewritten (S108: NO), the memories 272-275 will not be rewritten.

Figure 15:
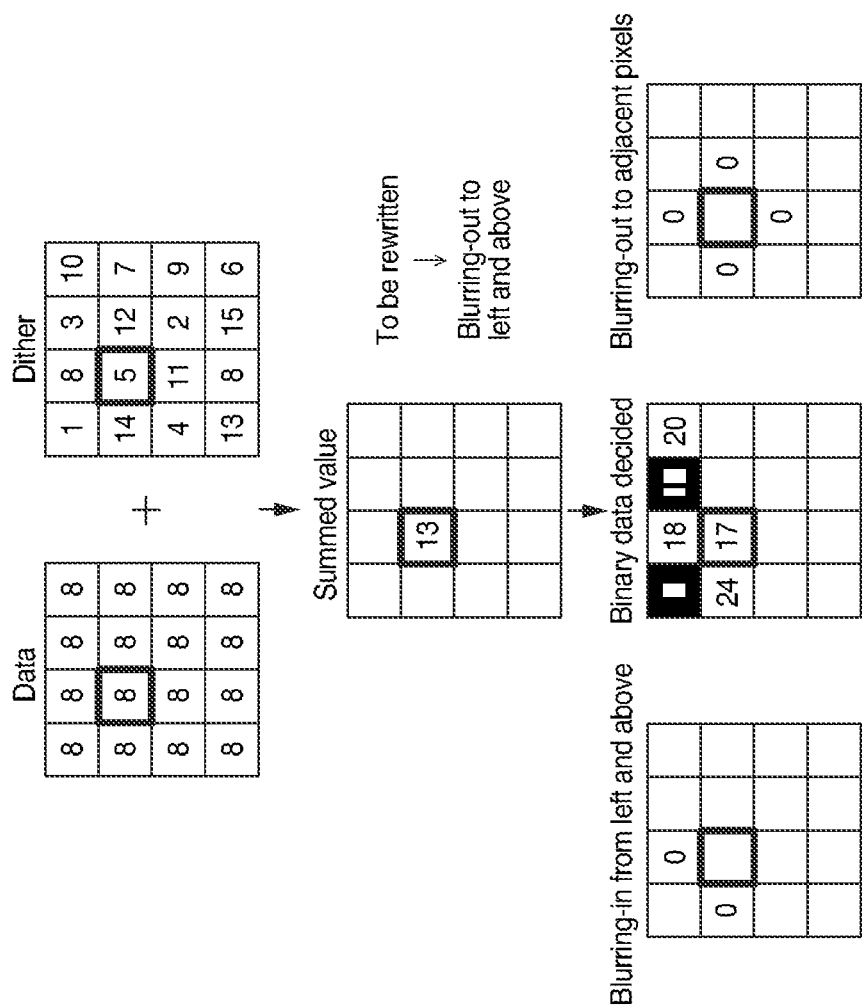
FIG. 15 shows a process executed in the example 1 when a pixel (2, 2) is a target pixel.

FIG. 15 shows processings performed when a pixel (2, 2) is the target pixel. The summed value A is acquired as follows:

$$A(2,2)=P(2,2)+M(2,2)=8+5=13$$

As A (2, 2)<Th, the target pixel would be converted to a black pixel unless any correction processing is performed. In other words, the target pixel would be rewritten (S101: YES). The blurring-out condition is satisfied for the pixels above and on the left. Therefore, the correction in step S103 is performed as follows.

$$A(2,2)=A(2,2)+Cb+Cb=13+2+2=17$$

The blurring-in condition is not satisfied for the pixels above and on the left (S105: NO). At this moment, A (2, 2)≥Th, and therefore the pixel (2, 2) would be converted to a white pixel. As the target pixel is not rewritten (S108: NO), the memories 272-275 will not be rewritten.

Figure 16:
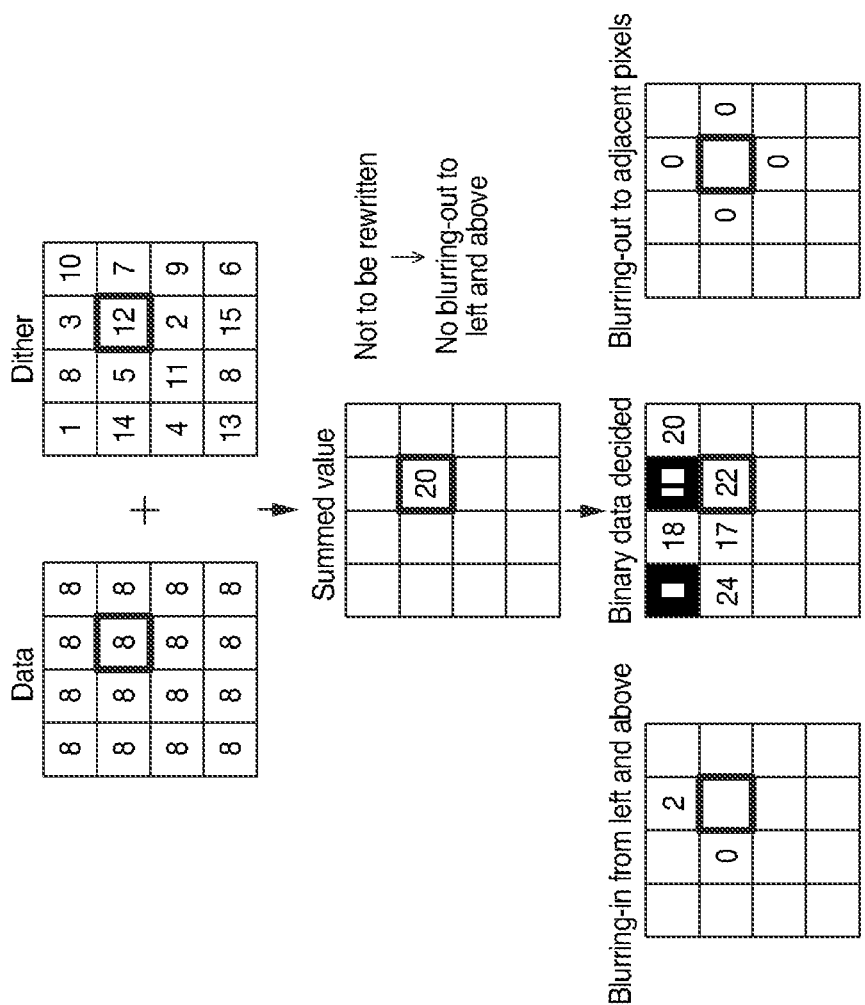
FIG. 16 shows a process executed in the example 1 when a pixel (3, 2) is a target pixel.

FIG. 16 shows processings performed when a pixel (3, 2) is the target pixel. The summed value A is acquired as follows:

$$A(3,2)=P(3,2)+M(3,2)=8+12=20$$

As A (3, 2)≥Th, the target pixel would be converted to a white pixel unless any correction processing is performed. In other words, the target pixel would not be rewritten (S101: NO). The blurring-in condition is satisfied for the pixel above (S105: YES). Therefore, the correction in step S106 is performed as follows.

$$A(3,2)=A(3,2)+D(3,1)+R(2,2)=22+2+0=24$$

At this moment, A (3, 2)≥Th, and therefore the pixel (3, 2) would be converted to a white pixel. As the target pixel is not rewritten (S108: NO), the memories 272-275 will not be rewritten.

Figure 17:
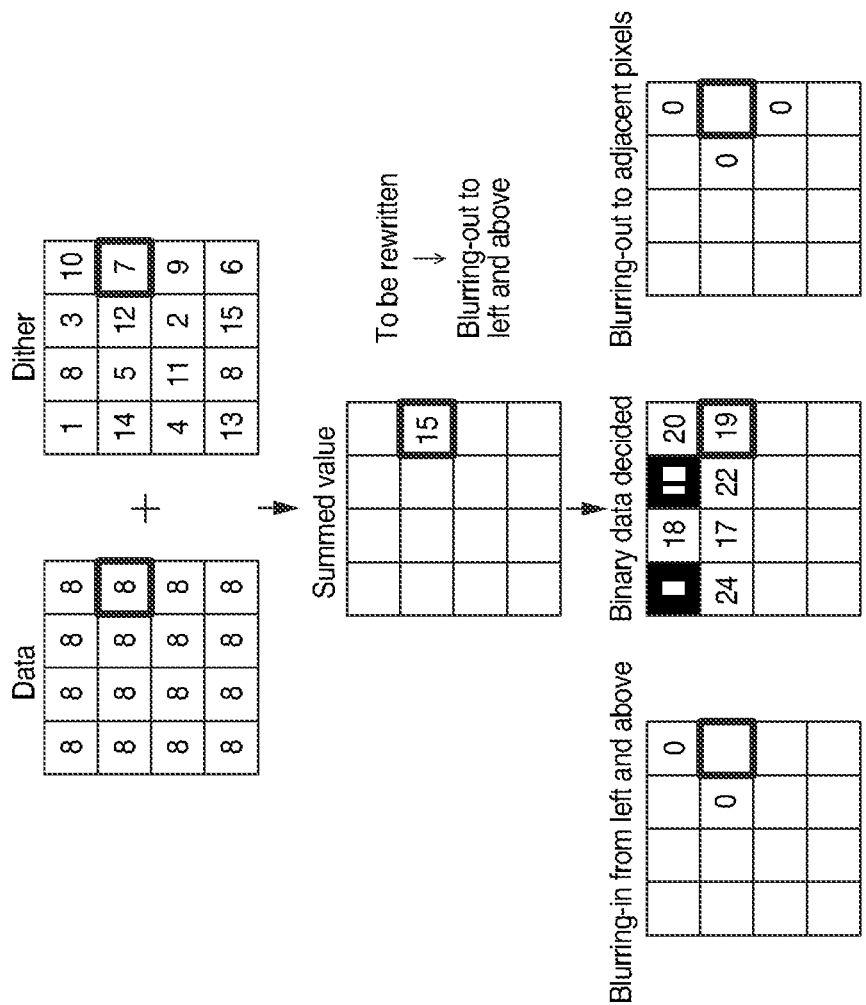
FIG. 17 shows a process executed in the example 1 when a pixel (4, 2) is a target pixel.

FIG. 17 shows processings performed when a pixel (4, 2) is the target pixel. The summed value A is acquired as follows:

$$A(4,2)=P(4,2)+M(4,2)=8+7=15$$

As A (4, 2)<Th, the target pixel would be converted to a black pixel unless any correction processing is performed. In other words, the target pixel would be rewritten (S101: YES). The blurring-out condition is satisfied for the pixels above and on the left. Therefore, the correction in step S103 is performed as follows.

$$A(4,2)=A(4,2)+Cb+Cb=15+2+2=19$$

The blurring-in condition is not satisfied for the pixels above and on the left. At this moment, A (4, 2)≥Th, and therefore the pixel (4, 2) will be converted to a white pixel. As the target pixel is not rewritten (S108: NO), the memories 272-275 will not be rewritten.

Figure 18:
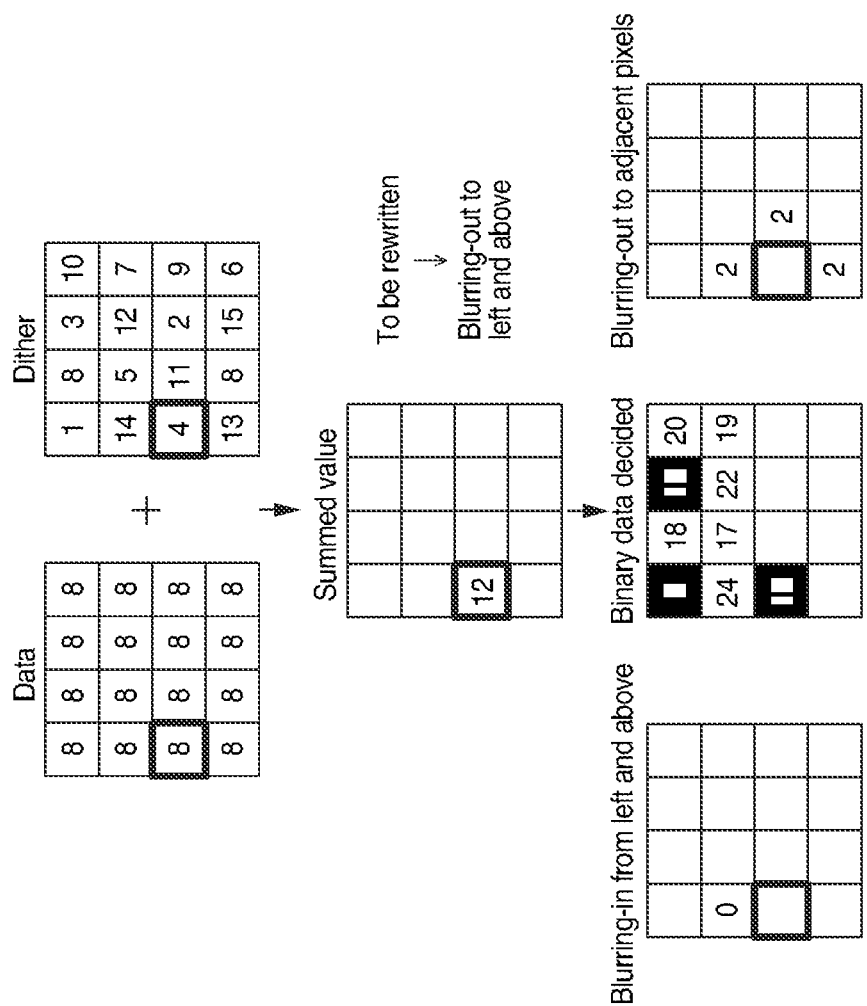
FIG. 18 shows a process executed in the example 1 when a pixel (1, 3) is a target pixel.

FIG. 18 shows processings performed when a pixel (1, 3) is the target pixel. The summed value A is acquired as follows:

$$A(1,3)=P(1,3)+M(1,3)=8+4=12$$

As A (1, 3)<Th, the target pixel would be converted to a black pixel unless any correction processing is performed. In other words, the target pixel would be rewritten (S101: YES). The blurring-out condition is judged to be satisfied for the pixel above. Therefore, the correction in step S103 is performed as follows.

$$A(1,3)=A(1,3)+Cb=12+2=14$$

The blurring-in condition is satisfied for the pixel above (S105: YES). The correction in step S106 is performed as follows.

$$A(1,3)=A(1,3)+D(1,2)+R(0,3)=14+0+0=14$$

At this moment, since A (1, 3)<Th, the pixel (1, 3) would be converted to a black pixel. As the target pixel is rewritten (S108: YES), the memories 272-275 will be rewritten.

U (1, 3)=Cb=2
D (1, 3)=Cb=2
R (1, 3)=Cb=2

Figure 19:
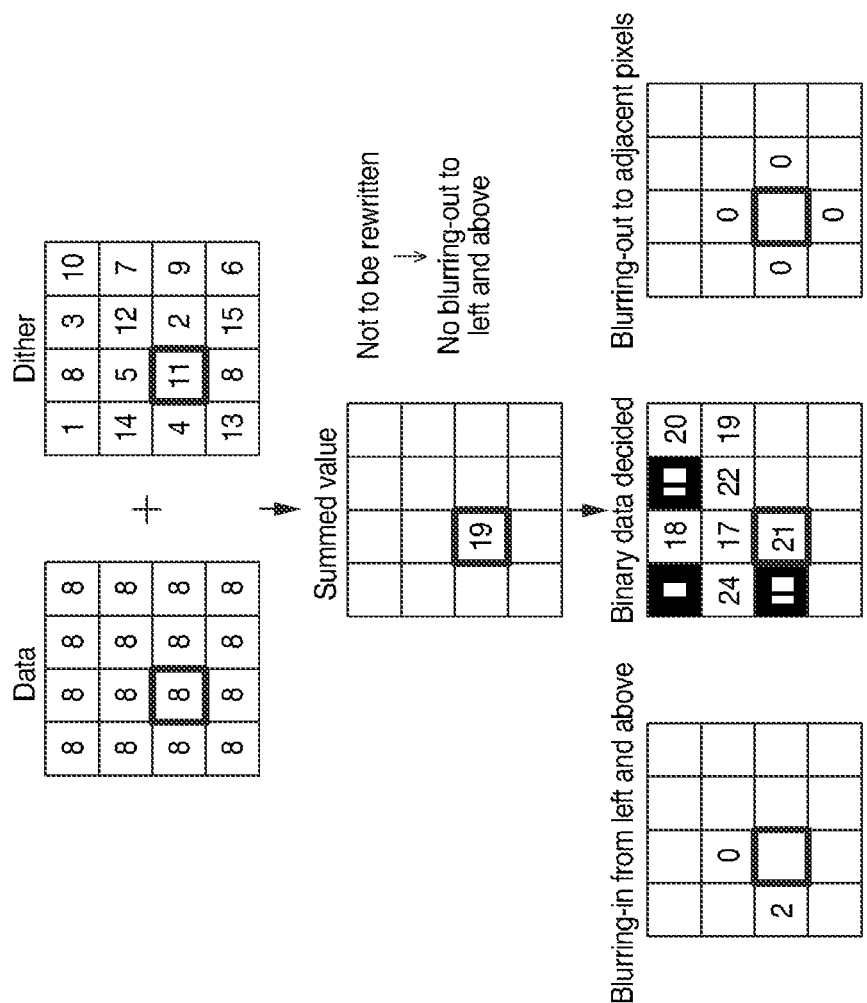
FIG. 19 shows a process executed in the example 1 when a pixel (2, 3) is a target pixel.

FIG. 19 shows processings performed when a pixel (2, 3) is the target pixel. The summed value A is acquired as follows:

$$A(2,3)=P(2,3)+M(2,3)=8+11=19$$

As A (2, 3)≥Th, the target pixel would be converted to a white pixel unless any correction processing is performed. In other words, the target pixel will not be rewritten (S101: NO). The blurring-in condition is satisfied for the pixel on the left (S105: YES). The correction in step S106 is performed as follows.

$$A(2,3)=A(2,3)+D(2,2)+R(1,3)=19+0+2=21$$

At this moment, A (2, 3)≥Th, and therefore the pixel (2, 3) would be converted to a white pixel. As the target pixel is not rewritten (S108: NO), the memories 272-275 will not be rewritten.

Figure 20:
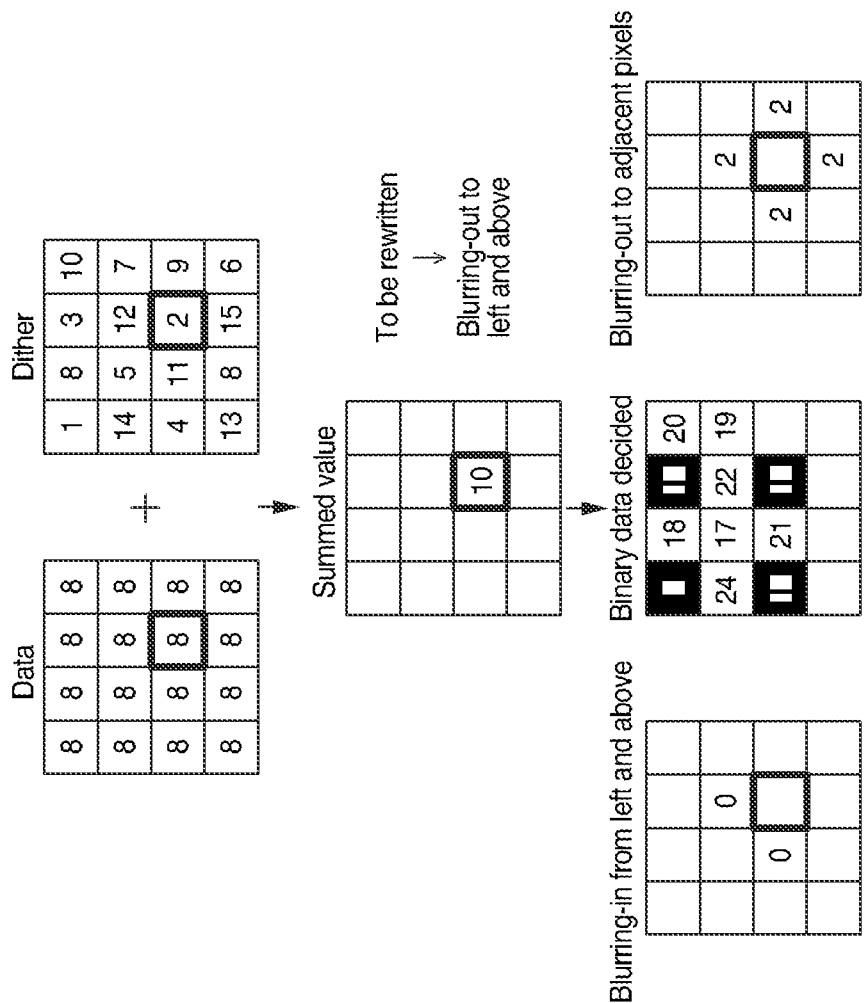
FIG. 20 shows a process executed in the example 1 when a pixel (3, 3) is a target pixel.

FIG. 20 shows processings performed when a pixel (3, 3) is the target pixel. The summed value A is acquired as follows:

$$A(3,3)=P(3,3)+M(3,3)=8+2=10$$

As A (3, 3)<Th, the target pixel would be converted to a black pixel unless any correction processing is performed. In other words, the target pixel would be rewritten (S101: YES). The blurring-out condition is satisfied for the pixels above and on the left (S102: YES). Therefore, the correction in step S103 is performed as follows.

$$A(3,3)=A(3,3)+Cb+Cb=10+2+2=14$$

The blurring-in condition is satisfied for the pixels above and on the left (S105: YES). The correction in step S106 is performed as follows.

$$A(3,3)=A(3,3)+D(3,2)+R(2,3)=14+0+0=14$$

At this moment, A (3, 3)<Th, and therefore the pixel (3, 3) would be converted to a black pixel. As the target pixel is rewritten (S108: YES), the memories 272-275 would be rewritten.

U (3, 3)=Cb=2
D (3, 3)=Cb=2
L (3, 3)=Cb=2
R (3, 3)=Cb=2

Figure 21:
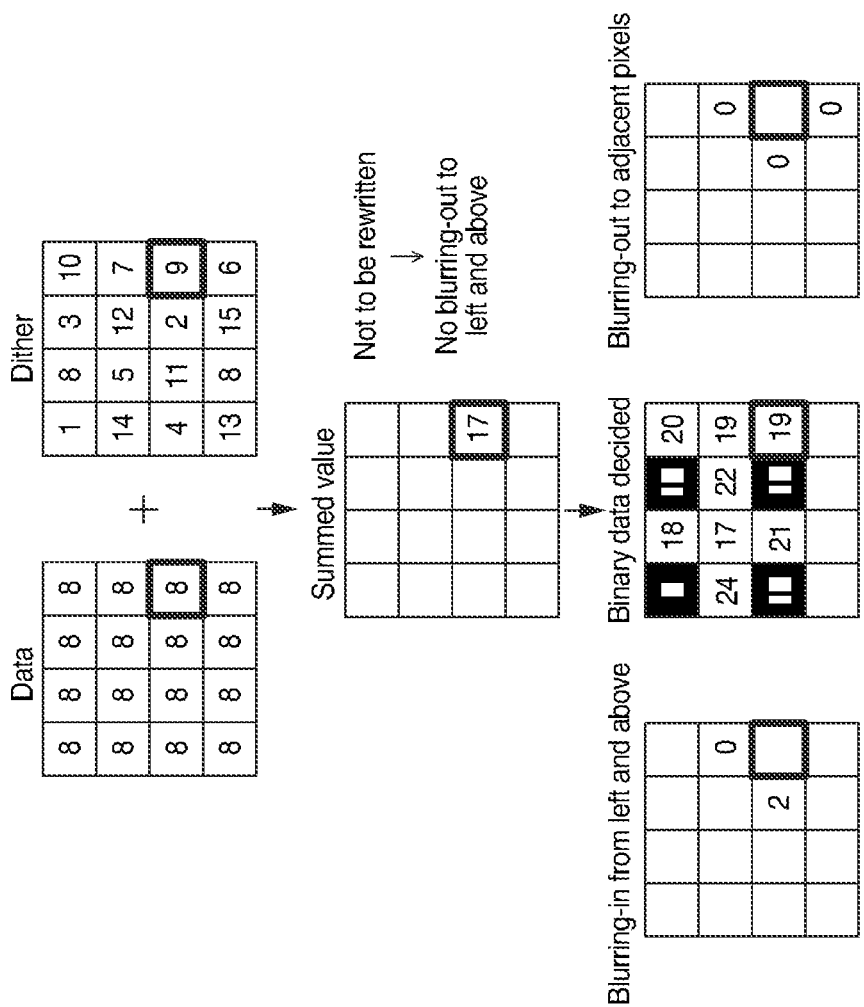
FIG. 21 shows a process executed in the example 1 when a pixel (4, 3) is a target pixel.

FIG. 21 shows processings performed when a pixel (4, 3) is the target pixel. The summed value A is acquired as follows:

$$A(4,3)=P(4,3)+M(4,3)=8+9=17$$

As A (4, 3)≥Th, the target pixel would be converted to a white pixel unless any correction processing is performed. In other words, the target pixel will not be rewritten (S101: NO). The blurring-in condition is satisfied for the pixel on the left (S105: YES). The correction in step S106 is performed as follows.

$$A(4,3)=A(4,3)+D(4,2)+R(3,3)=17+0+2=19$$

At this moment, A (4, 3)≥Th, and therefore the pixel (4, 3) would be converted to a white pixel. As the target pixel is not rewritten (S108: NO), the memories 272-275 will not be rewritten.

Figure 22:
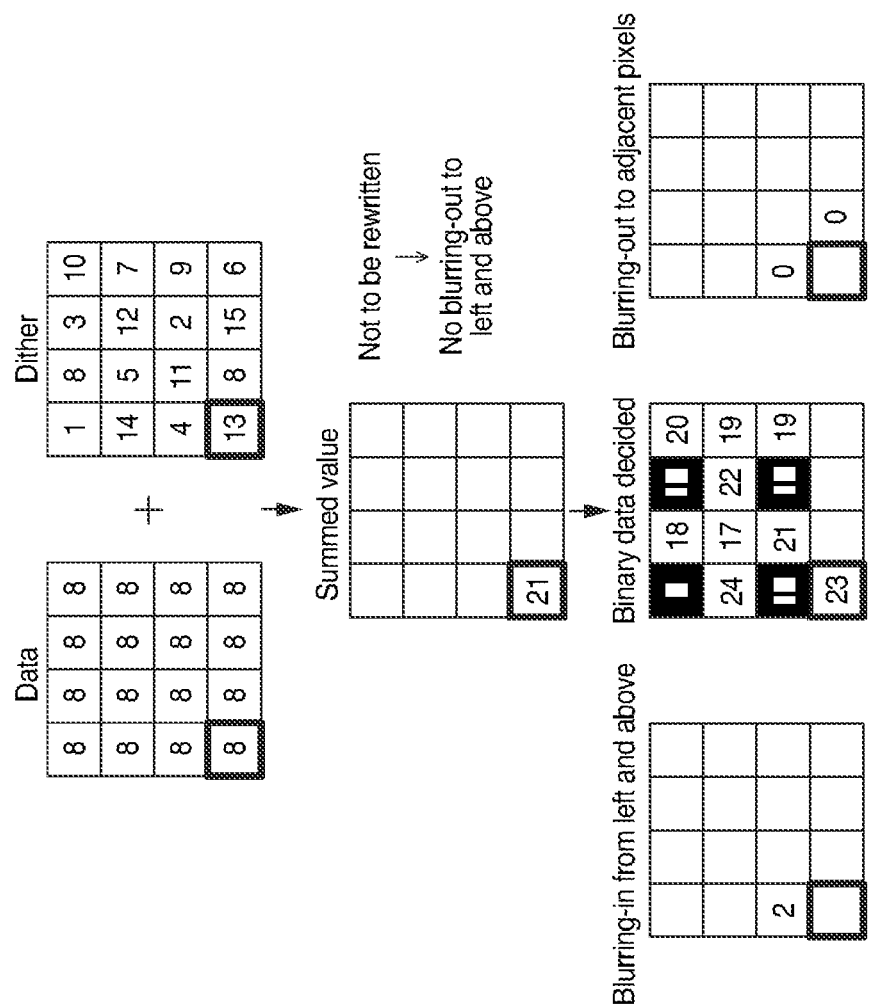
FIG. 22 shows a process executed in the example 1 when a pixel (1, 4) is a target pixel.

FIG. 22 shows processings performed when a pixel (1, 4) is the target pixel. The summed value A is acquired as follows:

$$A(1,4)=P(1,4)+M(1,4)=8+13=21$$

As A (1, 4)≥Th, the target pixel would be converted to a white pixel unless any correction processing is performed. In other words, the target pixel will not be rewritten (S101: NO). The blurring-in condition is satisfied for the pixel above (S105: YES). The correction in step S106 is performed as follows.

$$A(1,4)=A(1,4)+D(1,3)+R(0,4)=21+2+0=23$$

At this moment, A (1, 4)≥Th, and therefore the pixel (1, 4) would be converted to a white pixel. As the target pixel is not rewritten (S108: NO), the memories 272-275 will not be rewritten.

Figure 23:
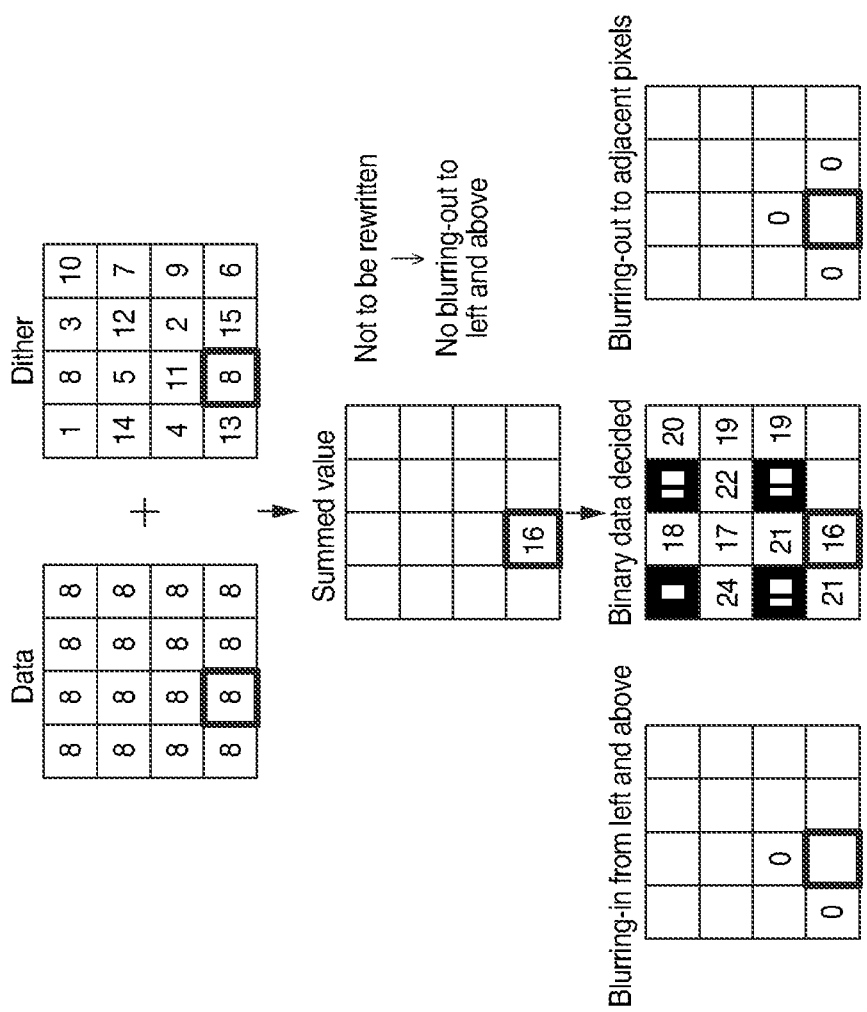
FIG. 23 shows a process executed in the example 1 when a pixel (2, 4) is a target pixel.

FIG. 23 shows processings performed when a pixel (2, 4) is the target pixel. The summed value A is acquired as follows:

$$A(2,4)=P(2,4)+M(2,4)=8+8=16$$

As A (2, 4)≥Th, the target pixel would be converted to a white pixel unless any correction processing is performed. In other words, the target pixel will not be rewritten (S101: NO). The blurring-in condition is not satisfied for the pixels above and on the left (S105: NO). At this moment, A (2, 4)≥Th, and therefore the pixel (2, 4) would be converted to a white pixel. As the target pixel is not rewritten (S108: NO), the memories 272-275 will not be rewritten.

Figure 24:
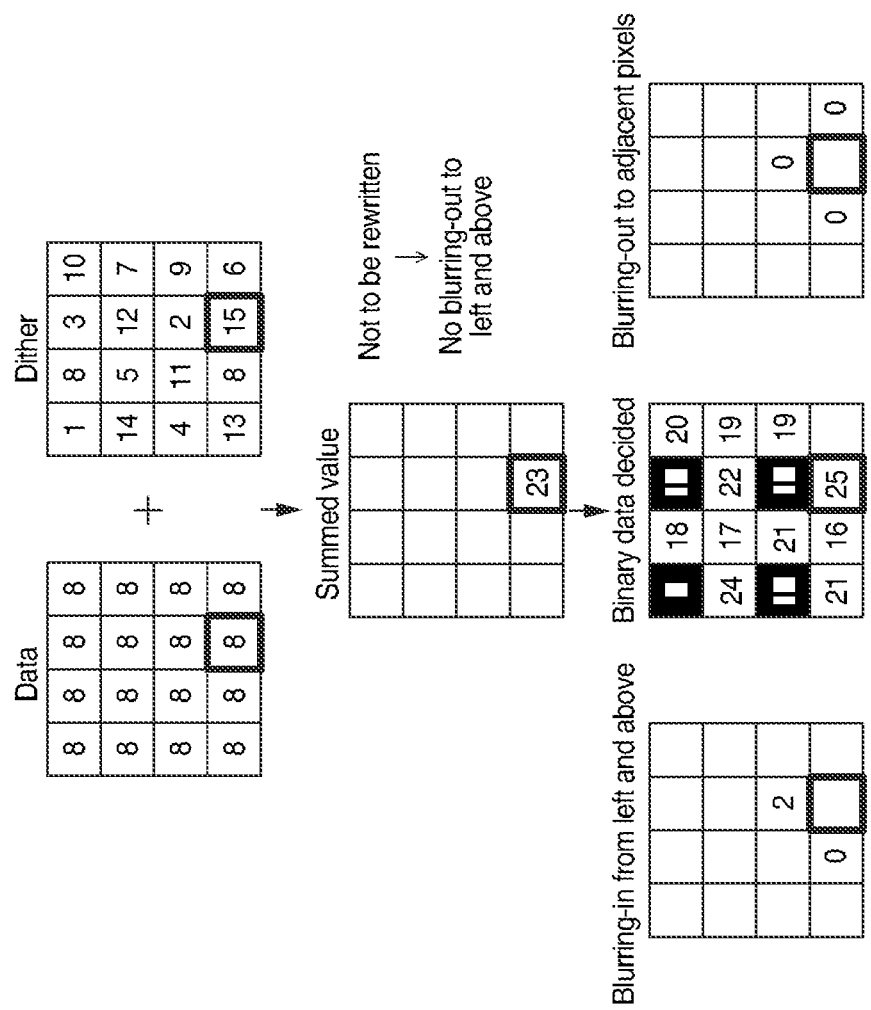
FIG. 24 shows a process executed in the example 1 when a pixel (3, 4) is a target pixel.

FIG. 24 shows processings performed when a pixel (3, 4) is the target pixel. The summed value A is acquired as follows:

$$A(3,4)=P(3,4)+M(3,4)=8+15=23$$

As A (3, 4)≥Th, the target pixel would be converted to a white pixel unless any correction processing is performed. In other words, the target pixel will not be rewritten (S101: NO). The blurring-in condition is satisfied for the pixel above (S105: YES). The correction in step S106 is performed as follows.

$$A(3,4)=A(3,4)+D(3,3)+R(2,4)=23+2+0=25$$

At this moment, A (3, 4)≥Th, and therefore the pixel (3, 4) would be converted to a white pixel. As the target pixel is not rewritten (S108: NO), the memories 272-275 will not be rewritten.

Figure 25:
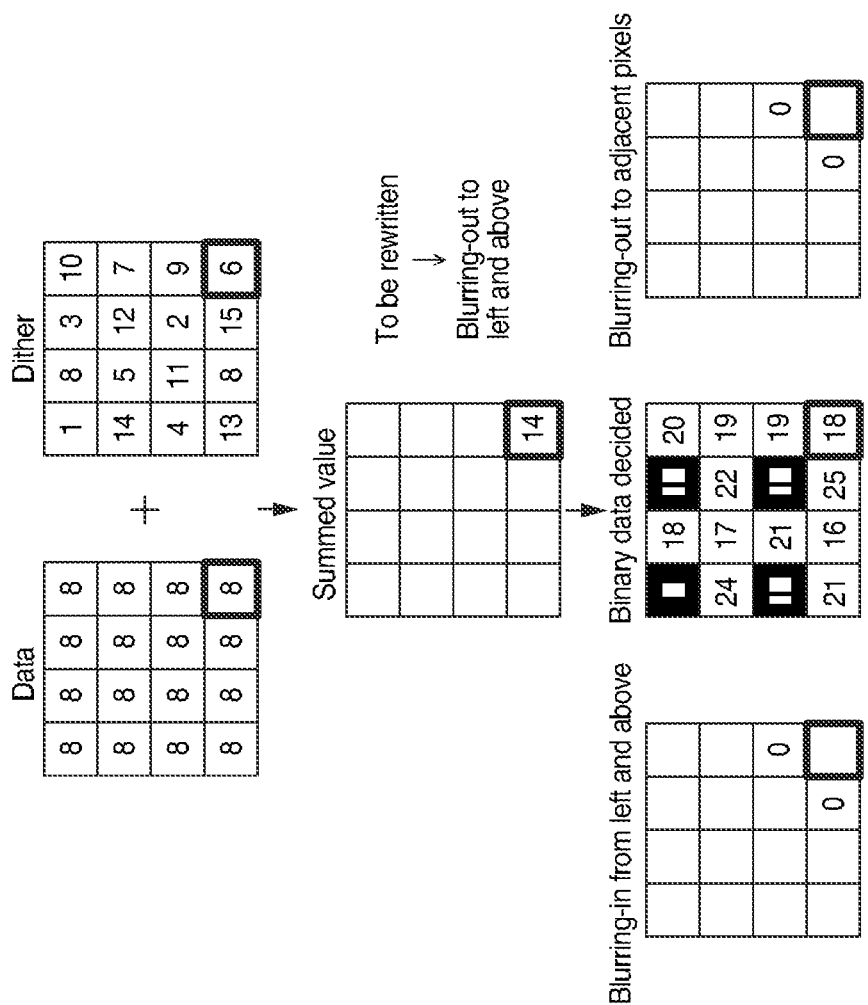
FIG. 25 shows a process executed in the example 1 when a pixel (4, 4) is a target pixel.

FIG. 25 shows processings performed when a pixel (4, 4) is the target pixel. The summed value A is acquired as follows:

$$A(4,4)=P(4,4)+M(4,4)=8+6=14$$

As A (4, 4)<Th, the target pixel would be converted to a black pixel unless any correction processing is performed. In other words, the target pixel would be rewritten (S101: YES). The blurring-in condition is satisfied for the pixels above and on the left (S102: YES). Therefore, the correction in step S103 is performed as follows.

$$A(4,4)=A(4,4)+Cb+Cb=14+2+2=18$$

The blurring-in condition is not satisfied for the pixels above and on the left (S105: NO).

At this moment, A (4, 4)≥Th, and therefore the pixel (4, 4) would be converted to a white pixel. As the target pixel is not rewritten (S108: NO), the memories 272-275 would be rewritten.

Figure 26:
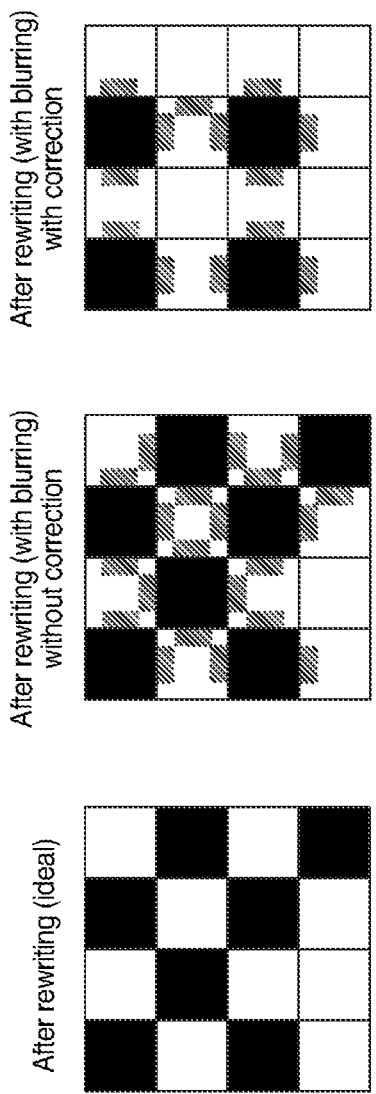
FIGS. 26A, 26B and 26C are views for comparing results obtained with the correction processing and without the correction processing.

FIGS. 26A, 26B and 26C are figures for comparing the results obtained with the correction processing and without the correction processing. FIG. 26A shows an ideal display image, FIG. 26B shows a display image obtained without the correction processing in accordance with the embodiment of the invention, and FIG. 26C shows a display image obtained with the correction processing in accordance with the embodiment of the invention. The present embodiment enables a color reduction process that takes the influence of blurring into consideration.

3-3. Process Example 2

Next, an example in which an all-black image is rewritten to an image with its entire pixels being in halftone (FIG. 7B) will be described. In the following example, the correction value Cw for correcting blurring-out from a white pixel to a black pixel is −2 (Cw=−2). Because black pixels that are affected by gradation blurring-out from white pixels appear whitish, the purpose of this correction is to make gradation values of pixels to become smaller in order to increase the probability of converting the pixels to black pixels. Also, in this example, at the time of starting the process, zeros are stored as correction values for the entire pixels in the memories 272-275. The state in which zeros are stored as correction values for the entire pixels in the memories 272-275 means that prior accumulation of blurring-out is zero. In other words, in this example, the summed value would not be changed even if the correction in step S104 is performed. Therefore, in this example, the description of the processing in step S104 is omitted.

Figure 27:
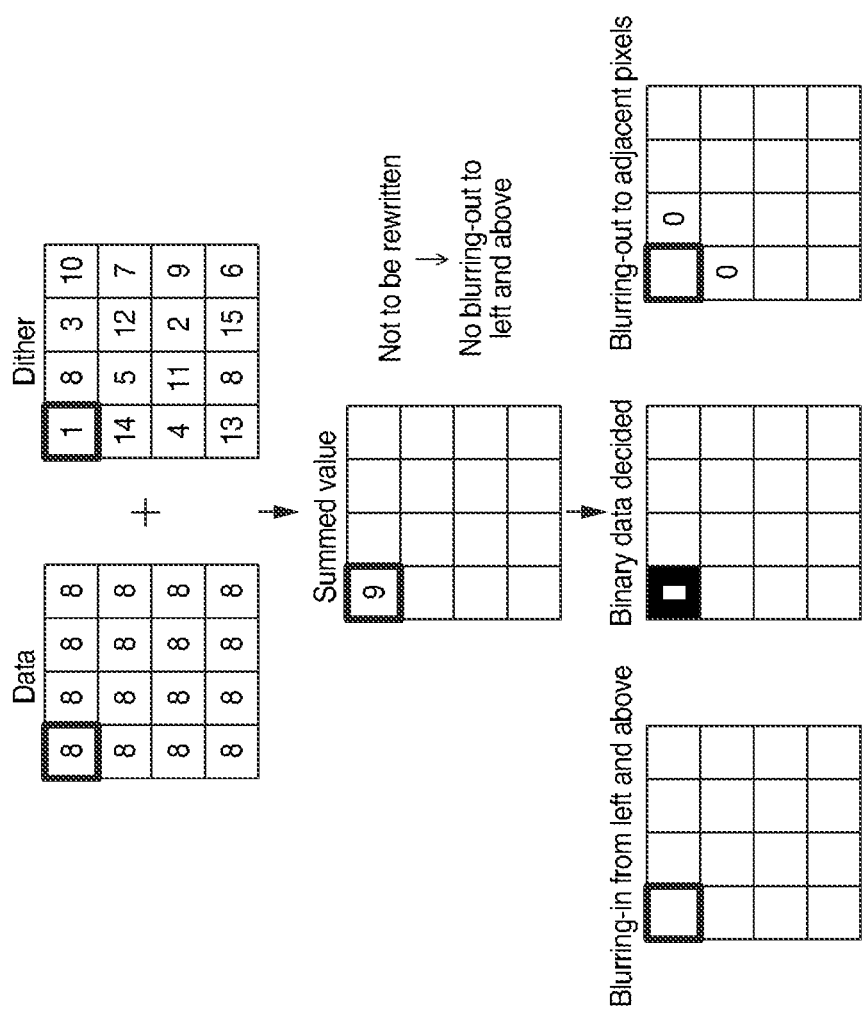
FIG. 27 shows a process executed in an example 2 when a pixel (1, 1) is a target pixel.

FIG. 27 shows processings performed when a pixel (1, 1) is the target pixel. The summed value A is acquired as follows:

$$A(1,1)=P(1,1)+M(1,1)=8+1=9$$

As A (1, 1)<Th, the target pixel would be converted to a black pixel unless any correction processing is performed. In other words, the target pixel would not be rewritten (S101: NO). As no pixel exists above or on the left of the target pixel, the blurring-in condition is not satisfied for the pixels above and on the left (S105: NO). At this moment, A (1, 1)<Th, and therefore the pixel (1, 1) would be converted to a black pixel. As the target pixel is not rewritten (S108: NO), the memories 272-275 would not be rewritten.

Figure 28:
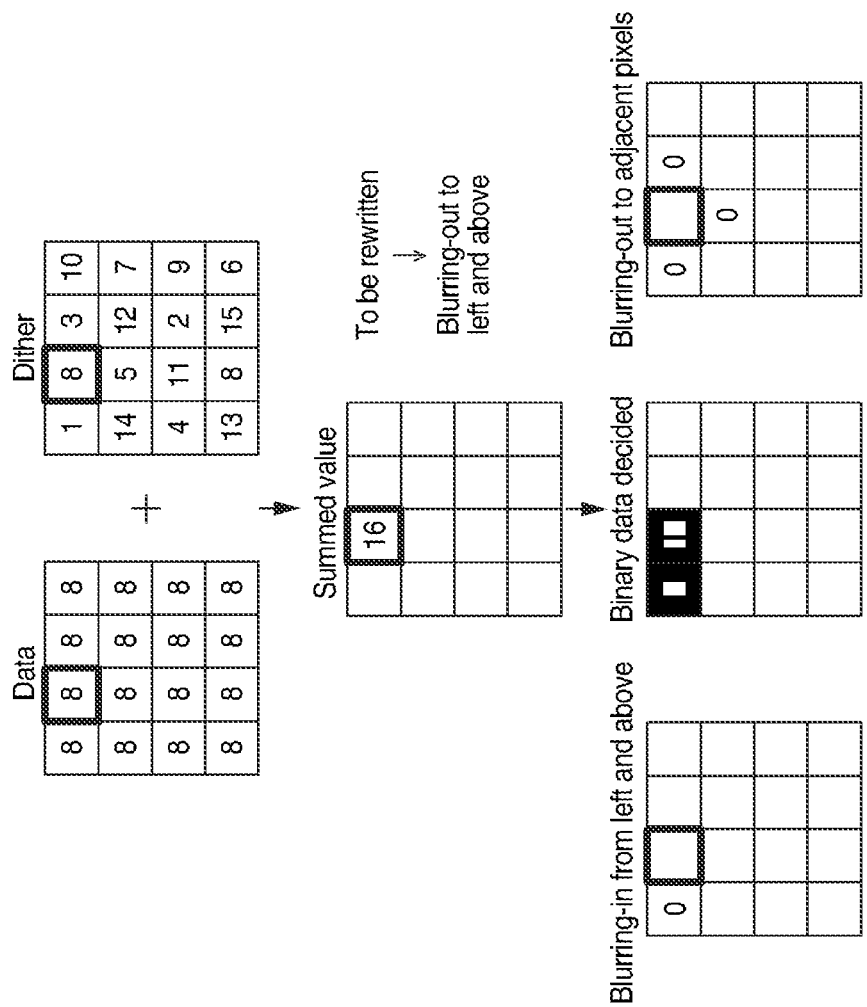
FIG. 28 shows a process executed in the example 2 when a pixel (2, 1) is a target pixel.

FIG. 28 shows processings performed when a pixel (2, 1) is the target pixel. The summed value A is acquired as follows:

$$A(2,1)=P(2,1)+M(2,1)=8+8=16$$

As A (2, 1)≥Th, the target pixel would be converted to a white pixel unless any correction processing is performed. In other words, the target pixel will be rewritten (S101: YES). It is judged that the blurring-out condition is not satisfied for the pixel above as such a pixel does not exist. The blurring-out condition for the pixel on the left is judged to be satisfied (S102: YES). Accordingly, the blurring-out to the pixel on the left is corrected with respect to the summed value A (2, 1) (step S103). The summed value is corrected as follows.

$$A(2,1)=A(2,1)+Cw=16-2=14$$

Here, the blurring-in condition is not satisfied for the pixels on the left and above (S105: NO). At this moment, A (2, 1)<Th, and therefore the pixel (2, 1) would be converted to a black pixel. As the target pixel is not rewritten (S108: NO), the memories 272-275 will not be rewritten.

Figure 29:
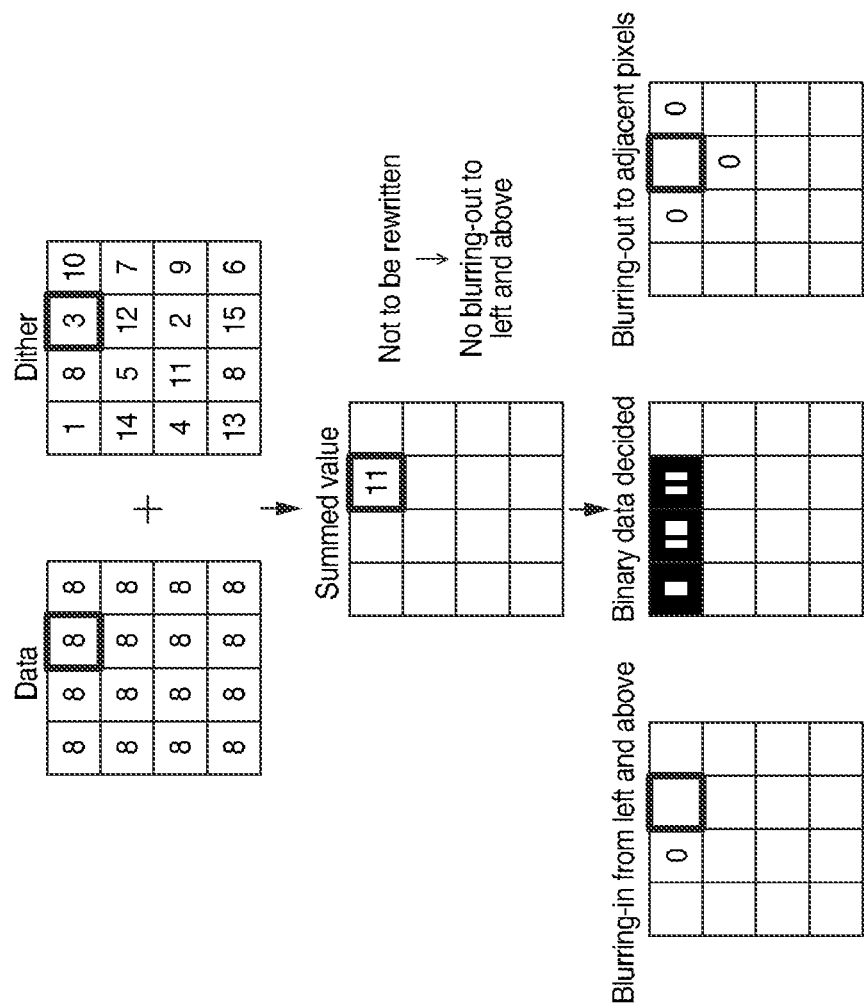
FIG. 29 shows a process executed in the example 2 when a pixel (3, 1) is a target pixel.

FIG. 29 shows processings performed when a pixel (3, 1) is the target pixel. The summed value A is acquired as follows:

$$A(3,1)=P(3,1)+M(3,1)=8+3=11$$

As A (3, 1)<Th, the target pixel would be converted to a black pixel unless any correction processing is performed. In other words, the target pixel will not be rewritten (S101: NO). The blurring-in condition is satisfied for the pixels on the left and above (S105: NO). At this moment, A (3, 1)<Th, and therefore the pixel (3, 1) would be converted to a black pixel. As the target pixel is not rewritten (S108: NO), the memories 272-275 will not be rewritten.

Figure 30:
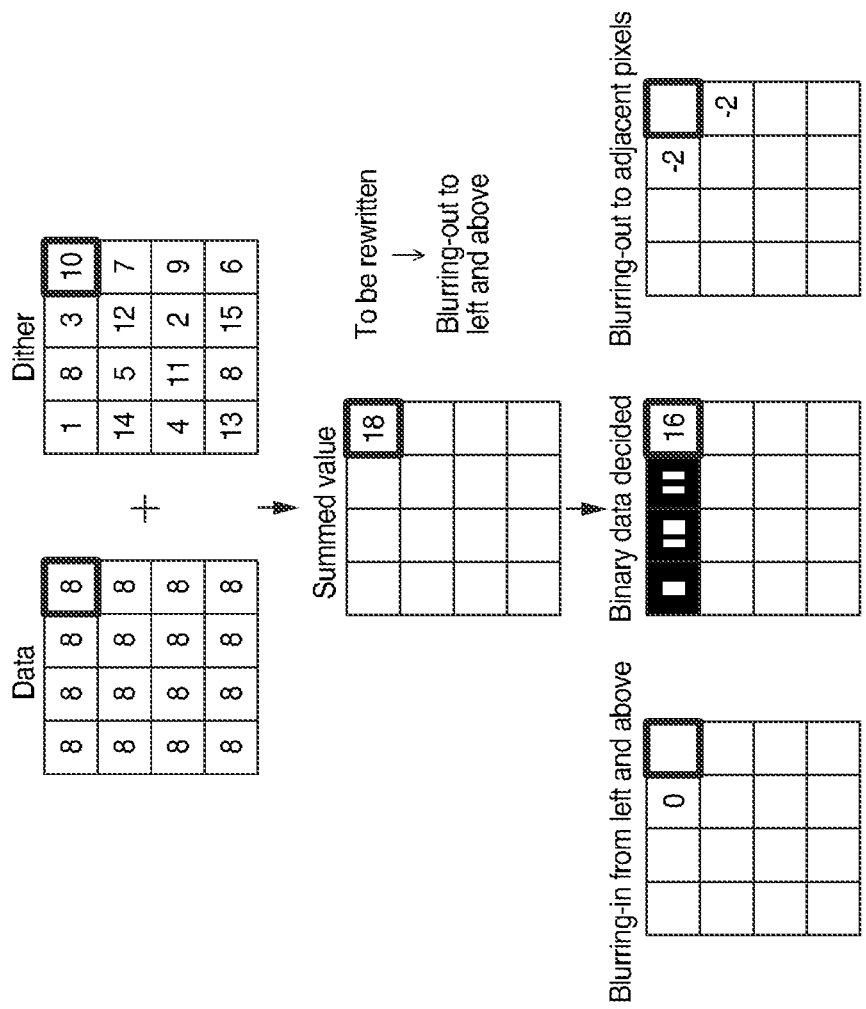
FIG. 30 shows a process executed in the example 2 when a pixel (4, 1) is a target pixel.

FIG. 30 shows processings performed when a pixel (4, 1) is the target pixel. The summed value A is acquired as follows:

$$A(4,1)=P(4,1)+M(4,1)=8+10=18$$

As A (4, 1)≥Th, the target pixel would be converted to a white pixel unless any correction processing is performed. In other words, the target pixel would be rewritten (S101: YES). It is judged that the blurring-out condition is not satisfied for the pixel above as such a pixel does not exist. It is judged that the blurring-out condition is satisfied for the pixel on the left (S102: YES). Accordingly, the blurring-out to the pixel on the left is corrected with respect to the summed value A (4, 1) (step S103). The summed value is corrected as follows.

$$A(4,1)=A(4,1)+Cw=18+(-2)=16$$

Here, the blurring-in condition is satisfied for the pixel on the left (S105: YES). As no pixel exists above, the blurring-in condition is not satisfied. Therefore, the correction in step S106 is performed as follows.

$$A(4,1)=A(4,1)+D(4,0)+R(3,1)=16+0+0=16$$

At this moment, A (4, 1)≥Th, and therefore the pixel (4, 1) would be converted to a white pixel. As the target pixel is rewritten (S108: YES), the memories 272-275 will be rewritten.

L (4, 1)=Cw=−2

D (4, 1)=Cw=−2

Figure 31:
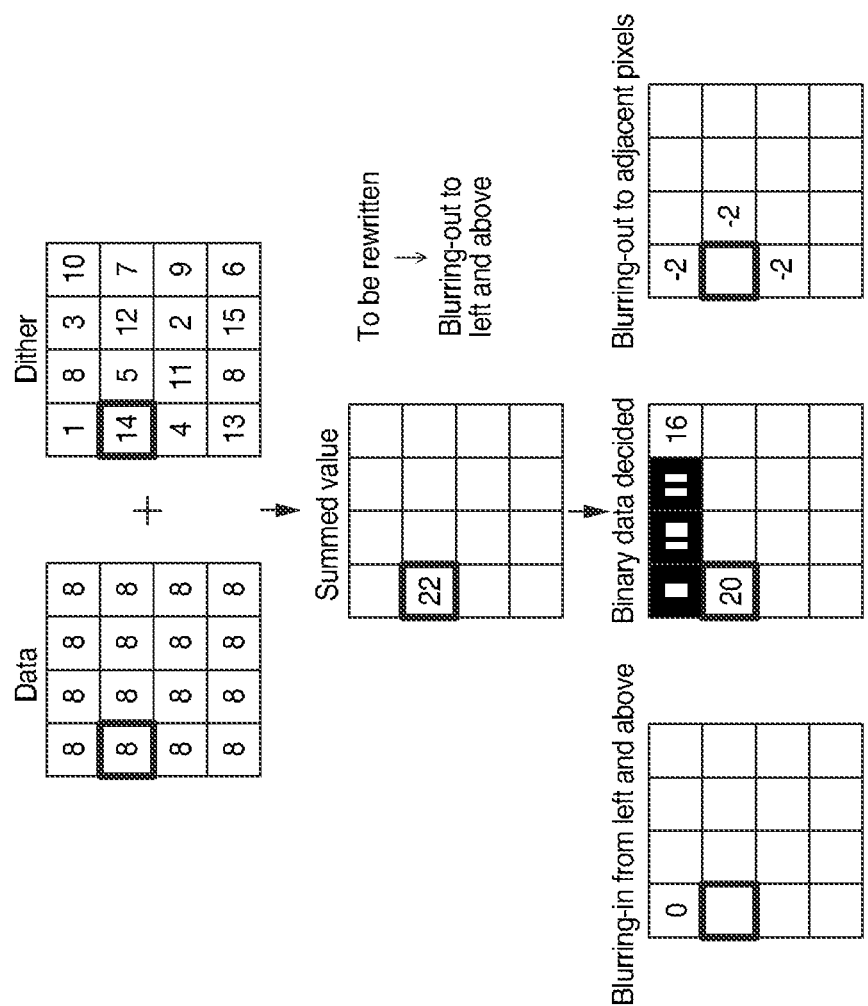
FIG. 31 shows a process executed in the example 2 when a pixel (1, 2) is a target pixel.

FIG. 31 shows processings performed when a pixel (1, 2) is the target pixel. The summed value A is acquired as follows:

$$A(1,2)=P(1,2)+M(1,2)=8+14=22$$

As A (1, 2)≥Th, the target pixel would be converted to a white pixel unless any correction processing is performed. In other words, the target pixel would be rewritten (S101: YES). It is judged that the blurring-out condition is not satisfied for the pixel on the left as such a pixel does not exist. It is judged that the blurring-out condition is satisfied for the pixel above (S102: YES). Accordingly, the blurring-out to the pixel above is corrected with respect to the summed value A (1, 2) (step S103). The summed value is corrected as follows.

$A(1,2)=A(1,2)+Cw=22-2=20$

Here, the blurring-in condition is satisfied for the pixel above (S105: YES). As no pixel exists on the left, the blurring-in condition is not satisfied. Therefore, the correction in step S106 is performed as follows.

$A(1,2)=A(1,2)+D(1,1)+R(0,2)=20+0+0=20$

At this moment, A (1, 2)≥Th, and therefore the pixel (1, 2) would be converted to a white pixel. As the target pixel is rewritten (S108: YES), the memories 272-275 will be rewritten.

U (1, 2)=Cw=−2
D (1, 2)=Cw=−2
R (1, 2)=Cw=−2

Figure 32:
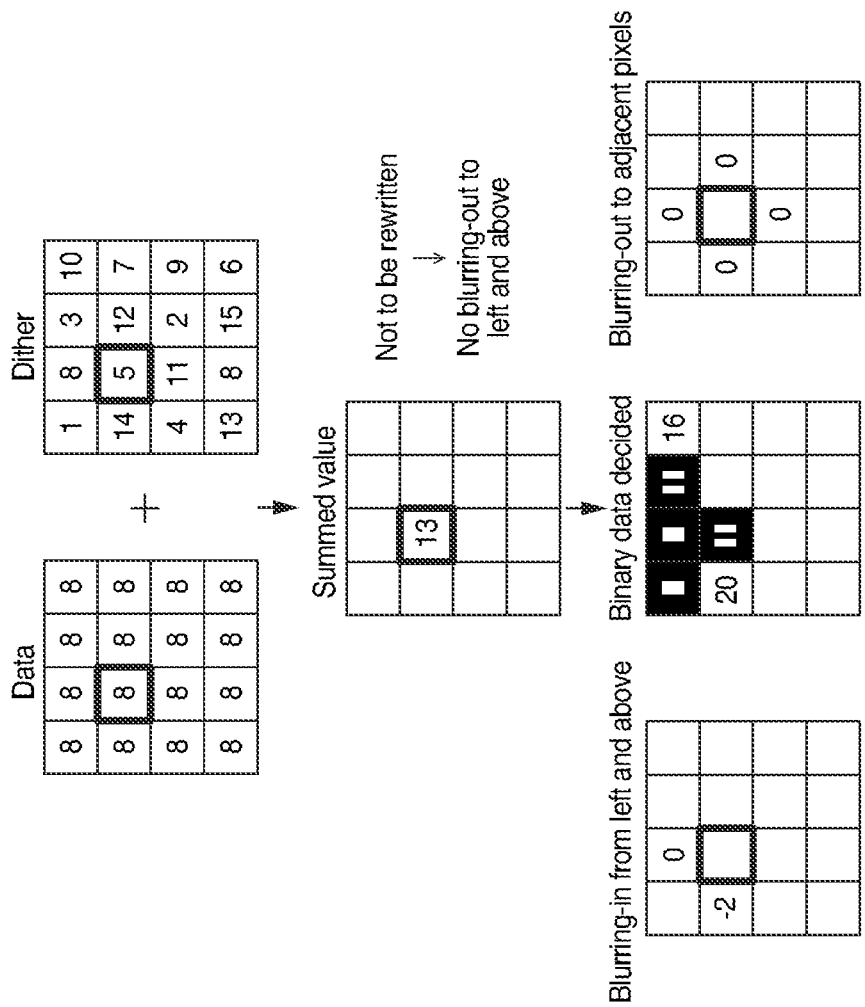
FIG. 32 shows a process executed in the example 2 when a pixel (2, 2) is a target pixel.

FIG. 32 shows processings performed when a pixel (2, 2) is the target pixel. The summed value A is acquired as follows:

$A(2,2)=P(2,2)+M(2,2)=8+5=13$

As A (2, 2)<Th, the target pixel would be converted to a black pixel unless any correction processing is performed. In other words, the target pixel would not be rewritten (S101: NO). Here, the blurring-out condition is satisfied for the pixel on the left (S105: YES). Therefore, the correction in step S103 is performed as follows.

$A(2,2)=A(2,2)+D(2,1)+R(1,2)=13+0-2=11$

At this moment, A (2, 2)<Th, and therefore the pixel (2, 2) will be converted to a black pixel. As the target pixel is not rewritten (S108: NO), the memories 272-275 will not be rewritten.

Figure 33:
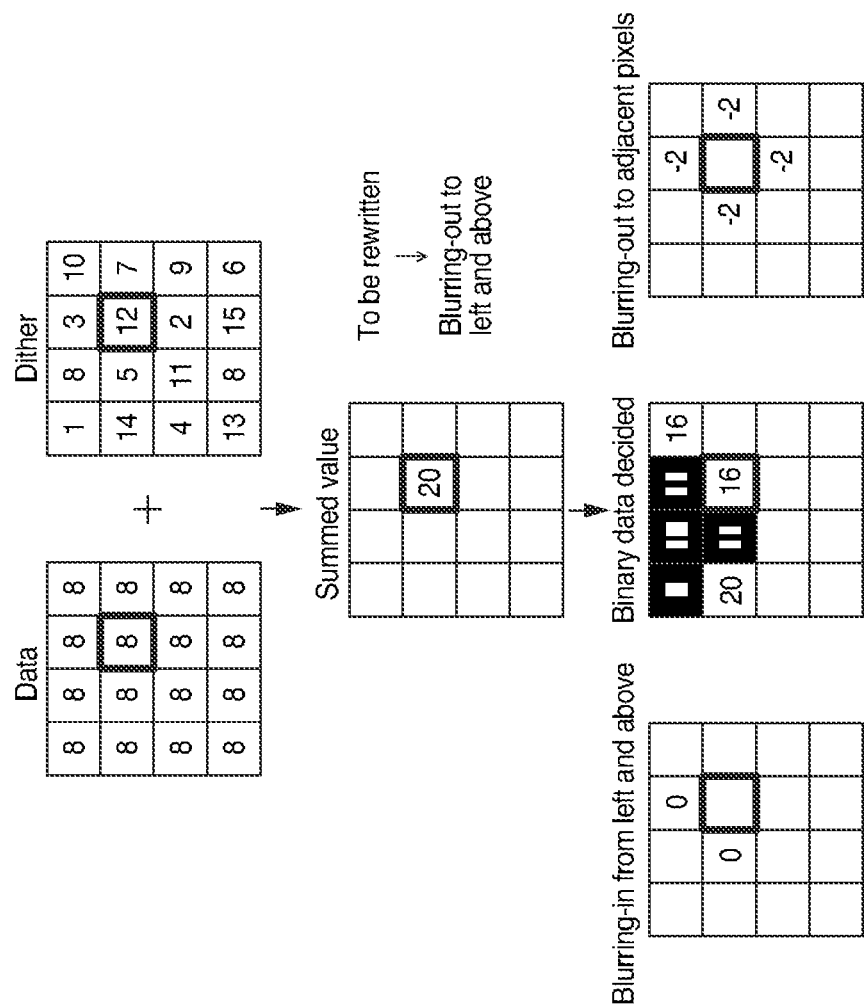
FIG. 33 shows a process executed in the example 2 when a pixel (3, 2) is a target pixel.

FIG. 33 shows processings performed when a pixel (3, 2) is the target pixel. The summed value A is acquired as follows:

$A(3,2)=P(3,2)+M(3,2)=8+12=20$

As A (3, 2)≥Th, the target pixel would be converted to a white pixel unless any correction processing is performed. In other words, the target pixel would be rewritten (S101: YES). It is judged that the blurring-out condition is satisfied for the pixels above and on the left (S102: YES). Accordingly, the blurring-out to the pixel above and on the left is corrected with respect to the summed value A (3, 2) (step S103). The summed value is corrected as follows.

$A(3,2)=A(3,2)+Cw+Cw=20-2-2=16$

Here, the blurring-in condition is satisfied for the pixels above and on the left (S105: YES). Therefore, the correction in step S106 is performed as follows.

$A(3,2)=A(3,2)+D(3,1)+R(2,2)=16+0+0=16$

At this moment, A (3, 2)≥Th, and therefore the pixel (3, 2) would be converted to a white pixel. As the target pixel is rewritten (S108: YES), the memories 272-275 will be rewritten.

U (3, 2)=Cw=−2
D (3, 2)=Cw=−2
L (3, 2)=Cw=−2
R (3, 2)=Cw=−2

Figure 34:
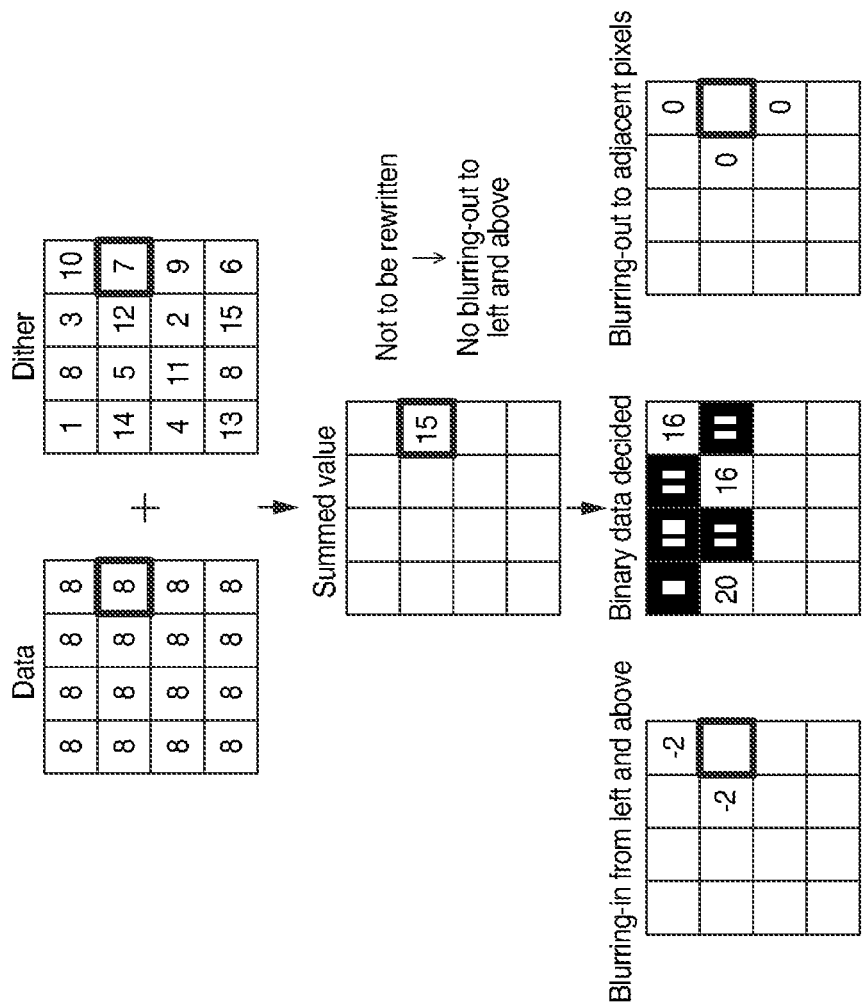
FIG. 34 shows a process executed in the example 2 when a pixel (4, 2) is a target pixel.

FIG. 34 shows processings performed when a pixel (4, 2) is the target pixel. The summed value A is acquired as follows:

$A(4,2)=P(4,2)+M(4,2)=8+7=15$

As A (4, 2)<Th, the target pixel would be converted to a black pixel unless any correction processing is performed. In other words, the target pixel would not be rewritten (S101: NO). Here, the blurring-in condition is satisfied for the pixels above and on the left (S105: YES). Accordingly, the correction in step S106 is performed as follows.

$A(4,2)=A(4,2)+D(4,1)+R(3,2)=15-2-2=11$

At this moment, A (4, 2)<Th, and therefore the pixel (4, 2) would be converted to a black pixel. As the target pixel is not rewritten (S108: NO), the memories 272-275 will not be rewritten.

Figure 35:
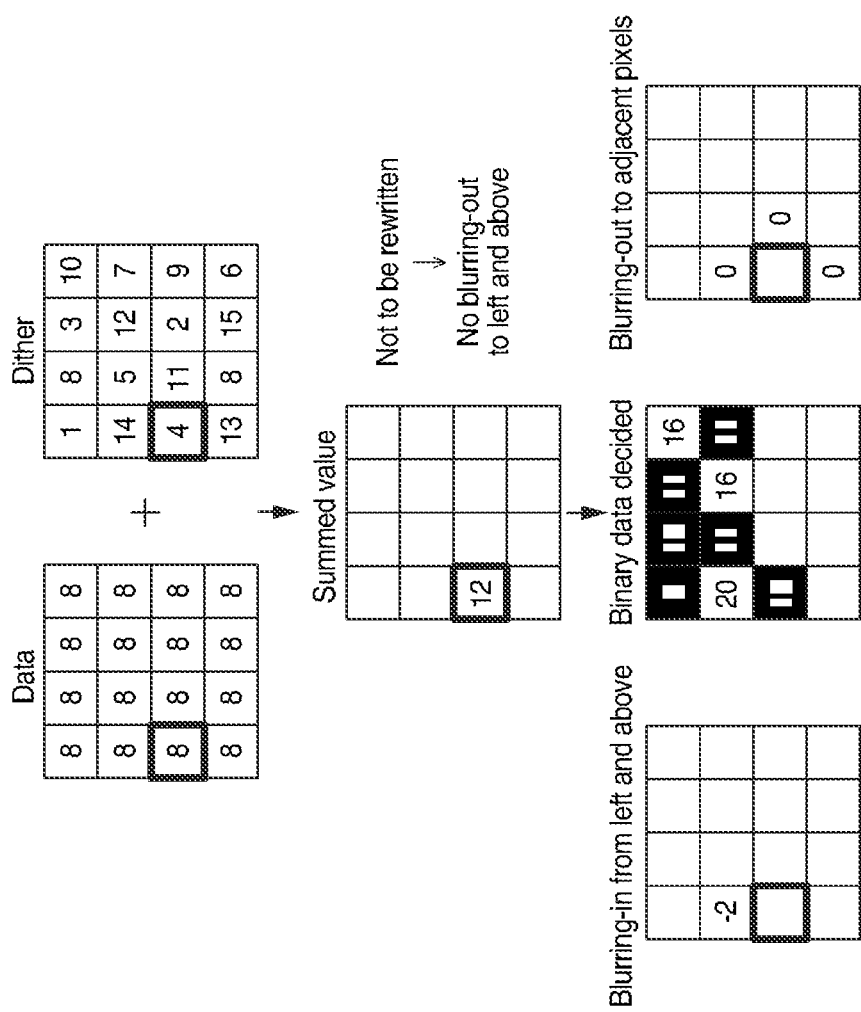
FIG. 35 shows a process executed in the example 2 when a pixel (1, 3) is a target pixel.

FIG. 35 shows processings performed when a pixel (1, 3) is the target pixel. The summed value A is acquired as follows:

$A(1,3)=P(1,3)+M(1,3)=8+4=12$

As A (1, 3)<Th, the target pixel would be converted to a black pixel unless any correction processing is performed. In other words, the target pixel would not be rewritten (S101: NO). Here, the blurring-in condition is satisfied for the pixels above and on the left (S105: YES). Accordingly, the correction in step S106 is performed as follows.

$A(1,3)=A(1,3)+D(1,2)+R(0,3)=12-2+0=10$

At this moment, A (1, 3)<Th, and therefore the pixel (1, 3) would be converted to a black pixel. As the target pixel is not rewritten (S108: NO), the memories 272-275 will not be rewritten.

Figure 36:
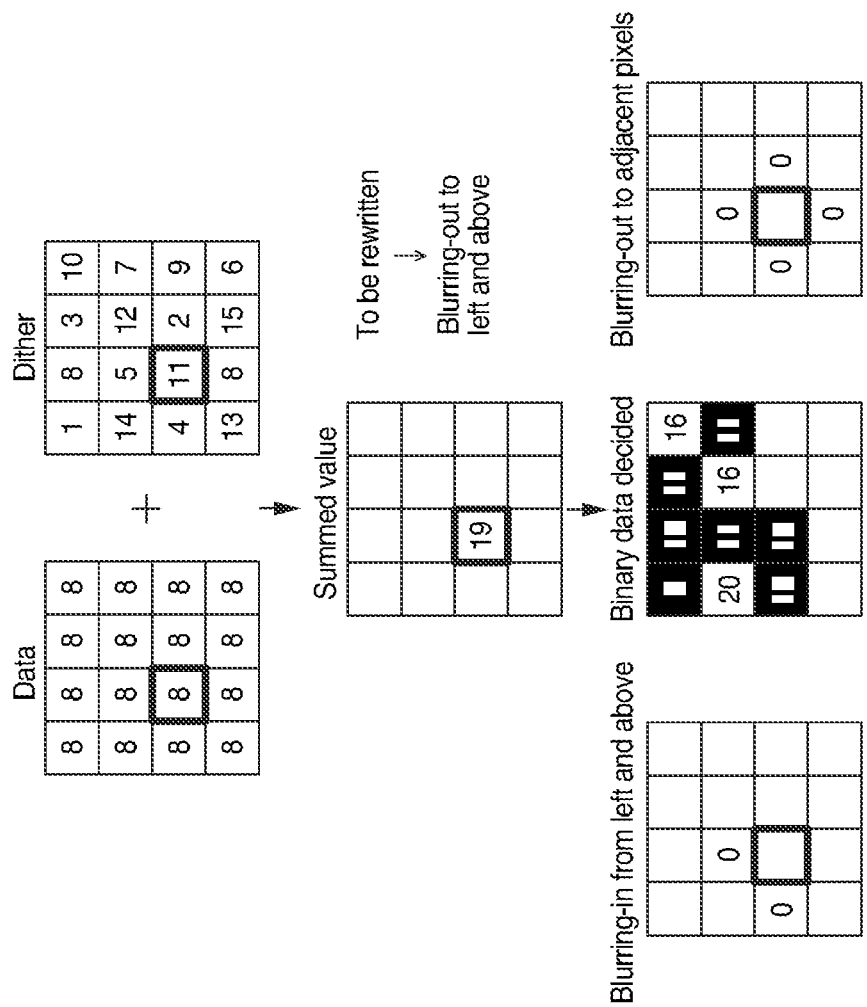
FIG. 36 shows a process executed in the example 2 when a pixel (2, 3) is a target pixel.

FIG. 36 shows processings performed when a pixel (2, 3) is the target pixel. The summed value A is acquired as follows:

$A(2,3)=P(2,3)+M(2,3)=8+11=19$

As A (2, 3)≥Th, the target pixel would be converted to a white pixel unless any correction processing is performed. In other words, the target pixel would be rewritten (S101: YES). It is judged that the blurring-out condition is satisfied for the pixels above and on the left (S102: YES). Accordingly, the blurring-out to the pixels above and on the left is corrected with respect to the summed value A (2, 3) (step S103). The summed value is corrected as follows.

$A(2,3)=A(2,3)+Cw+Cw=19-2-2=15$

Here, the blurring-in condition is not satisfied for the pixels above and on the left (S105: NO). At this moment, A (2, 3)<Th, and therefore the pixel (2, 3) would be converted to a black pixel. As the target pixel is not rewritten (S108: NO), the memories 272-275 will not be rewritten.

Figure 37:
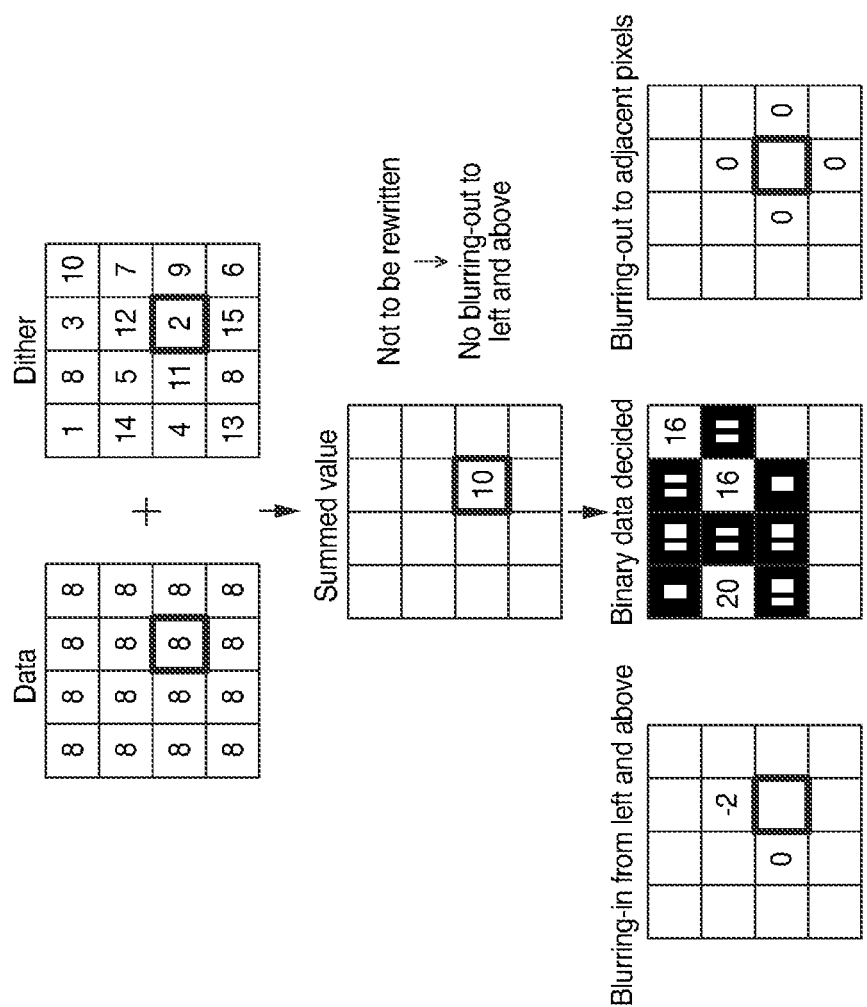
FIG. 37 shows a process executed in the example 2 when a pixel (3, 3) is a target pixel.

FIG. 37 shows processings performed when a pixel (3, 3) is the target pixel. The summed value A is acquired as follows:

$A(3,3)=P(3,3)+M(3,3)=8+2=10$

As A (3, 3)<Th, the target pixel would be converted to a black pixel unless any correction processing is performed. In other words, the target pixel would not be rewritten (S101: NO). Here, the blurring-in condition is satisfied for the pixel above (S105: YES). Accordingly, the correction in step S106 is performed as follows.

$A(3,3)=A(3,3)+D(3,2)+R(2,3)=10-2+0=8$

At this moment, A (3, 3)<Th, and therefore the pixel (3, 3) would be converted to a black pixel. As the target pixel is not rewritten (S108: NO), the memories 272-275 will not be rewritten.

Figure 38:
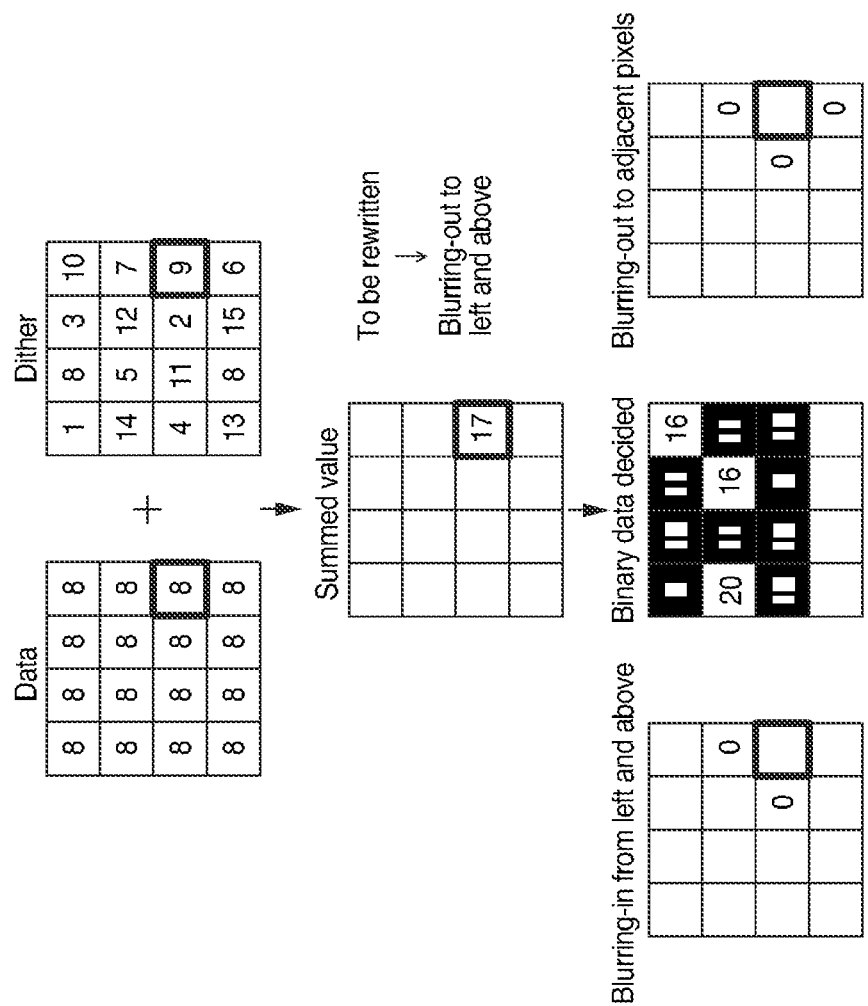
FIG. 38 shows a process executed in the example 2 when a pixel (4, 3) is a target pixel.

FIG. 38 shows processings performed when a pixel (4, 3) is the target pixel. The summed value A is acquired as follows:

$A(4,3)=P(4,3)+M(4,3)=8+9=17$

As A (4, 3)≥Th, the target pixel would be converted to a white pixel unless any correction processing is performed. In other words, the target pixel would be rewritten (S101: YES). The blurring-out condition is satisfied for the pixels above and on the left (S102: YES). Accordingly, the blurring-out to the pixels above and on the left is corrected with respect to the summed value A (4, 3) (step S103). The summed value is corrected as follows.

$$A(4,3)=A(4,3)+Cw+Cw=17-2-2=13$$

Here, the blurring-in condition is not satisfied for the pixels above and on the left (S105: NO). At this moment, A (4, 3)<Th, and therefore the pixel (4, 3) would be converted to a black pixel. As the target pixel is not rewritten (S108: NO), the memories 272-275 will not be rewritten.

Figure 39:
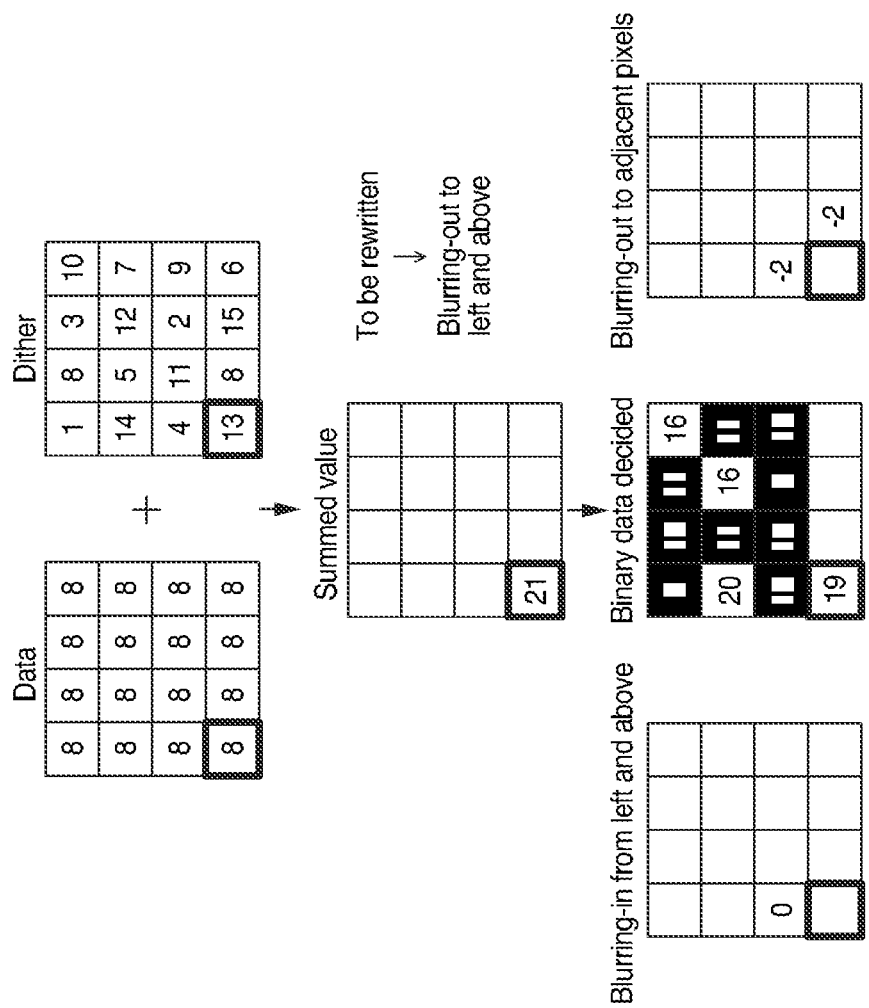
FIG. 39 shows a process executed in the example 2 when a pixel (1, 4) is a target pixel.

FIG. 39 shows processings performed when a pixel (1, 4) is the target pixel. The summed value A is acquired as follows:

$$A(1,4)=P(1,4)+M(1,4)=8+13=21$$

As A (1, 4)≥Th, the target pixel would be converted to a white pixel unless any correction processing is performed. In other words, the target pixel would be rewritten (S101: YES). The blurring-out condition is satisfied for the pixel above (S102: YES). Accordingly, the correction is made in step S103 as follows.

$$A(1,4)=A(1,4)+Cw=21-2=19$$

Here, the blurring-in condition is satisfied for the pixel above (S105: YES). The correction is made in step S106 as follows.

$$A(1,4)=A(1,4)+D(1,3)+R(0,4)=19+0+0=19$$

At this moment, A (1, 4)≥Th, and therefore the pixel (1, 4) would be converted to a white pixel. As the target pixel is rewritten (S108: YES), the memories 272-275 will be rewritten.

U (1, 4)=Cw=−2
D (1, 4)=Cw=−2

Figure 40:
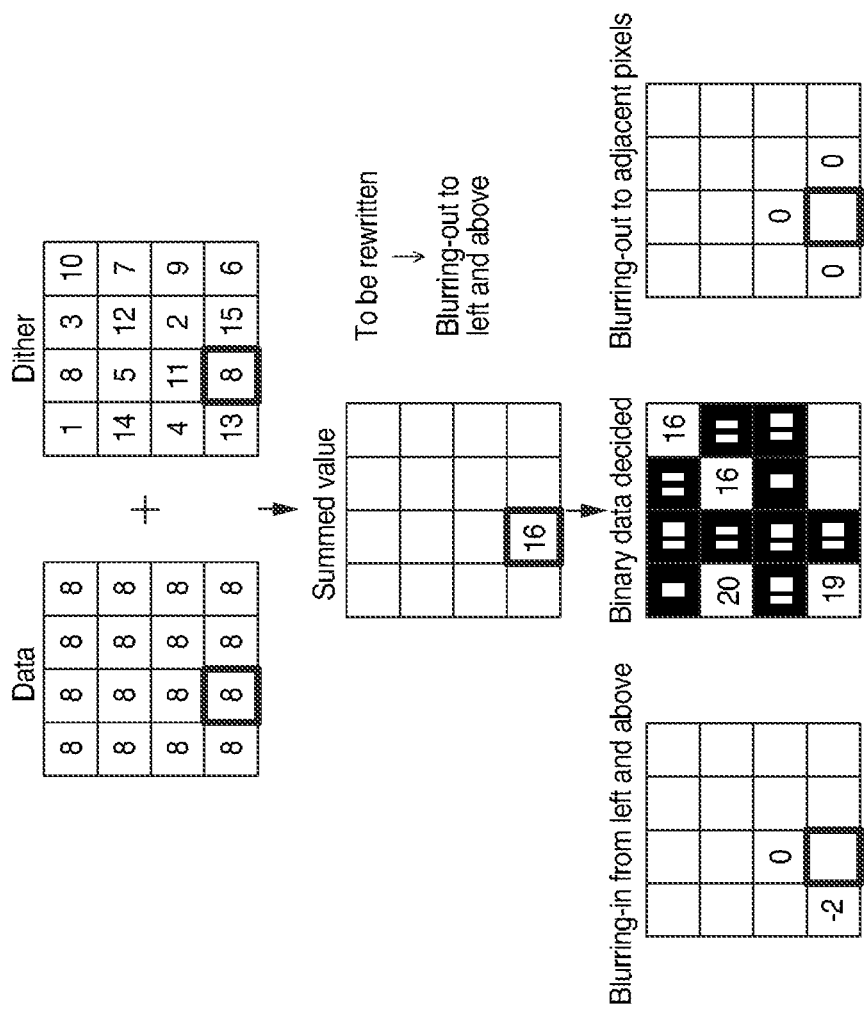
FIG. 40 shows a process executed in the example 2 when a pixel (2, 4) is a target pixel.

FIG. 40 shows processings performed when a pixel (2, 4) is the target pixel. The summed value A is acquired as follows:

$$A(2,4)=P(2,4)+M(2,4)=8+8=16$$

As A (2, 4)≥Th, the target pixel would be converted to a white pixel unless any correction processing is performed. In other words, the target pixel would be rewritten (S101: YES). The blurring-out condition is satisfied for the pixel above (S102: YES). Accordingly, the correction is made in step S103 as follows.

$$A(2,4)=A(2,4)+Cw=16-2=14$$

Here, the blurring-in condition is satisfied for the pixel on the left (S105: YES). The correction is made in step S106 as follows.

$$A(2,4)=A(2,4)+D(2,3)+R(1,4)=14+0-2=12$$

At this moment, A (2, 4)<Th, and therefore the pixel (2, 4) would be converted to a black pixel. As the target pixel is not rewritten (S108: NO), the memories 272-275 will not be rewritten.

Figure 41:
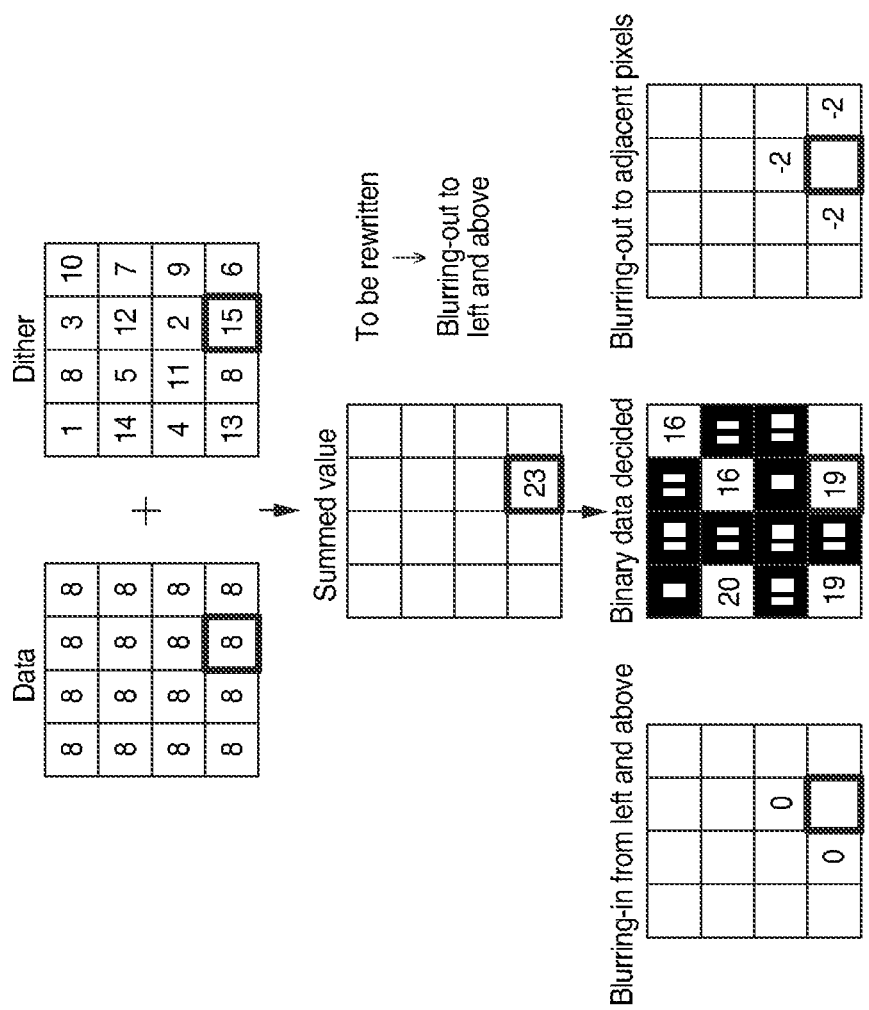
FIG. 41 shows a process executed in the example 2 when a pixel (3, 4) is a target pixel.

FIG. 41 shows processings performed when a pixel (3, 4) is the target pixel. The summed value A is acquired as follows:

$$A(3,4)=P(3,4)+M(3,4)=8+15=23$$

As A (3, 4)≥Th, the target pixel would be converted to a white pixel unless any correction processing is performed. In other words, the target pixel would be rewritten (S101: YES). The blurring-out condition is satisfied for the pixels above and on the left (S102: YES). Accordingly, the correction is made in step S103 as follows.

$$A(3,4)=A(3,4)+Cw+Cw=23-2-2=19$$

Here, the blurring-in condition is satisfied for the pixels above and on the left (S105: YES). The correction is made in step S106 as follows.

$$A(3,4)=A(3,4)+D(3,3)+R(2,4)=19+0+0=19$$

At this moment, A (3, 4)≥Th, and therefore the pixel (2, 4) would be converted to a white pixel. As the target pixel is rewritten (S108: YES), the memories 272-275 will be rewritten.

U (3, 4)=Cw=−2
L (3, 4)=Cw=−2
R (3, 4)=Cw=−2

Figure 42:
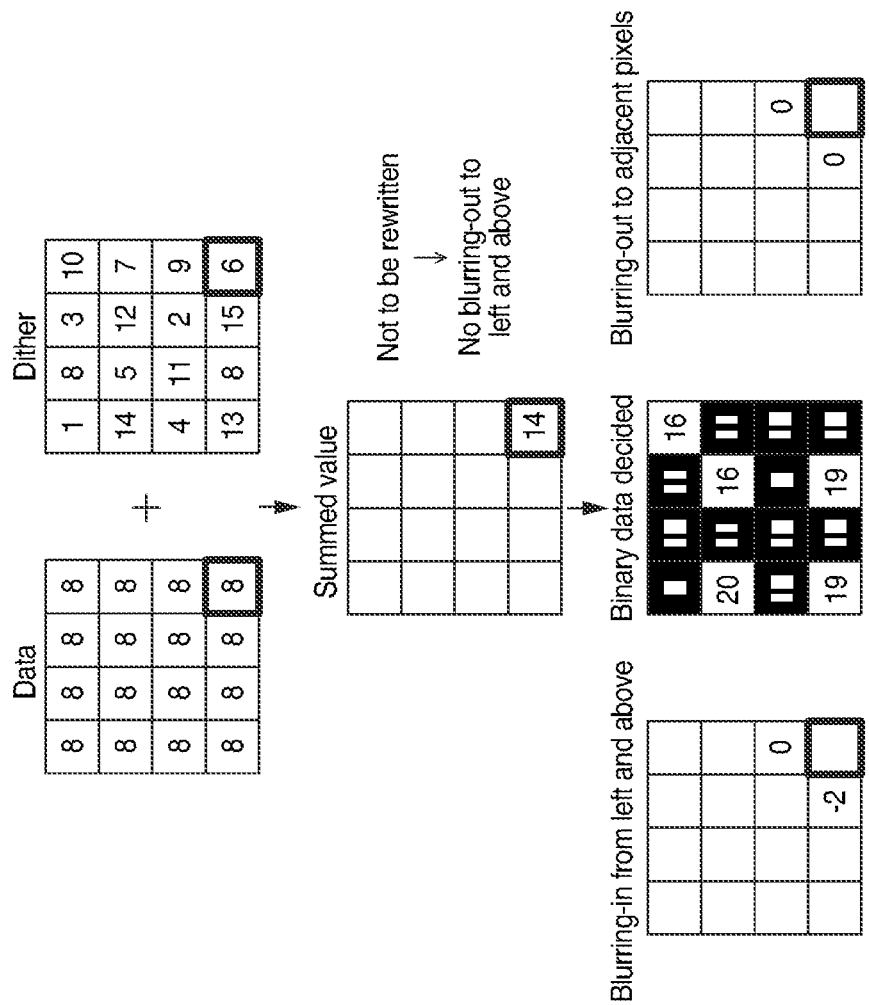
FIG. 42 shows a process executed in the example 2 when a pixel (4, 4) is a target pixel.

FIG. 42 shows processings performed when a pixel (4, 4) is the target pixel. The summed value A is acquired as follows:

$$A(4,4)=P(4,4)+M(4,4)=8+6=14$$

As A (4, 4)<Th, the target pixel would be converted to a black pixel unless any correction processing is performed. In other words, the target pixel would not be rewritten (S101: NO). Here, the blurring-in condition is satisfied for the pixel on the left (S105: YES). The correction is made in step S106 as follows.

$$A(4,4)=A(4,4)+D(4,3)+R(3,4)=14+0-2=12$$

At this moment, A (4, 4)<Th, and therefore the pixel (4, 4) would be converted to a black pixel. As the target pixel is not rewritten (S108: NO), the memories 272-275 will not be rewritten.

FIGS. 43A, 43B and 43C are figures for comparing the results obtained with the correction processing and without the correction processing. FIG. 43A shows an ideal display image, FIG. 43B shows a display image obtained without the correction processing in accordance with the embodiment of the invention, and FIG. 43C shows a display image obtained with the correction processing in accordance with the embodiment of the invention. The present embodiment enables a color reduction process that takes the influence of blurring into account.

3-4. Process Example 3

In both of the two examples so far described above, correction values stored in the memories 272-275 at the time of starting the process are zero, in other words, there is no accumulation of prior blurring-out, and therefore the correction in step S104 is not substantially performed. In this section, an example will be described in which the memories 272-275 store correction values for pixels that are not zero at the time of starting the process, in other words, an example in which the correction in step S104 is substantially performed.

FIGS. 44A-44F show conditions of an example 3. In the example 3, an image different from the image displayed at the time of completion of the process in the example 1 is drawn. FIG. 44A shows a state of the display section 10 prior to starting the process for the example 3 (illustration of blurring is omitted). This state is identical with the state shown in FIG. 26C. FIGS. 44C-44F show data stored in the memories 272-275 before the start of the process. FIG. 44B shows data indicative of an image that will be drawn from now in the example 3. In this example, data in which the gradation values for the entire pixels are "13" are processed.

Figure 45:
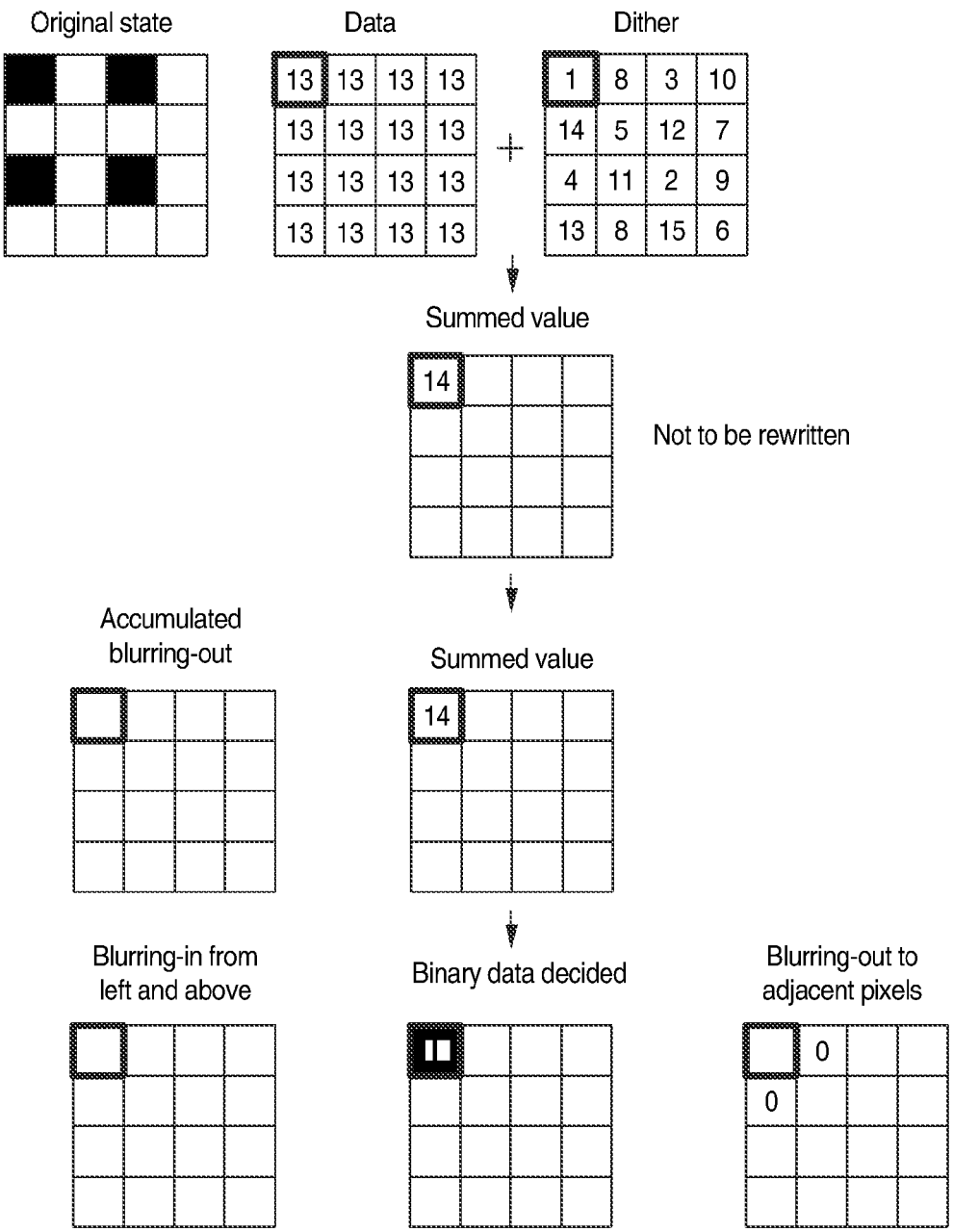
FIG. 45 shows a process executed in an example 3 when a pixel (1, 1) is a target pixel.

FIG. 45 shows processings performed when a pixel (1, 1) is the target pixel. The summed value A is acquired as follows:

$$A(1,1)=P(1,1)+M(1,1)=13+1=14$$

As A (1, 1)<Th, the target pixel would be converted to a black pixel unless any correction processing is performed. In other words, the target pixel would not be rewritten (S101: NO). The correction in step S104 is performed as follows.

$$A(1,1)=A(1,1)+U(1,1)+L(1,1)=14+0+0=14$$

The blurring-in condition is not satisfied for the pixels above and on the left (S105: NO). At this moment, A (1, 1)<Th, and therefore the pixel (1, 1) would be converted to a black pixel. As the target pixel is not rewritten (S108: NO), the memories 272-275 will not be rewritten. It is noted that, in the example 3, figures showing rewriting of the memories 272-275 (figures showing "blurring-out to adjacent pixels") indicate changes in the correction values. For example, FIG. 45 shows that changes at D (1, 1) and R (1, 1) are zero. Before the process is performed, the values of D (1, 1) and R (1, 1) were both "2" as shown in FIGS. 44D and 44F. In other words, when the process in FIG. 45 is finished, the values at D (1, 1) and R (1, 1) remain unchanged at "2" as before. This indicates that, although there is no new blurring-out occurred this time, prior blurring-out still remains accumulated.

Figure 46:
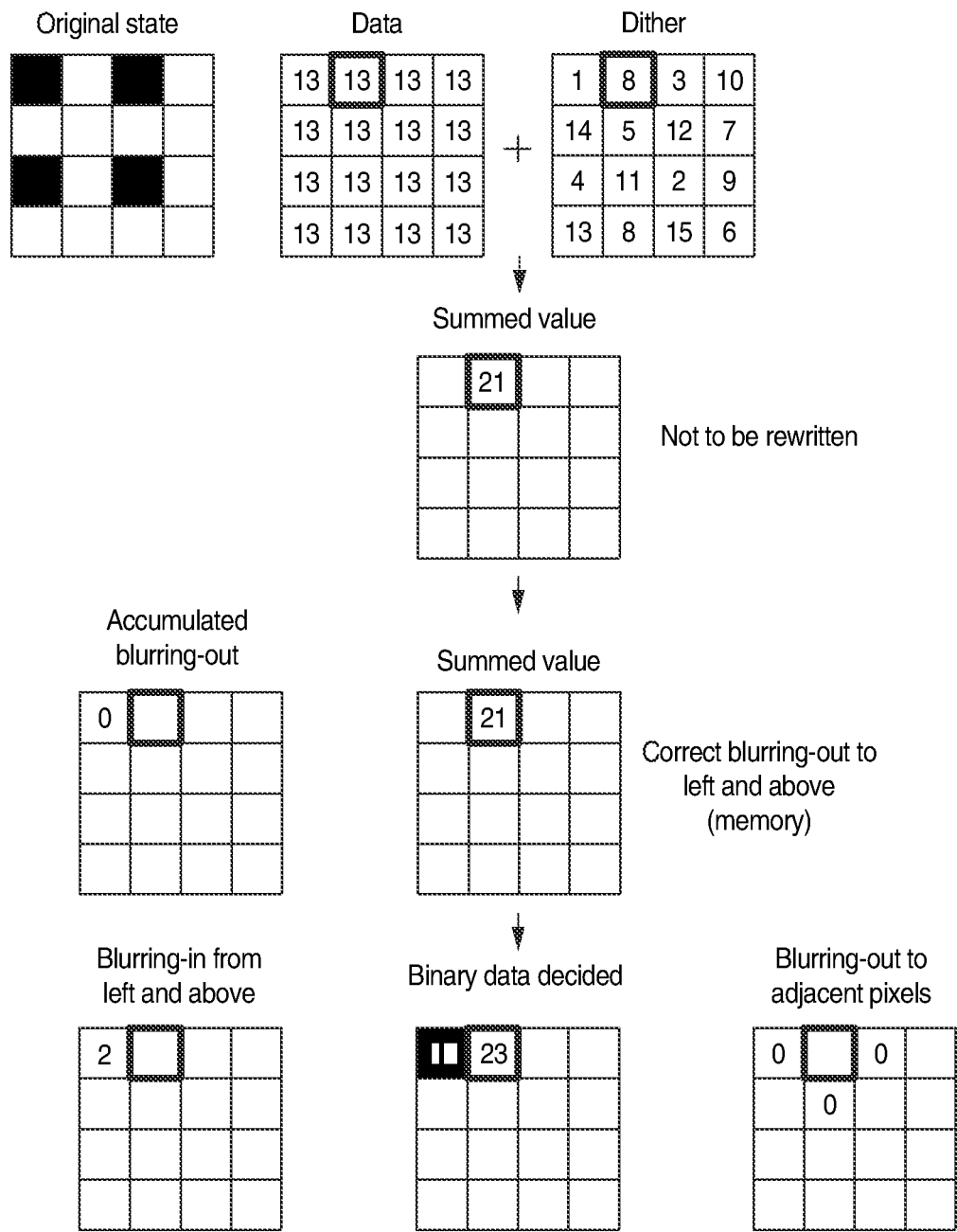
FIG. 46 shows a process executed in the example 3 when a pixel (2, 1) is a target pixel.

FIG. 46 shows processings performed when a pixel (2, 1) is the target pixel. The summed value A is acquired as follows:

$$A(2,1)=P(2,1)+M(2,1)=13+8=21$$

As A (2, 1)≥Th, the target pixel would be converted to a white pixel unless any correction processing is performed. In other words, the target pixel would not be rewritten (S101: NO). The correction in step S104 is performed as follows.

$$A(2,1)=A(2,1)+U(2,1)+L(2,1)=21+0+0=21$$

The blurring-in condition is satisfied for the pixel on the left (S105: YES). Accordingly, the correction in step S106 is performed as follows.

$$A(2,1)=A(2,1)+D(2,0)+R(1,1)=21+0+2=23$$

At this moment, A (2, 1)≥Th, and therefore the pixel (2, 1) would be converted to a white pixel. As the target pixel is not rewritten (S108: NO), the memories 272-275 will not be rewritten.

Figure 47:
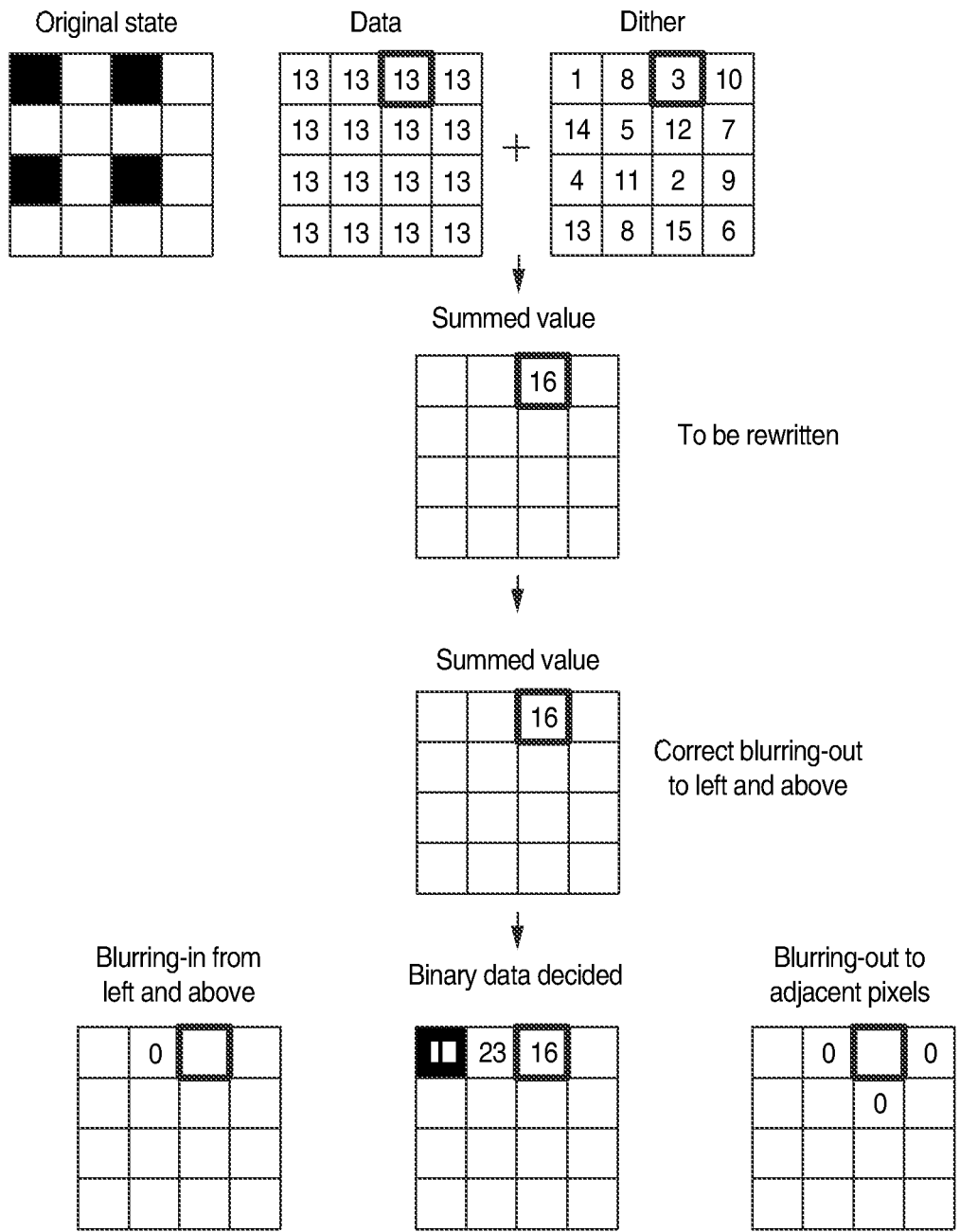
FIG. 47 shows a process executed in the example 3 when a pixel (3, 1) is a target pixel.

FIG. 47 shows processings performed when a pixel (3, 1) is the target pixel. The summed value A is acquired as follows:

$$A(3,1)=P(3,1)+M(3,1)=13+3=16$$

As A (3, 1)≥Th, the target pixel would be converted to a white pixel unless any correction processing is performed. In other words, the target pixel would be rewritten (S101: YES). The blurring-out condition is not satisfied for the pixel on the left (S102: NO).

The blurring-in condition is not satisfied for the pixels above and on the left (S105: NO). At this moment, A (3, 1)≥Th, and therefore the pixel (3, 1) would be converted to a white pixel. As the target pixel is rewritten (S108: YES), the memories 272-275 will be rewritten. As the target pixel is a white pixel and adjacent pixels are all white pixels. Accordingly, no blurring-out occurs, such that the memories 272-275 will be rewritten as follows:

D (3, 1)=0
L (3, 1)=0
R (3, 1)=0

Figure 48:
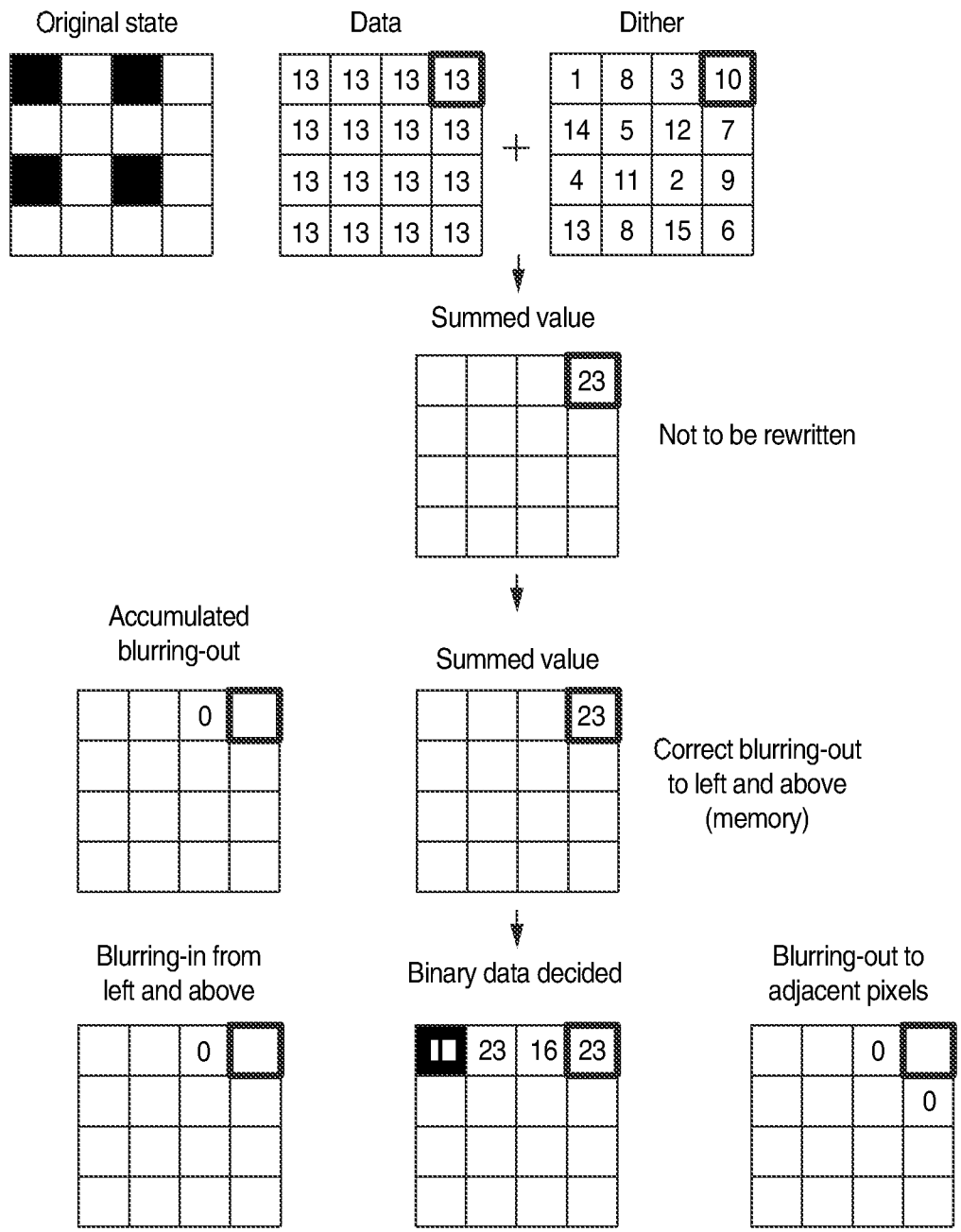
FIG. 48 shows a process executed in the example 3 when a pixel (4, 1) is a target pixel.

FIG. 48 shows processings performed when a pixel (4, 1) is the target pixel. The summed value A is acquired as follows:

$$A(4,1)=P(4,1)+M(4,1)=13+10=23$$

As A (4, 1)≥Th, the target pixel would be converted to a white pixel unless any correction processing is performed. In other words, the target pixel would not be rewritten (S101: NO). The correction in step S104 is performed as follows.

$$A(4,1)=A(4,1)+U(4,1)+L(4,1)=23+0+0=23$$

The blurring-in condition is not satisfied for the pixels above and on the left (S105: NO). At this moment, A (4, 1)≥Th, and therefore the pixel (4, 1) would be converted to a white pixel. As the target pixel is not rewritten (S108: NO), the memories 272-275 will not be rewritten.

Figure 49:
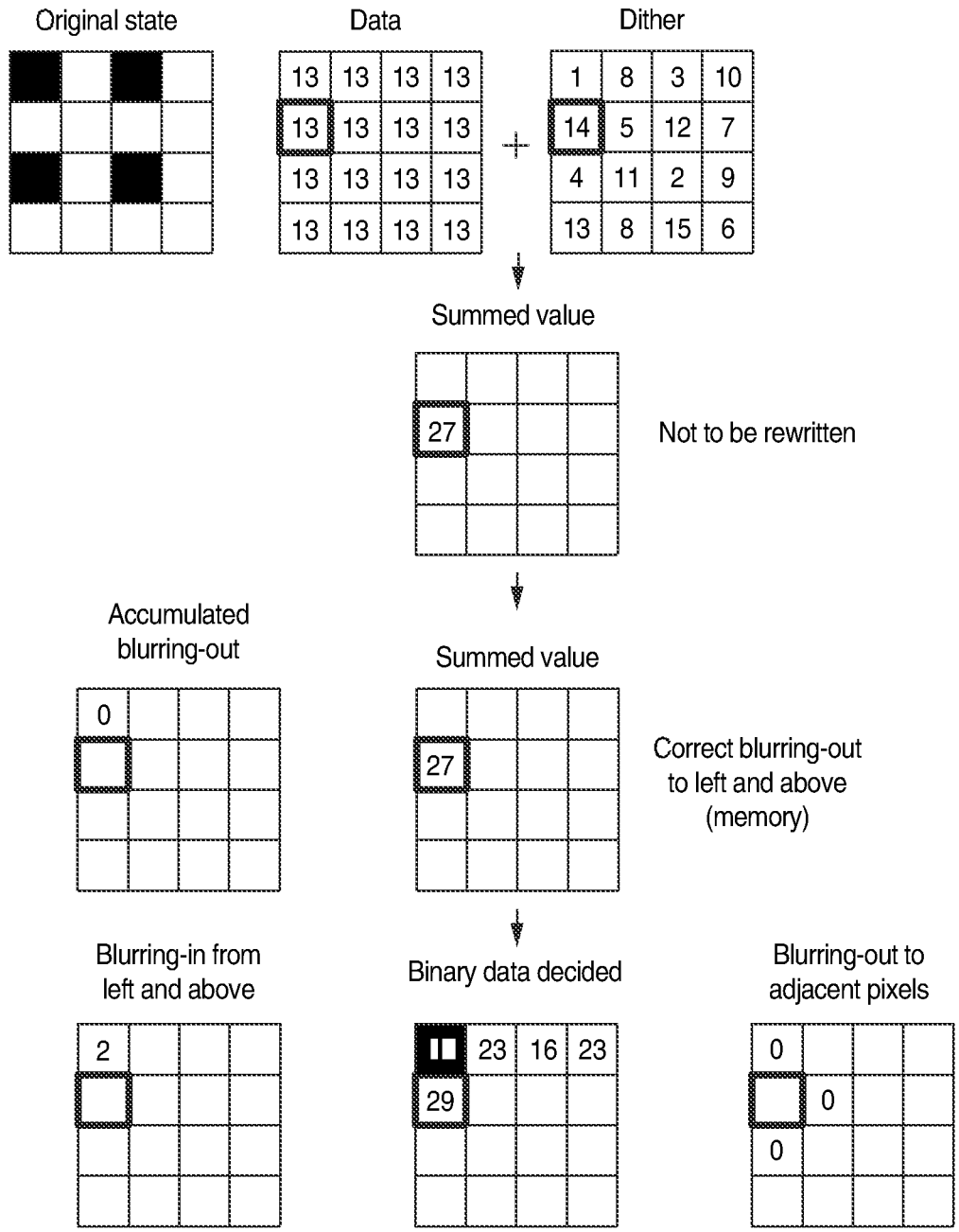
FIG. 49 shows a process executed in the example 3 when a pixel (1, 2) is a target pixel.

FIG. 49 shows processings performed when a pixel (1, 2) is the target pixel. The summed value A is acquired as follows:

$$A(1,2)=P(1,2)+M(1,2)=13+14=27$$

As A (1, 2)≥Th, the target pixel would be converted to a white pixel unless any correction processing is performed. In other words, the target pixel would not be rewritten (S101: NO). The correction in step S104 is performed as follows.

$$A(1,2)=A(1,2)+U(1,2)+L(1,2)=27+0+0=27$$

The blurring-in condition is satisfied for the pixel above (S105: YES). The correction in step S106 is performed as follows.

$$A(1,2)=A(1,2)+D(1,1)+R(0,2)=27+2+0=29$$

At this moment, A (1, 2)≥Th, and therefore the pixel (1, 2) would be converted to a white pixel. As the target pixel is not rewritten (S108: NO), the memories 272-275 will not be rewritten.

Figure 50:
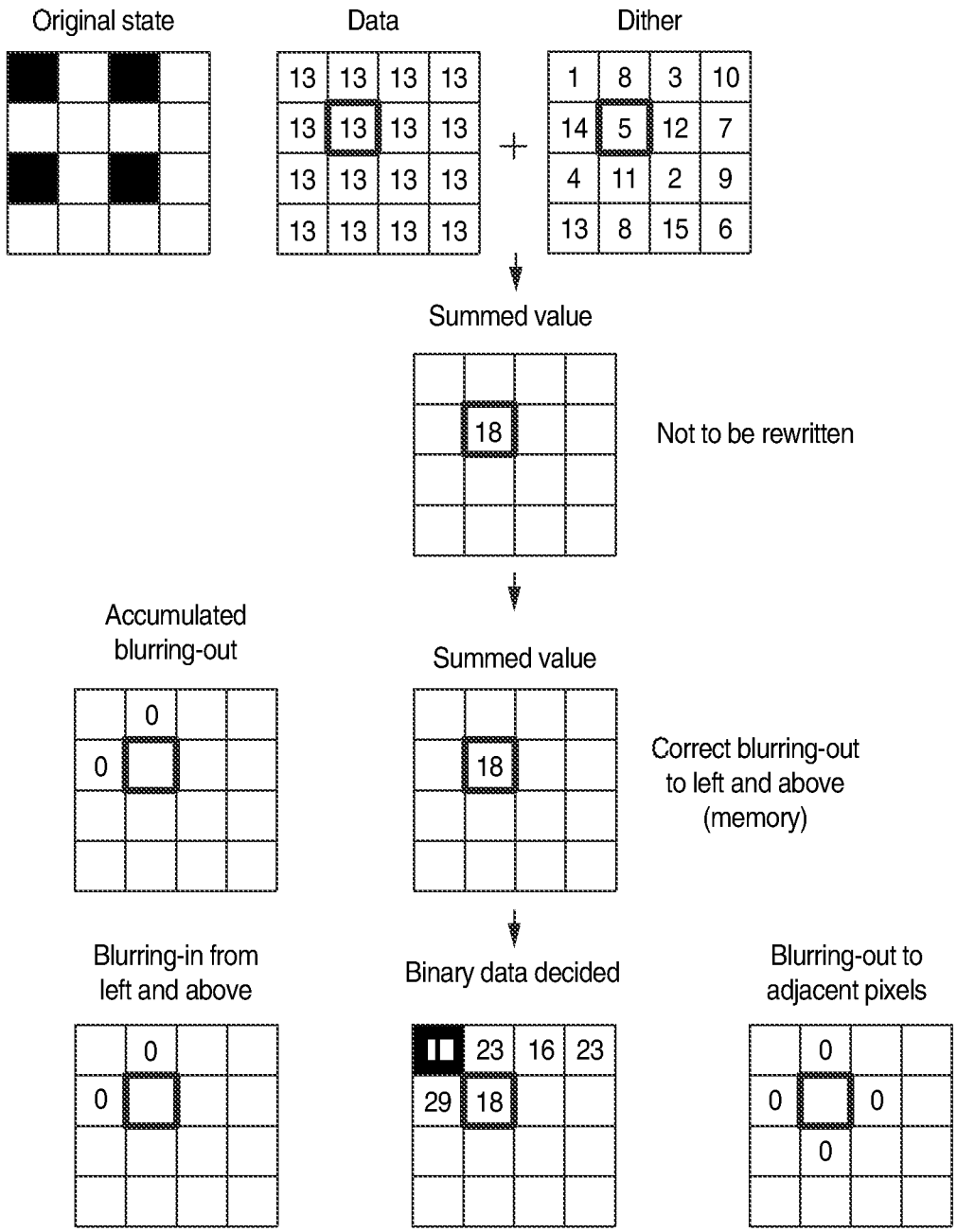
FIG. 50 shows a process executed in the example 3 when a pixel (2, 2) is a target pixel.

FIG. 50 shows processings performed when a pixel (2, 2) is the target pixel. The summed value A is acquired as follows:

$$A(2,2)=P(2,2)+M(2,2)=13+15=18$$

As A (2, 2)≥Th, the target pixel would be converted to a white pixel unless any correction processing is performed. In other words, the target pixel would not be rewritten (S101: NO). The correction in step S104 is performed as follows.

$$A(2,2)=A(2,2)+U(2,2)+L(2,2)=18+0+0=18$$

The blurring-in condition is not satisfied for the pixels above and on the left (S105: NO). At this moment, A (2, 2)≥Th, and therefore the pixel (2, 2) would be converted to a white pixel. As the target pixel is not rewritten (S108: NO), the memories 272-275 will not be rewritten.

Figure 51:
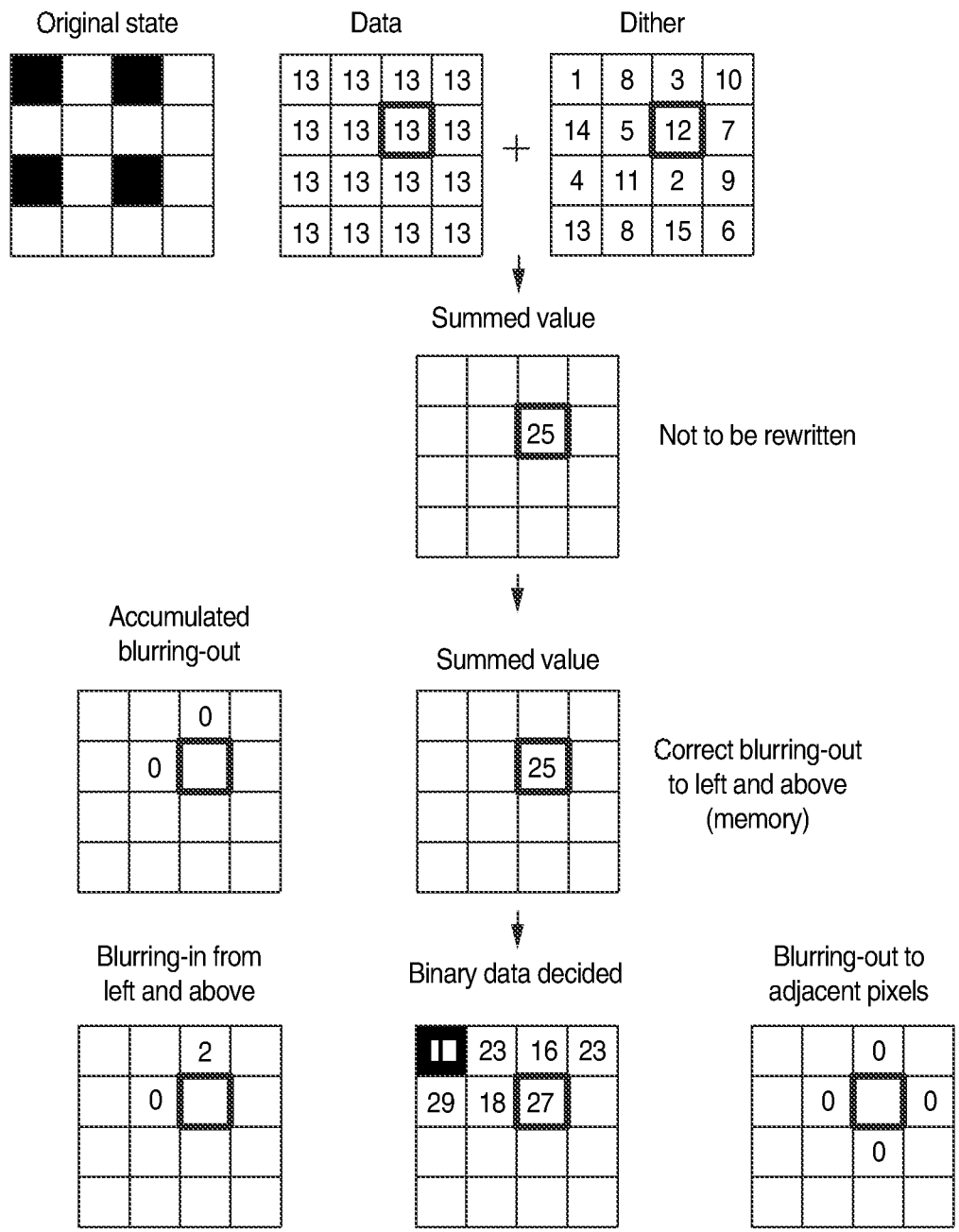
FIG. 51 shows a process executed in the example 3 when a pixel (3, 2) is a target pixel.

FIG. 51 shows processings performed when a pixel (3, 2) is the target pixel. The summed value A is acquired as follows:

$$A(3,2)=P(3,2)+M(3,2)=13+12=25$$

As A (3, 2)≥Th, the target pixel would be converted to a white pixel unless any correction processing is performed. In other words, the target pixel would not be rewritten (S101: NO). The correction in step S104 is performed as follows.

$$A(3,2)=A(3,2)+U(3,2)+L(3,2)=25+0+0=25$$

The blurring-in condition is satisfied for the pixel above (S105: YES). The correction in step S106 is performed as follows.

$$A(3,2)=A(3,2)+D(3,1)+R(2,2)=25+2+0=27$$

At this moment, A (3, 2)≥Th, and therefore the pixel (3, 2) would be converted to a white pixel. As the target pixel is not rewritten (S108: NO), the memories 272-275 will not be rewritten.

Figure 52:
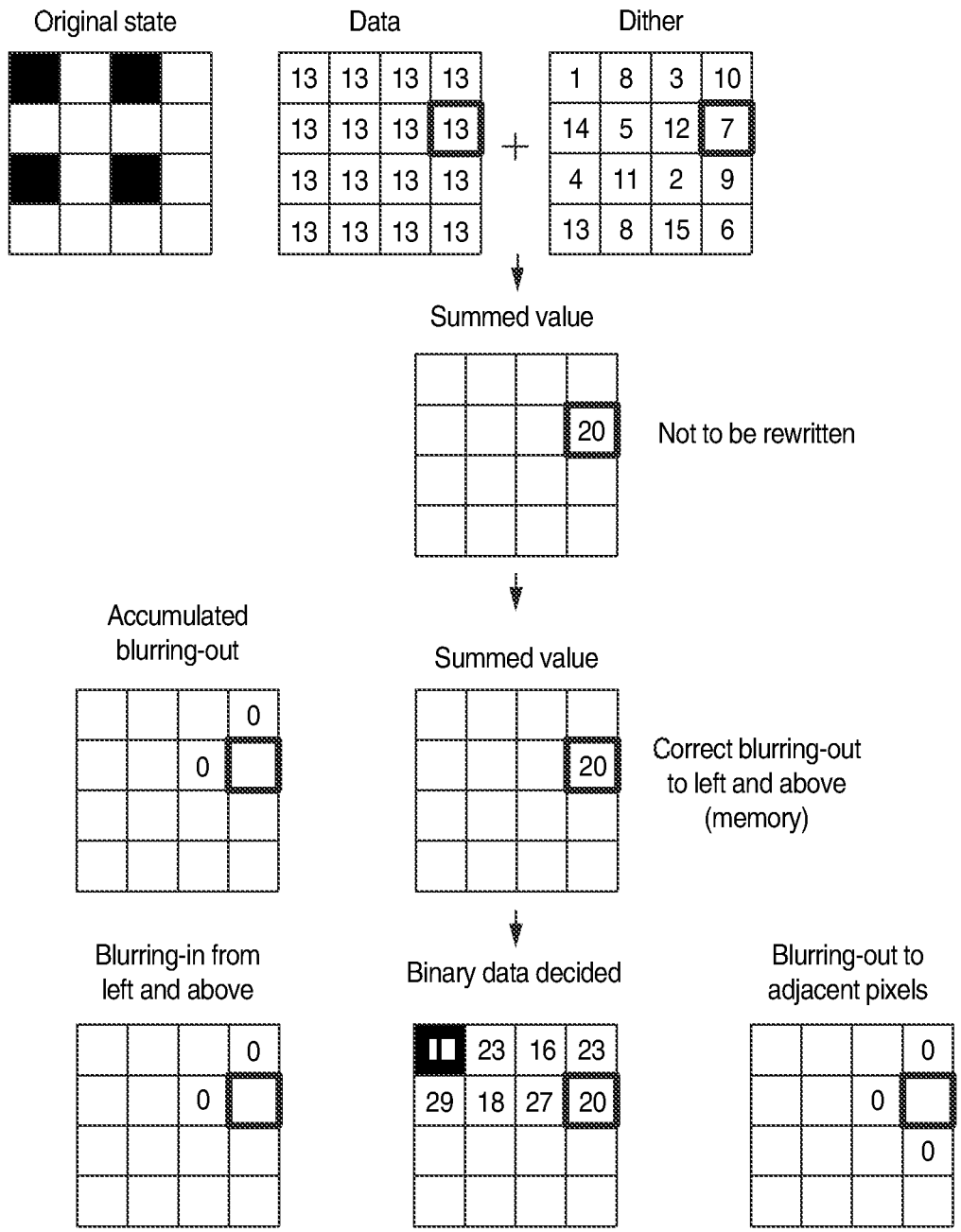
FIG. 52 shows a process executed in the example 3 when a pixel (4, 2) is a target pixel.

FIG. 52 shows processings performed when a pixel (4, 2) is the target pixel. The summed value A is acquired as follows:

$$A(4,2)=P(4,2)+M(4,2)=13+7=20$$

As A (4, 2)≥Th, the target pixel would be converted to a white pixel unless any correction processing is performed. In other words, the target pixel would not be rewritten (S101: NO). The correction in step S104 is performed as follows.

$$A(4,2)=A(4,2)+U(4,2)+L(4,2)=20+0+0=25$$

The blurring-in condition is not satisfied for the pixels above and on the left (S105: NO). At this moment, A (4, 2)≥Th, and therefore the pixel (4, 2) would be converted to a white pixel. As the target pixel is not rewritten (S108: NO), the memories 272-275 will not be rewritten.

Figure 53:
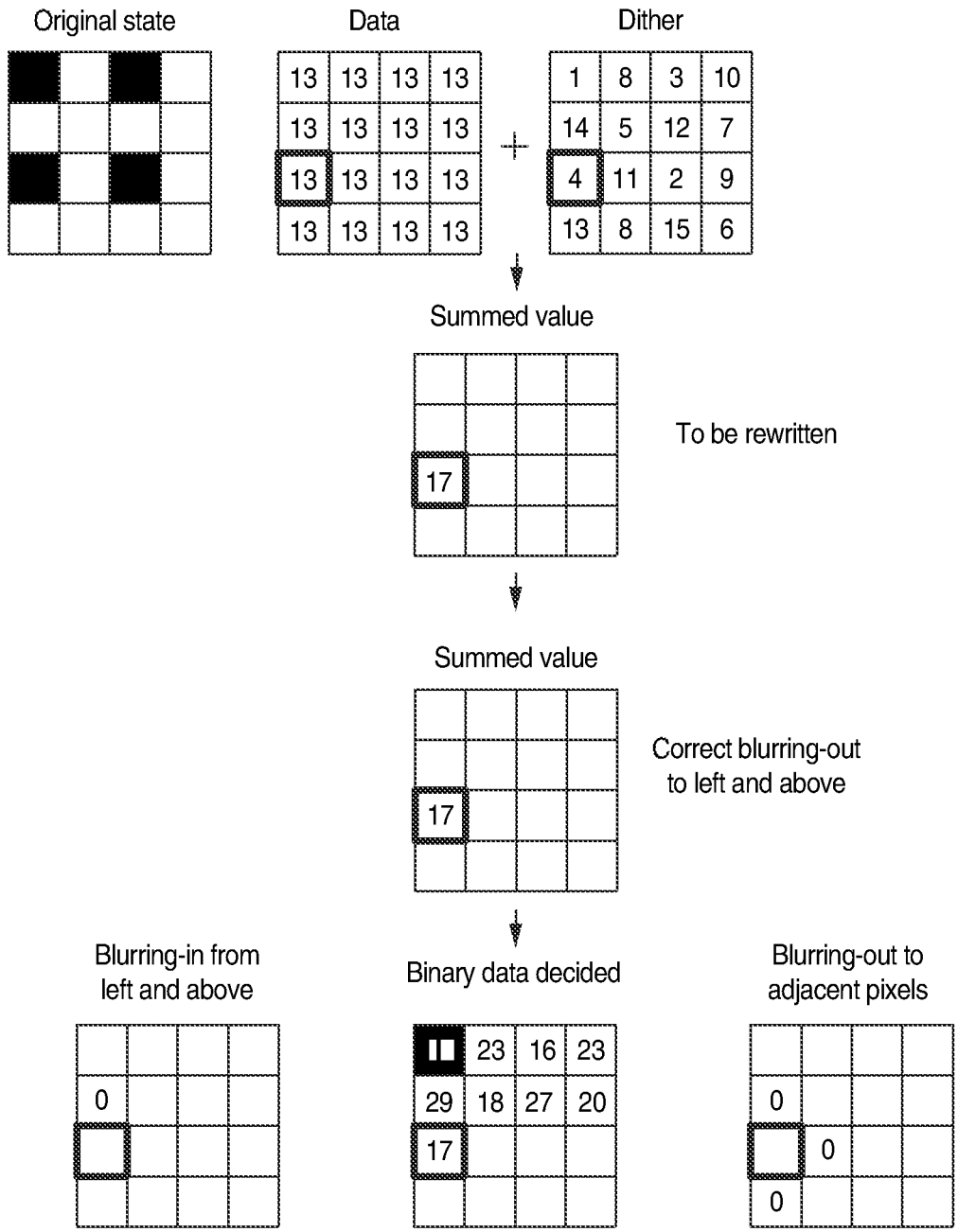
FIG. 53 shows a process executed in the example 3 when a pixel (1, 3) is a target pixel.

FIG. 53 shows processings performed when a pixel (1, 3) is the target pixel. The summed value A is acquired as follows:

$$A(1,3)=P(1,3)+M(1,3)=13+4=17$$

As A (1, 3)≥Th, the target pixel would be converted to a white pixel unless any correction processing is performed. In other words, the target pixel would be rewritten (S101: YES). The blurring-out condition is not satisfied for the pixels above and on the left (S102: NO). The blurring-in condition is not satisfied for the pixels above and on the left (S105: NO). At this moment, A (1, 3)≥Th, and therefore the pixel (1, 3) would be converted to a white pixel. The target pixel is rewritten (S108: YES). As the blurring-out condition is not satisfied, the memories 272-275 will not be rewritten.

Figure 54:
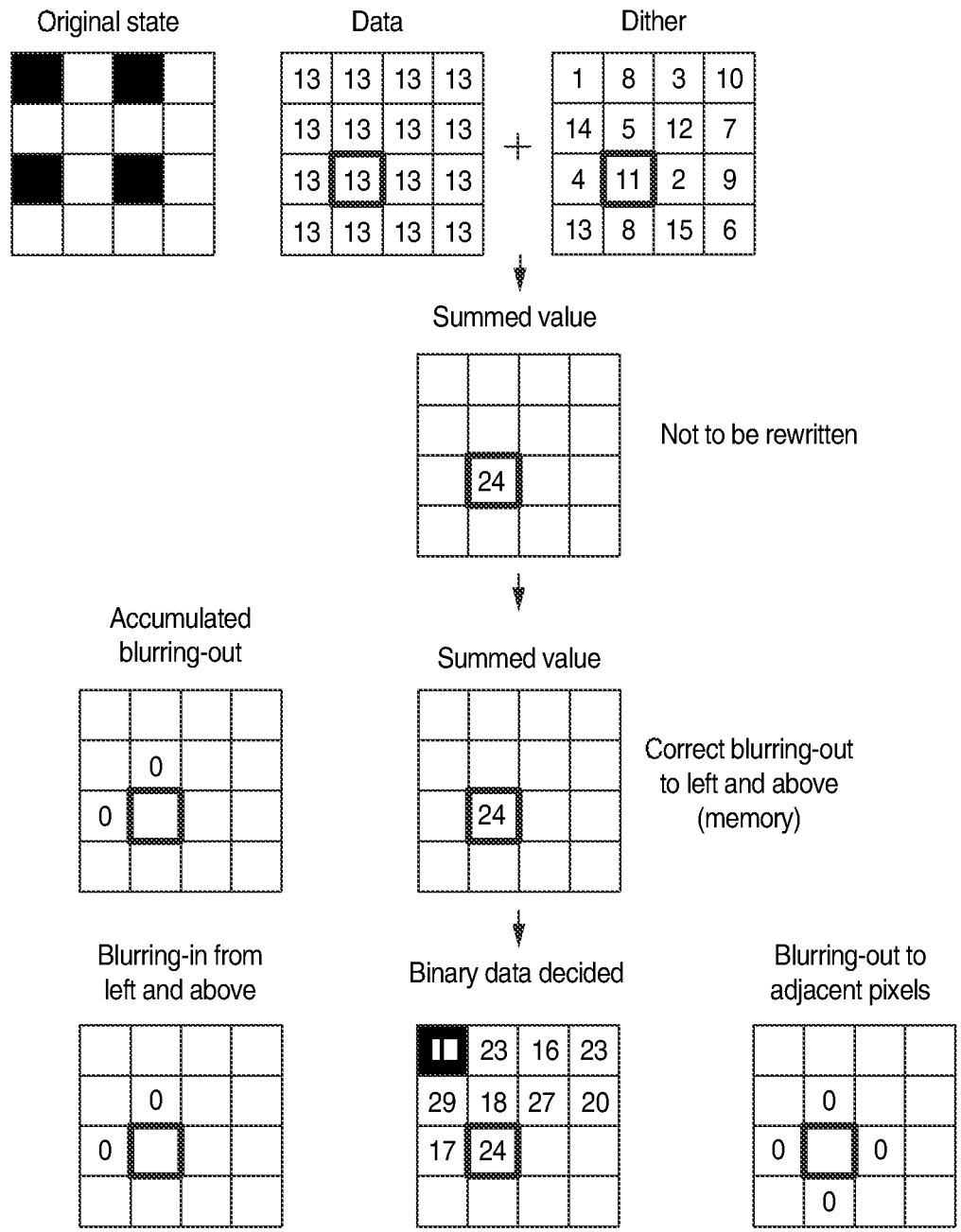
FIG. 54 shows a process executed in the example 3 when a pixel (2, 3) is a target pixel.

FIG. 54 shows processings performed when a pixel (2, 3) is the target pixel. The summed value A is acquired as follows:

$$A(2,3)=P(2,3)+M(2,3)=13+11=24$$

As A (2, 3)≥Th, the target pixel would be converted to a white pixel unless any correction processing is performed. In other words, the target pixel would not be rewritten (S101: NO). The correction in step S104 is performed as follows.

$$A(2,3)=A(2,3)+U(2,3)+L(2,3)=24+0+0=24$$

The blurring-in condition is not satisfied for the pixels above and on the left (S105: NO). At this moment, A (2, 3)≥Th, and therefore the pixel (2, 3) would be converted to a white pixel. As the target pixel is not rewritten (S108: NO), the memories 272-275 will not be rewritten.

Figure 55:
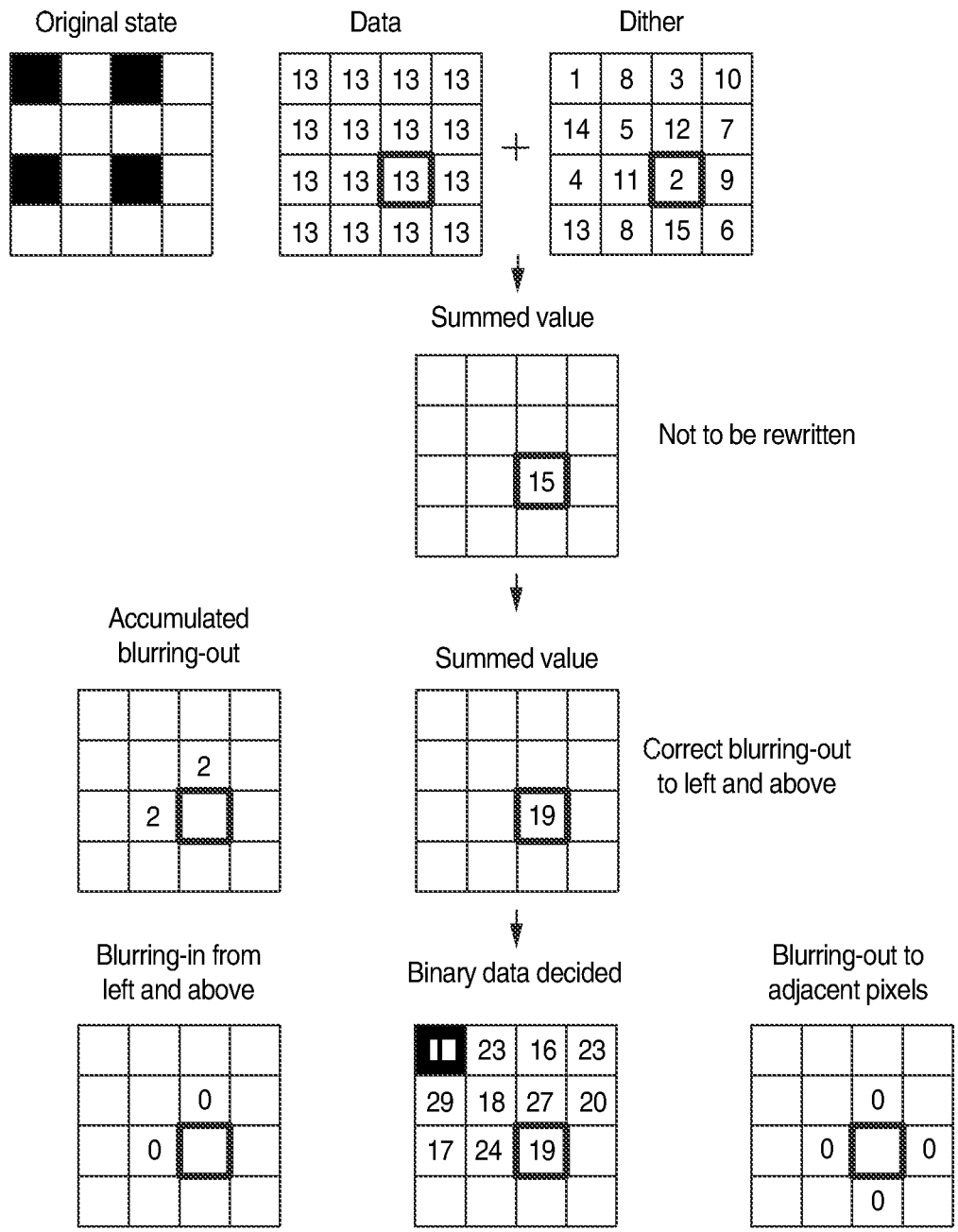
FIG. 55 shows a process executed in the example 3 when a pixel (3, 3) is a target pixel.

FIG. 55 shows processings performed when a pixel (3, 3) is the target pixel. The summed value A is acquired as follows:

$$A(3,3)=P(3,3)+M(3,3)=13+2=15$$

As A (3, 3)<Th, the target pixel would be converted to a black pixel unless any correction processing is performed. In other words, the target pixel would not be rewritten (S101: NO). The correction in step S104 is performed as follows.

$$A(3,3)=A(3,3)+U(3,3)+L(3,3)=15+2+2=19$$

The blurring-in condition is not satisfied for the pixels above and on the left (S105: NO).

At this moment, A (3, 3)≥Th, and therefore the pixel (3, 3) would be converted to a white pixel. The target pixel is rewritten (S108: YES). As the blurring-out condition is not satisfied, the memories 272-275 will not be rewritten.

Figure 56:
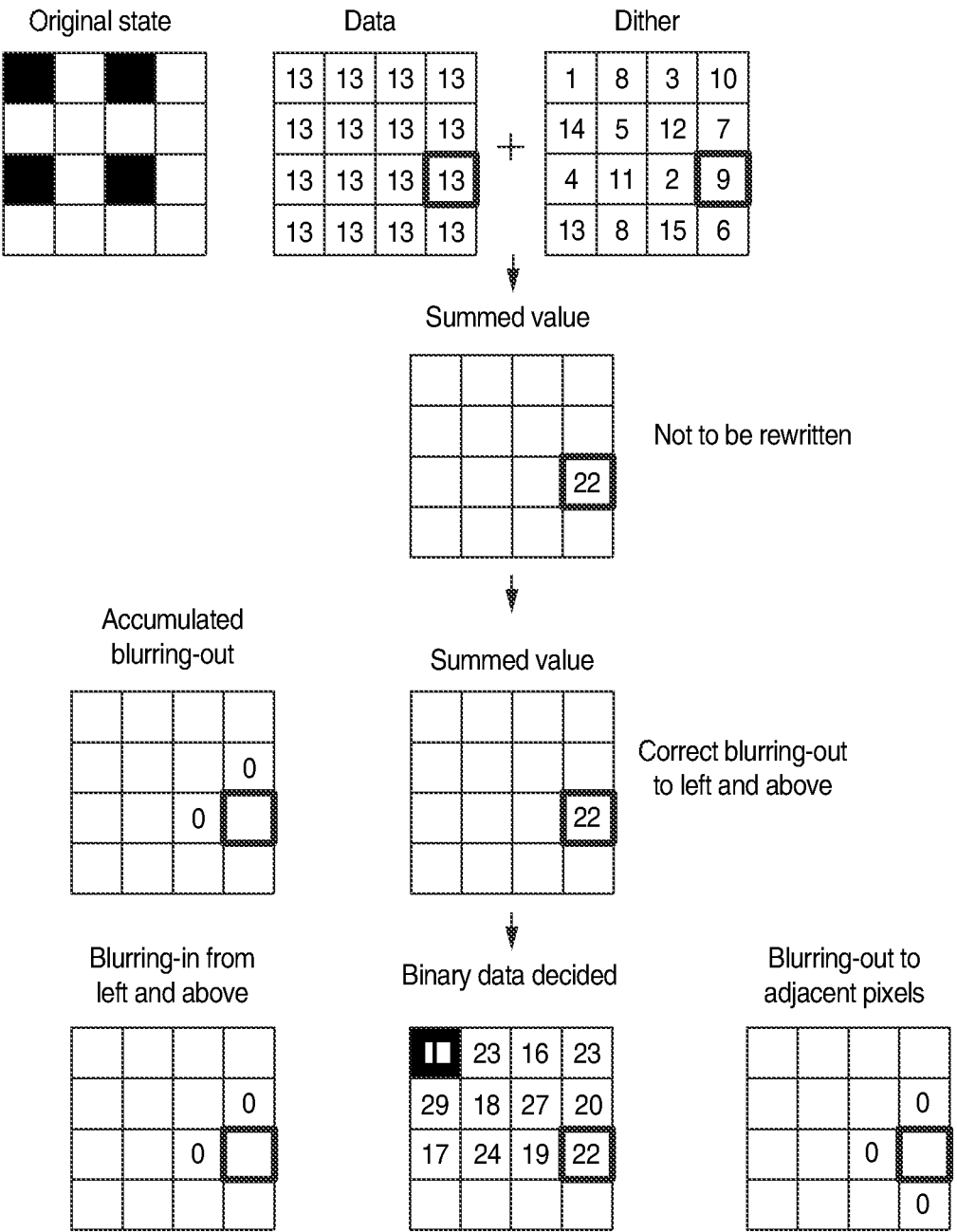
FIG. 56 shows a process executed in the example 3 when a pixel (4, 3) is a target pixel.

FIG. 56 shows processings performed when a pixel (4, 3) is the target pixel. The summed value A is acquired as follows:

$$A(4,3)=P(4,3)+M(4,3)=13+9=22$$

As A (4, 3)≥Th, the target pixel would be converted to a white pixel unless any correction processing is performed. In other words, the target pixel would not be rewritten (S101: NO). The correction in step S104 is performed as follows.

$$A(4,3)=A(4,3)+U(4,3)+L(4,3)=22+0+0=22$$

The blurring-in condition is not satisfied for the pixels above and on the left (S105: NO). At this moment, A (4, 3)≥Th, and therefore the pixel (4, 3) would be converted to a white pixel. As the target pixel is not rewritten (S108: NO), the memories 272-275 will not be rewritten.

Figure 57:
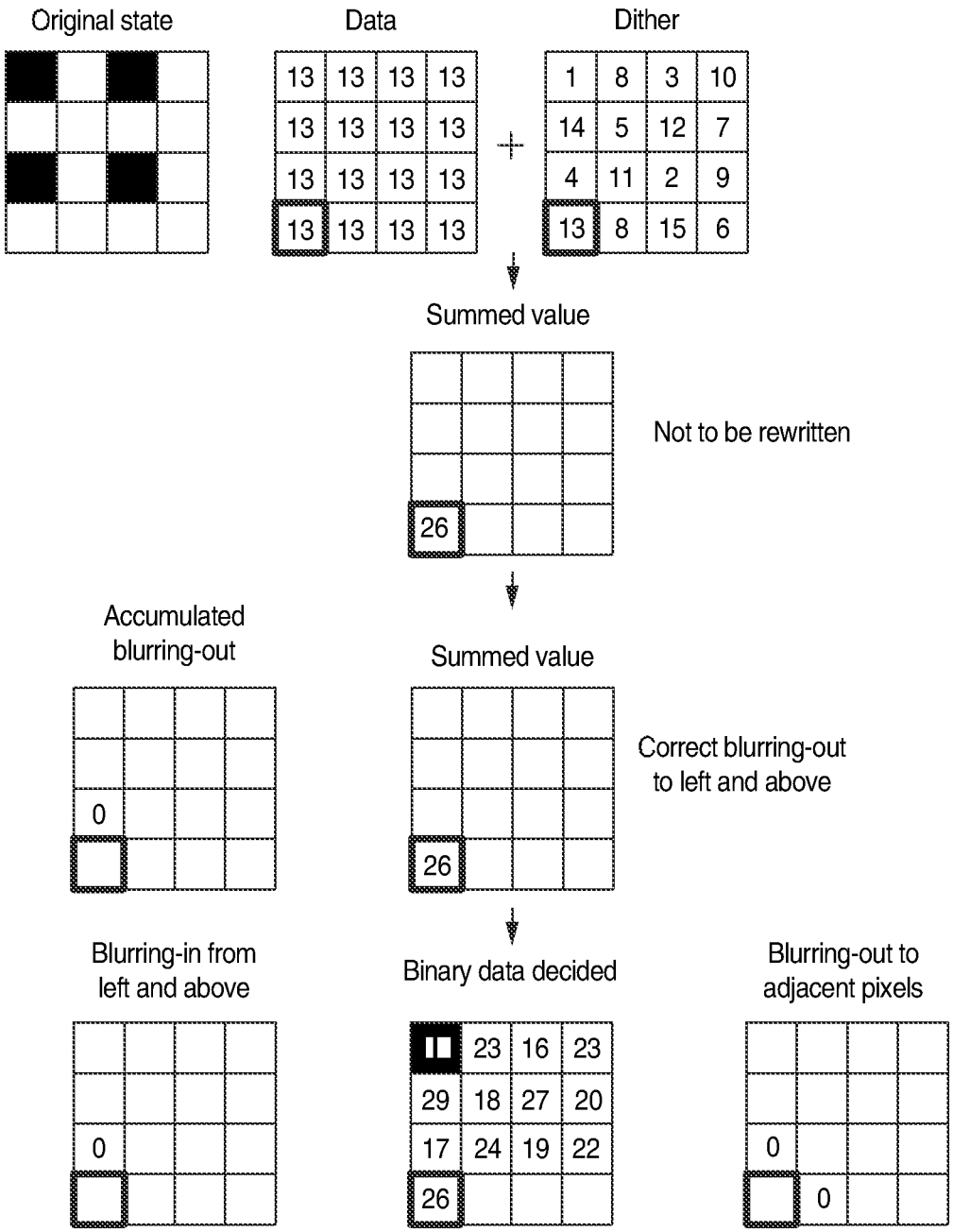
FIG. 57 shows a process executed in the example 3 when a pixel (1, 4) is a target pixel.

FIG. 57 shows processings performed when a pixel (1, 4) is the target pixel. The summed value A is acquired as follows:

$$A(1,4)=P(1,4)+M(1,4)=13+13=26$$

As A (1, 4)≥Th, the target pixel would be converted to a white pixel unless any correction processing is performed. In other words, the target pixel would not be rewritten (S101: NO). The correction in step S104 is performed as follows.

$$A(1,4)=A(1,4)+U(1,4)+L(1,4)=26+0+0=26$$

The blurring-in condition is not satisfied for the pixels above and on the left (S105: NO). At this moment, A (1, 4)≥Th, and therefore the pixel (1, 4) would be converted to a white pixel. As the target pixel is not rewritten (S108: NO), the memories 272-275 will not be rewritten.

Figure 58:
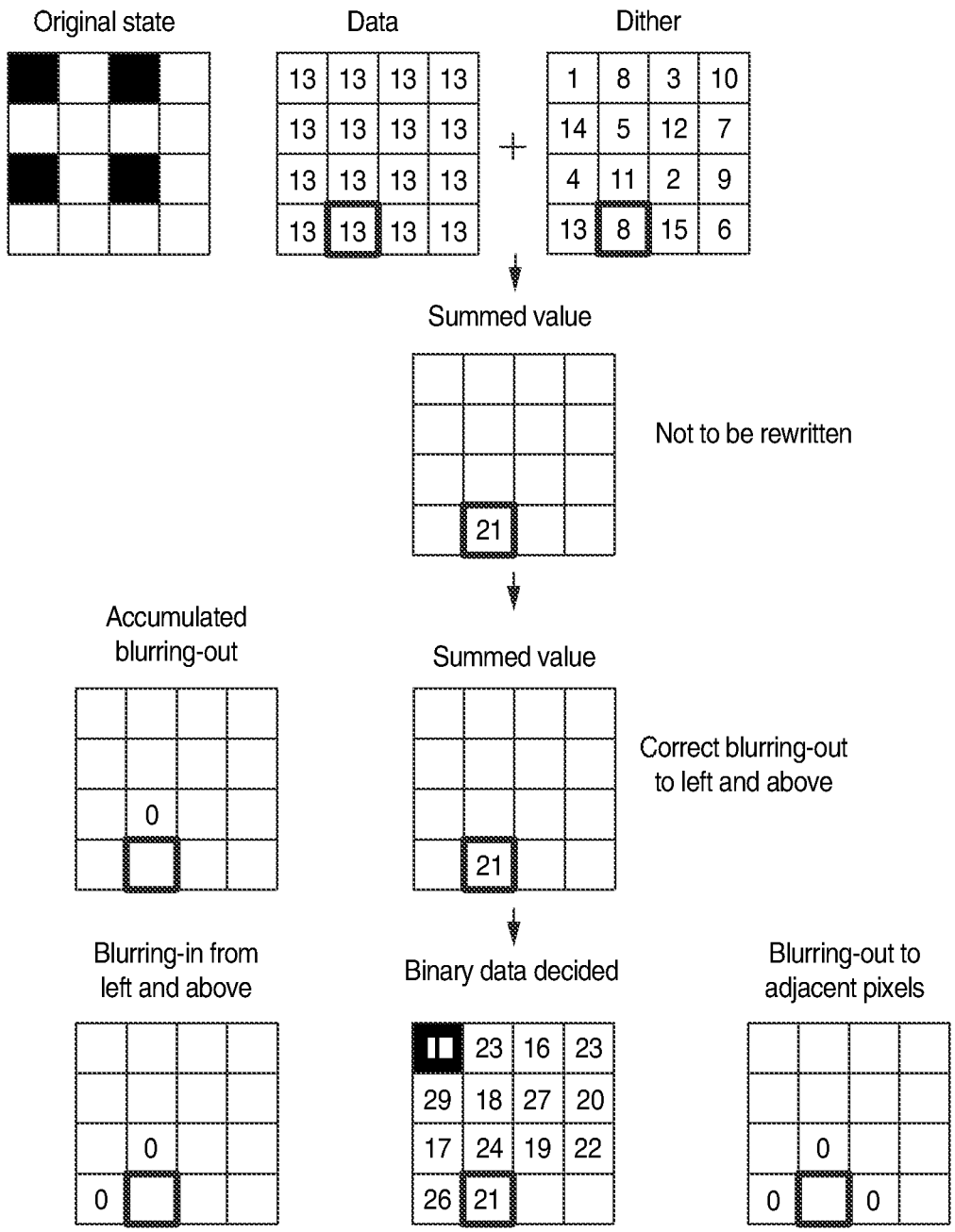
FIG. 58 shows a process executed in the example 3 when a pixel (2, 4) is a target pixel.

FIG. 58 shows processings performed when a pixel (2, 4) is the target pixel. The summed value A is acquired as follows:

$$A(2,4)=P(2,4)+M(2,4)=13+8=21$$

As A (2, 4)≥Th, the target pixel would be converted to a white pixel unless any correction processing is performed. In other words, the target pixel would not be rewritten (S101: NO). The correction in step S104 is performed as follows.

$$A(2,4)=A(2,4)+U(2,4)+L(2,4)=21+0+0=21$$

The blurring-in condition is not satisfied for the pixels above and on the left (S105: NO). At this moment, A (2, 4)≥Th, and therefore the pixel (2, 4) would be converted to a white pixel. As the target pixel is not rewritten (S108: NO), the memories 272-275 will not be rewritten.

Figure 59:
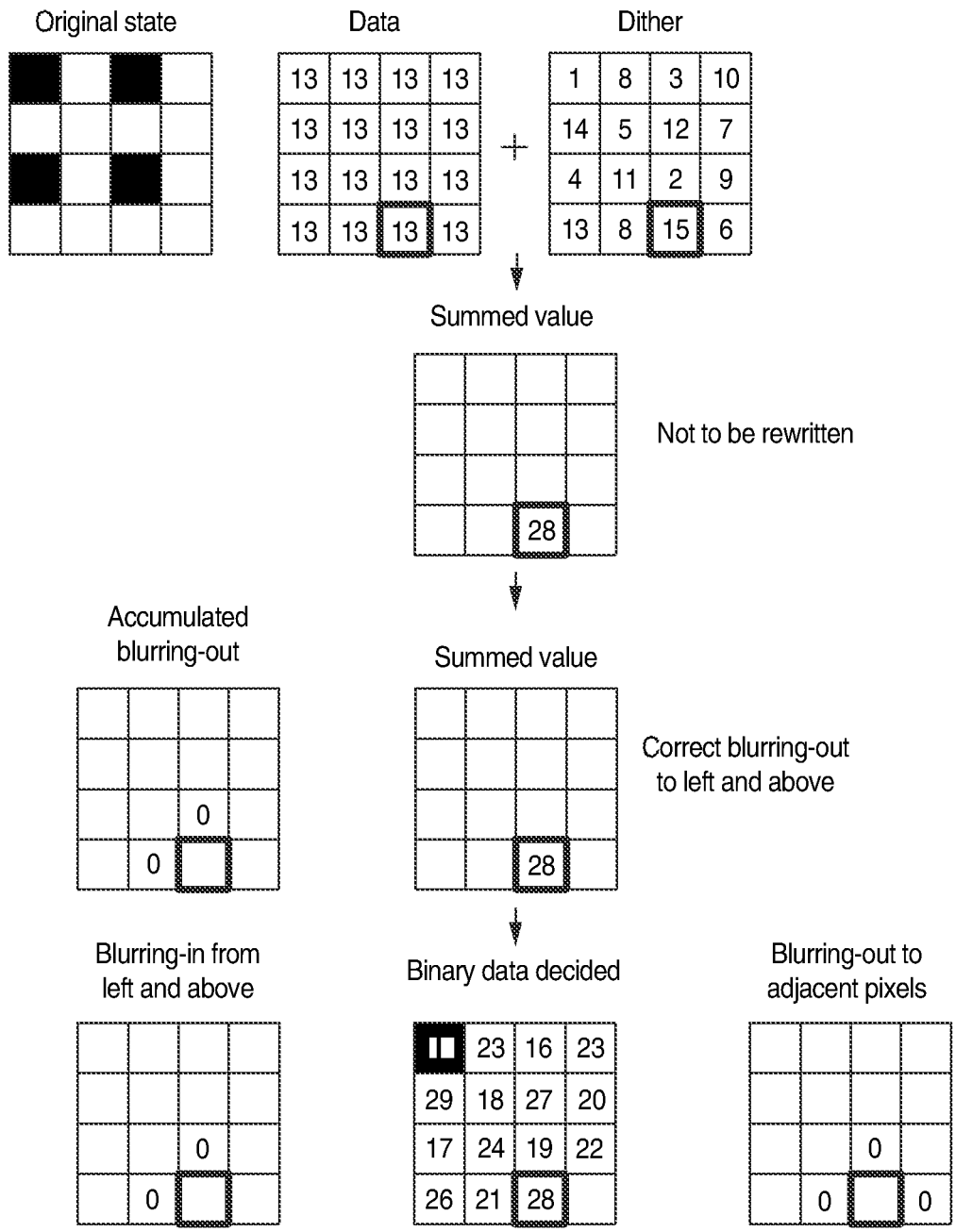
FIG. 59 shows a process executed in the example 3 when a pixel (3, 4) is a target pixel.

FIG. 59 shows processings performed when a pixel (3, 4) is the target pixel. The summed value A is acquired as follows:

$$A(3,4)=P(3,4)+M(3,4)=13+15=28$$

As A (3, 4)≥Th, the target pixel would be converted to a white pixel unless any correction processing is performed. In other words, the target pixel would not be rewritten (S101: NO). The correction in step S104 is performed as follows.

$$A(3,4)=A(3,4)+U(3,4)+L(3,4)=28+0+0=28$$

The blurring-in condition is not satisfied for the pixels above and on the left (S105: NO). At this moment, A (3, 4)≥Th, and therefore the pixel (3, 4) would be converted to a white pixel. As the target pixel is not rewritten (S108: NO), the memories 272-275 will not be rewritten.

Figure 60:
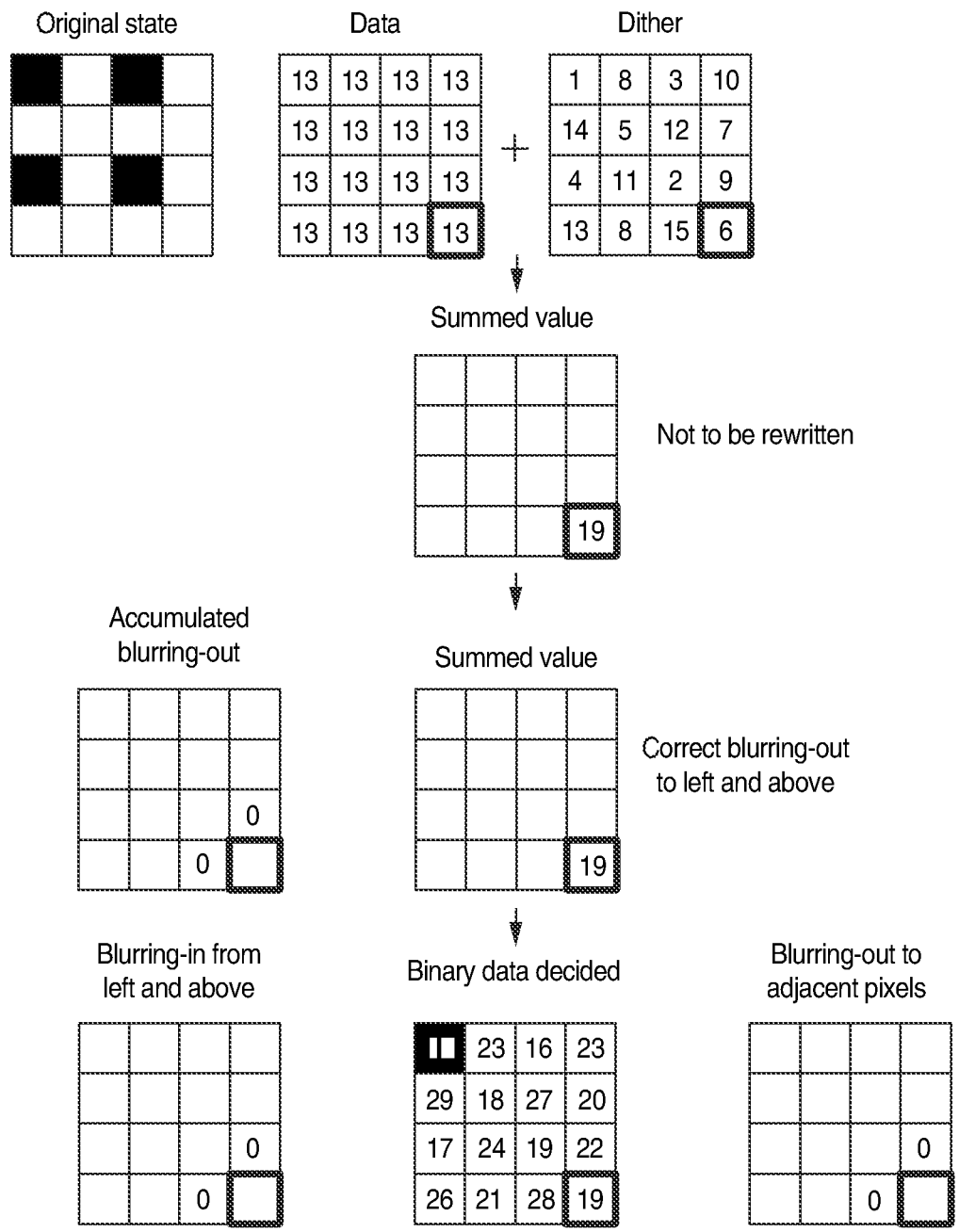
FIG. 60 shows a process executed in the example 3 when a pixel (4, 4) is a target pixel.

FIG. 60 shows processings performed when a pixel (4, 4) is the target pixel. The summed value A is acquired as follows:

$$A(4,4)=P(4,4)+M(4,4)=13+6=19$$

As A (4, 4)≥Th, the target pixel would be converted to a white pixel unless any correction processing is performed. In other words, the target pixel would not be rewritten (S101: NO). The correction in step S104 is performed as follows.

$$A(4,4)=A(4,4)+U(4,4)+L(4,4)=19+0+0=19$$

The blurring-in condition is not satisfied for the pixels above and on the left (S105: NO). At this moment, A (4, 4)≥Th, and therefore the pixel (4, 4) would be converted to a white pixel. As the target pixel is not rewritten (S108: NO), the memories 272-275 will not be rewritten.

Figure 61:
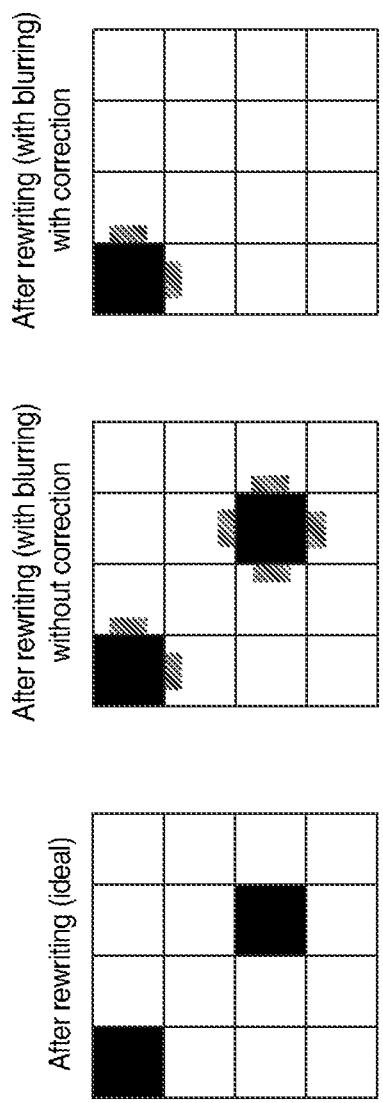
FIGS. 61A, 61B and 61C are views for comparing results obtained with the correction processing and without the correction processing.

FIGS. 61A-61F are figures for comparing the results obtained with the correction processing and without the correction processing. FIG. 61A shows an ideal display image, FIG. 61B shows a display image obtained without the correction processing in accordance with the embodiment of the invention, and FIG. 61C shows a display image obtained with the correction processing in accordance with the embodiment of the invention. The present embodiment enables a color reduction process that takes the influence of blurring into account.

3-5. Other Operation and Example 4

In accordance with the operations (FIG. 9) and the three examples thereof so far described, a gradation value stored in the memory 276 and a dither value stored in the memory 271, with respect to a target pixel, are added to obtain a summed value, the summed value is used to express the target pixel in b-gradation levels, whether or not the gradation value is to be changed is judged, and at least one of the first through third correction processings is performed according to the judgment result. In other words, after judging as to whether the target pixel is to be written, at least one of the first through third correction processings is performed. However, the color reduction process may be performed based on a flow chart other than that shown in FIG. 9. This section will describe operations based on another flow chart and a processing example 4 based on the flow chart.

Figure 62:
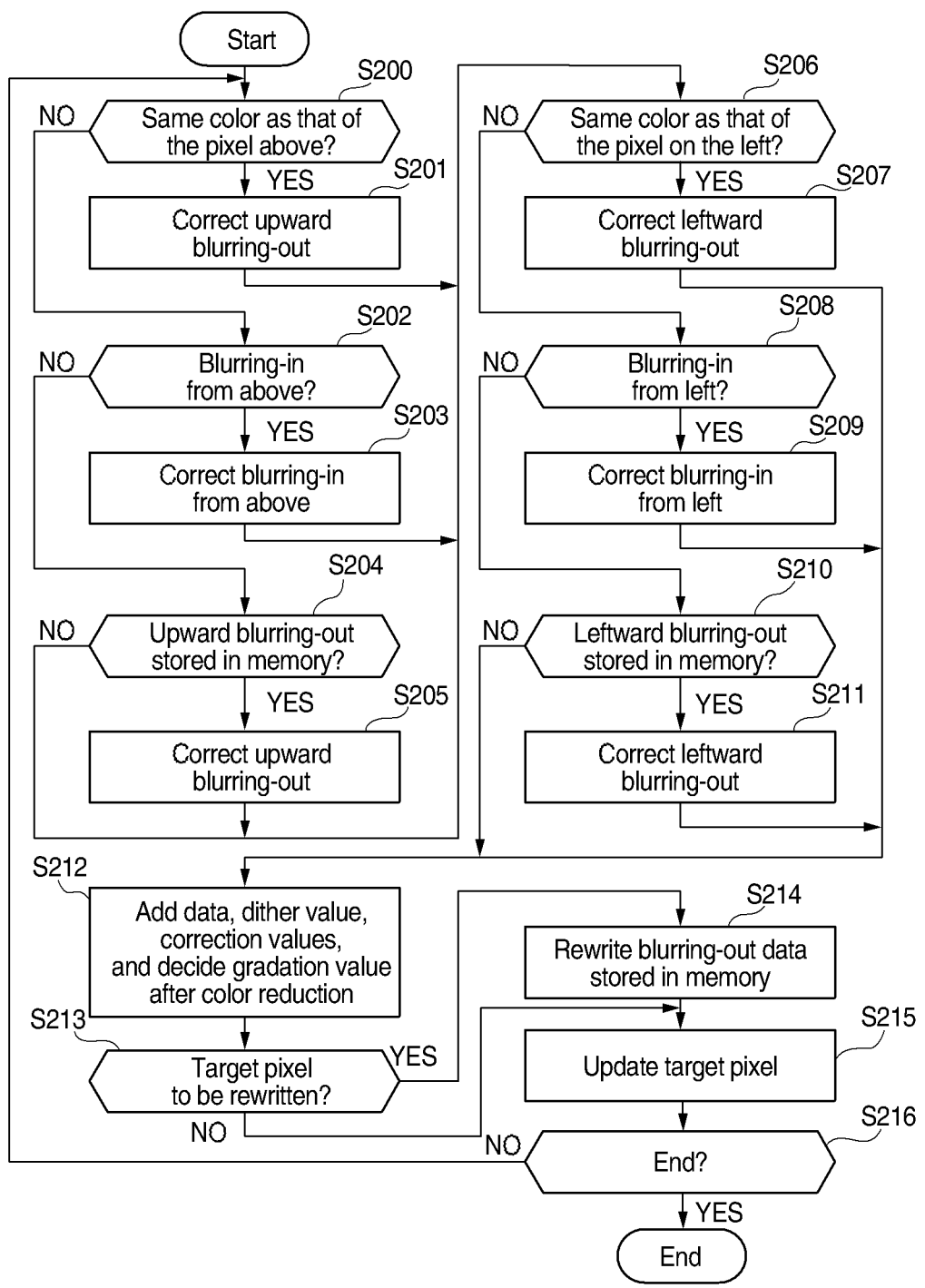
FIG. 62 is a flow chart showing details of another color reduction process.

FIG. 62 shows a flow chart of the other color reduction process in details. A primary difference from the flow chart shown in FIG. 9 is that, after performing at least one of the first through third correction processing, whether a target pixel is to be rewritten is judged. More specifically, first, one of the first through third correction processings is applied in relation with a pixel above (steps S200-S205), then, one of the first through third correction processings is applied in relation with a pixel on the left (steps S206-S211), finally, a gradation value P (j, i), a dither value M (j, i) and correction values obtained in steps S200-S211 are added together, and whether the target pixel is to be rewritten or not is judged. FIG. 62 will be described below while mainly focusing on portions different from FIG. 9, and description of the features that are common with FIG. 9 will be omitted.

In step S200, the controller 20 judges as to whether a target pixel and a pixel above are in the same color. More specifically, the controller 20 judges as to whether or not the gradation (the gradation after the process, scheduled to be rewritten) of the pixel above that has been processed before the target pixel is the same as the gradation (the current gradation) of the target pixel before the process. When they are judged to be in the same color (S200: YES), the controller 20 shifts the process to step S201. When they are judged not to be in the same color (S200: NO), the controller 20 shifts the process to step S202.

In step S201 (an example of the first correction processing), the controller 20 calculates a correction value (a first correction value) of blurring-out to a pixel above with respect to a target pixel. As described above, step S201 is performed when the target pixel is in the same color as that of the pixel above at the time of processing. Therefore, when the color of the target pixel changes, blurring-out to the pixel above would occur. Accordingly, the correction value for the blurring-out to the pixel above is calculated, assuming that the color of the target pixel would change. Accordingly, when a gradation value, a dither value and a correction value are summed up in step S212 later, the summed value is corrected in the direction where rewriting of the target pixel becomes more difficult, taking the influence of blurring-out into account, whereby more proper halftone display can be achieved. When the processing in step S201 is completed, the controller 20 shifts the process to step S206. In other words, when step S201 is performed, step S202-step S205 are skipped.

In step S202, the controller 20 judges as to whether blurring-in from the pixel above to the target pixel is present or not. For example, when the blurring-in from the pixel above to the pixel below D (j, i−1) is not zero, the controller 20 judges that blurring-in is present; and when it is zero, the controller 20 judges that blurring-in is not present. When it is judged that blurring-in is present (S202: YES), the controller 20 shifts the process to step S203. When it is judged that blurring-in is not present (S202: NO), the controller 20 shifts the process to step S204.

In step S203 (an example of the second correction processing), the controller 20 calculates a correction value (a second correction value) for blurring-in from the pixel above with respect to the target pixel. As described above, step S203 is performed when the target pixel is different in color from the pixel above at the time of processing. Therefore, when the color of the target pixel does not change, the target pixel would be influenced by blurring-in from the pixel above. Accordingly, the correction value for the blurring-in from the pixel above is calculated, assuming that the color of the target pixel would not change. Accordingly, when a gradation value, a dither value and a correction value are summed up in step S212 later, the summed value is corrected in the direction wherein rewriting of the target pixel becomes easier, taking the influence of blurring-in into account, whereby more proper halftone display can be achieved. When the processing in step S203 is completed, the controller 20 shifts the process to step S206. In other words, when step S203 is performed, step S204 and step S205 are skipped.

In step S204, the controller 20 judges as to whether blurring-out from the target pixel to the pixel above is present or not. For example, when the blurring-out from the target pixel to the pixel above U (j, i) is not zero, the controller 20 judges that blurring-out is present; and when it is zero, the controller 20 judges that blurring-out is not present. When it is judged that blurring-out is present (S204: YES), the controller 20 shifts the process to step S205. When it is judged that blurring-out is not present (S204: NO), the controller 20 shifts the process to step S206.

In step S205 (an example of the third correction processing), the controller 20 calculates a correction value (a third correction value) for blurring-out to the pixel above with respect to the target pixel. As described above, step S205 is performed when the target pixel is different in color from the pixel above at the time of processing, and blurring-in from the pixel above does not preset. Therefore, when the color of the target pixel does not change, the target pixel would influence the pixel above with blurring-out. Accordingly, the correction value for the blurring-out to the pixel above is calculated, assuming that the color of the target pixel would not change. Accordingly, when a gradation value, a dither value and a correction value are summed up in step S212 later, the summed value is corrected in the direction where rewriting of the target pixel becomes easier, taking the influence of blurring-out into account, whereby more proper halftone display can be achieved. When the processing in step S205 is completed, the controller 20 shifts the process to step S206.

In steps S206-S211, processings similar to those in steps S200-S205 are performed, based on judgment made in relation with a pixel on the left. The processings in steps S206-S211 are substantially the same as those performed in steps S200-S205 except that presence or absence of blurring-in or blurring-out is judged in relation with a pixel on the left, and therefore, their detailed description will be omitted. When step S207, step S208 or step S210 is finished, or it is judged in step S210 that blurring-out to a pixel on the left is not present (step S210: NO), the controller 20 shifts the process to step S212.

In step S212, the controller 20 adds the gradation value P (j, i) indicated by the data for the pixel (j, i) that is a target pixel, and a dither value M (j, i) of the dither matrix, and further adds, to the obtained value, the correction values obtained in step S200 through step S211, thereby obtaining a summed value. The controller 20 compares the summed value with a threshold value to decide a gradation value after color reduction. When the summed value is equal to the threshold value or greater, the target pixel is decided to be set to a white pixel.

When the summed value after correction is less than the threshold value, the target pixel is decided to be set to a black pixel. Processings to be performed in steps S213-S216 thereafter are the same as those performed in steps S108-S111 in FIG. 9, and therefore their description will be omitted.

According to the process flow chart in FIG. 62, correction vales are added based on judgment as to whether not the target pixel is in the same color as that of each of the adjacent pixels at the time of starting the process, and judgment made when they are not in the same color as to whether or not blurring-in to the target pixel or blurring-out from the target pixel is present, and thereafter the gradation value, the dither value and the correction values are added to decide a gradation value after color reduction. By this operation, the addition of the gradation value and the dither value is performed only once, and it is sufficient to perform only one of the first through third correction processings, whereby the amount of processing by the controller can be reduced. The operations in FIG. 62 will be described below, using a specific example.

FIGS. 63A-63H show conditions of an example 4. FIG. 63A shows a state before rewriting. In the example 4, an image in the state shown in FIG. 63A is rewritten to an image with its entire pixels being in halftone (FIG. 63B). FIG. 63C shows a dither matrix. FIG. 63D indicates binary data after the process, but shows colors with the present gradations (as initial values) as they are presently prior to the process. FIGS. 63E-63H show data stored in the memories 272-275 before starting the process.

FIGS. 64A-64H show states in which the pixel (1, 1), the pixel (2, 1), the pixel (3, 1), the pixel (4, 1) and the pixel (1, 2) have been processed based on the flow chart in FIG. 62. Binary data and gradations after the process have been decided in a manner shown in FIG. 64D. The pixel (1, 1) has been rewritten from white to black, the pixel (2, 1) remains to be white, the pixel (3, 1) has been rewritten from white to black, the pixel (4, 1) has been rewritten from black to white, and the pixel (1, 2) has been rewritten from black to white. As a result, the data stored in the memories 272-275 have been rewritten in a manner shown in FIGS. 64E-64H.

The process for the pixel (2, 2) executed in this state will be described based on the flow chart shown in FIG. 62. First, the relation of the pixel (2, 2) with respect to the pixel above (2, 1) is judged. Currently, the target pixel (2, 2) is a black pixel, which is different in color from the pixel above (2, 1) that is white (S200: NO). As the pixel above (2, 1) has not been rewritten in the process in the current frame, and no accumulated downward blurring-out is present (D (2, 1)=0). Therefore, the target pixel (2, 2) does not have blurring-in from above (S202: NO). On the other hand, the target pixel (2, 2) has accumulated upward blurring-out (U (2, 2)=2) (S204: YES). Therefore, in step S205, the upward blurring-out "+2" is calculated as a correction value.

Then, the relation of the pixel (2, 2) with the pixel on the left (1, 2) is judged. Currently, the target pixel (2, 2) is a black pixel, which is different in color from the pixel above (2, 1) that is white (S206: NO). As the pixel on the left (1, 2) has been rewritten from black to white by the process in the current frame, and therefore has blurring-out to the right is present (R (1, 2)=−2). Therefore, the target pixel (2, 2) has blurring-in from the left (S208: YES). Therefore, in step S209, the blurring-out from the left "−2" is calculated as a correction value.

As the process proceeds to step S212, the gradation value, the dither value and the correction value are added as follows.

$$P(2,2)+M(2,2)+2-2=8+5+2-2=13$$

As the summed value is less than the threshold value Th=16, the pixel is maintained to be black. As the target pixel is not rewritten (S213: NO), the memories 272-275 will not be rewritten.

Similarly, as the pixel (3, 2) is processed, the gradation value, the dither value, and the correction values are added to obtain a summed value that is 22, such that the pixel (3, 2) is maintained as being white, and the memories 272-275 will not be rewritten. FIGS. 65A-65H show states of the memories and the like at the time of completion of the process on the pixel (3, 2).

The process on the pixel (4, 2) executed in this state will be described based on the flow chart shown in FIG. 62. First, the relation of the pixel (4, 2) with respect to the pixel above (4, 1) is judged. Currently, the target pixel (4, 2) is in white, which is the same color as that of the pixel above (4, 1) that is white (S200: YES). Accordingly, in step S201, upward blurring-out "+2" that occurs when the target pixel is rewritten to black is calculated as a correction value.

Then, the relation of the pixel (4, 2) with the pixel on the left (3, 2) is judged. Currently, the target pixel (4, 2) is in white, which is the same color as that of the pixel on the left (3, 2) that is white (S206: YES). Accordingly, in step S207, leftward blurring-out "+2" that occurs when the target pixel is rewritten to black is calculated as a correction value.

As the process proceeds to step S212, the gradation value, the dither value and the correction values are added as follows:

$$P(4,2)+M(4,2)+2+2=8+7+2+2=19$$

As the summed value is greater that the threshold value Th=16, the pixel is maintained to be white. As the target pixel is not rewritten (S213: NO), the memories 272-275 will not be rewritten. As the process will be similarly executed for the pixel (1, 3) and the remaining pixels, their description is omitted.

It is noted that, when zeros are stored in the memories 272-275 as correction values for the entire pixels, steps S204, S205, S210 and S211 (steps for the third correction processing) can be omitted. An example of such a case may be where the display is reset through displaying white or black at the entire pixels.

3-6. Summary of Operations

Figure 67A:
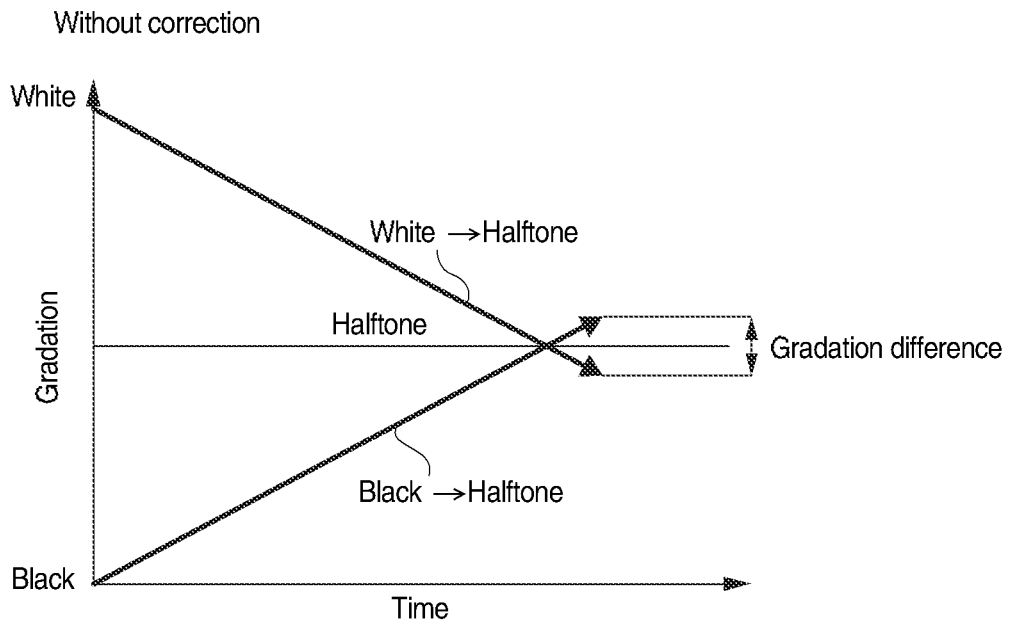
FIGS. 67A and 67B are graphs for describing the correction processing.
Figure 67B:
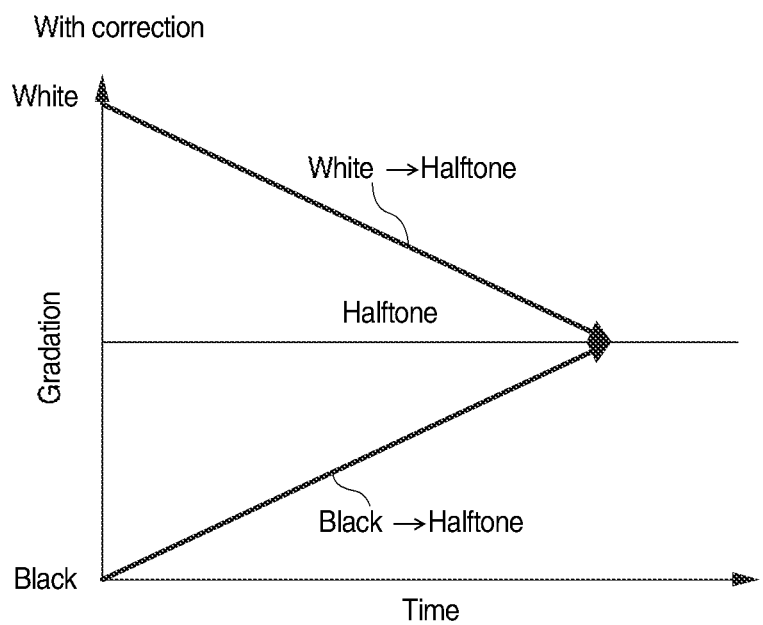

FIGS. 67A and 67B are graphs for describing the effect of the correction processing for the electronic apparatus 1. The vertical axis of the graph shows gradation levels, and the horizontal axis shows time. The graphs show characteristics appearing when a black image and a white image are rewritten into a specified halftone image. As described above, when the image is rewritten to a specified gradation without using the correction process of the present embodiment, the gradation actually displayed at the display section 10 becomes different from the specified gradation depending on the gradation of the image before rewriting. More specifically, when a black image is rewritten to a halftone gradation, the image would become more whitish than the ideal state; and when a white image is rewritten to the halftone gradation, the image would become more blackish than the ideal state, which causes a gradation difference between the two cases of rewriting from the black image and rewriting from the white image. In other words, even when data with the same gradation are used, gradation differences would occur depending on gradations displayed before rewriting. In contrast, when the correction process is performed, the color reduction process is performed with blurring-out to adjacent pixels and blurring-in from adjacent pixels being taken into account, such that gradation differences depending on gradations before rewriting can be reduced. In other words, the influence of gradation blurring-out at pixels adjacent to a rewritten pixel can be reduced.

Figure 68A:
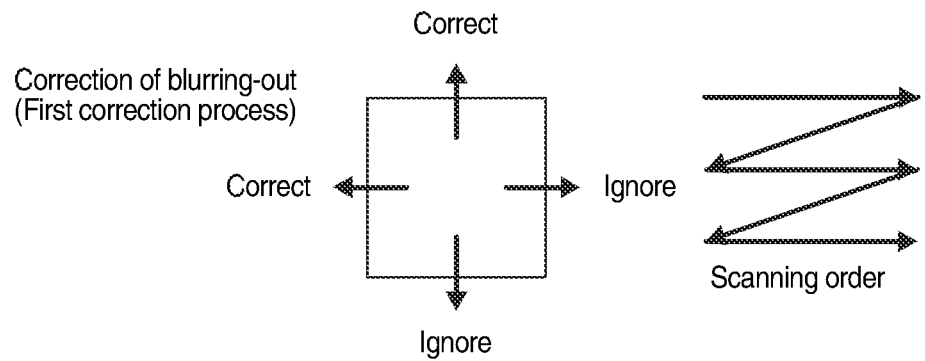
FIGS. 68A-68C are figures for describing the outline of the correction processing.
Figure 68B:
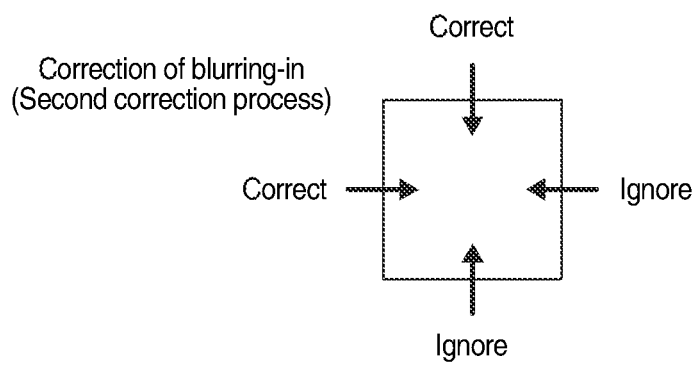
Figure 68C:
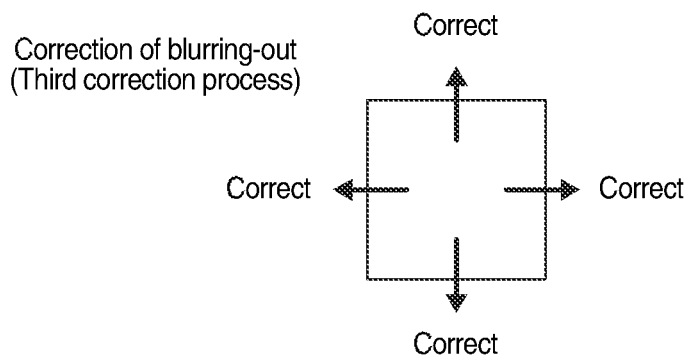

FIGS. 68A-68C are figures for describing the summary of the correction processing in accordance with the present embodiment. The correction processing in accordance with the present embodiment can be generally divided into three processings, i.e., a first correction processing, a second correction processing and a third correction processing. Among the three correction processings, the first correction processing (FIG. 68A) and the second correction processing (FIG. 68B) are correction processings to be performed in a stage prior to color reduction to b-gradation levels. The first correction processing is a correction processing for correcting blurring-out from a target pixel to adjacent pixels, and the second correction processing is a correction processing for correcting blurring-in from the adjacent pixels to the target pixel. Although four pixels are present adjacent to the target pixel, blurring-out and blurring-in present in relation with those of the pixels that are processed earlier in the scanning order (pixels locates in the upstream side of the scanning direction) are corrected, and blurring-out and blurring-in present in relation with those of the pixels that are processed later in the scanning order (pixels locates in the downstream side of the scanning direction) are not corrected. For example, when pixels are scanned from left to right and top to down, blurring-out from the target pixel is corrected with respect to the pixels above and on the left, but not corrected with respect to the pixels below and on the right. On the other hand, the third correction processing (FIG. 68C) is a processing performed after gradation values reduced in color to b-gradation levels have been decided. In this case, correction values for blurring-out in relation with the adjacent pixels in all direction are written to the memories 272-275.

4. Other Embodiments

The invention is not limited to the embodiments described above, and can be implemented in many other embodiments. Some of the modified examples will be described below. Two or more of the following modified examples may be used in combination.

4-1. Modified Example 1

The correction processing in step S104 (the third correction processing) may be omitted. The third correction processing is used to correct blurring-out that has occurred when the target pixel was rewritten and accumulated up to the current moment. However, accumulated blurring-out may not have to be considered. In this case, the controller 20 may not have to have the memories 272-275 and the corresponding functional configuration. Also, in this case, when it is judged to be NO in step S101, the process shifts to step S105. Newly occurring blurring can be corrected by the first correction processing and the second correction processing, even without the third correction processing, whereby the influence of blurring on the gradations can be reduced, compared to the case where the correction is not performed at all.

4-2. Modified Example 2

In the embodiment described above, the correction process (the second correction processing) in step S106 is performed with data stored in the memory 273 and the memory 275. However, correction of blurring-in may be performed without using data stored in the memory 273 and the memory 275. In this case, the second correction processing may be performed after gradation values have been decided according to the color reduction process. For example, after the correction processing (the first correction processing) in step S103 has been performed, gradation values after color reduction may be decided (step S107). Based on the gradation values after color reduction, it may be judged as to whether or not the target pixel is to be rewritten (S108). When it is judged that the target pixel is to be rewritten (S108: YES), the controller 20 may judge as to whether or not the blurring-out condition is satisfied with respect to the pixels on the right and below. When it is judged that the blurring-out condition is satisfied, the controller 20 may add correction values to the gradation values of the pixels on the right and below stored in the VRAM 40. For example, in the example shown in FIG. 10, when blurring-out occurs at pixels below and on the right after binary data have been decided, the correction value (Cb=+2) may be added to each data of the pixel (2, 1) and the pixel (1, 2) at the VRAM 40 (data after the addition is 8+2=10), instead of writing the correction values to the memory 273 and the memory 275.

4-3. Modified Example 3

The blurring-out condition and the blurring-in condition described in the embodiment are only examples. The blurring-out condition and the blurring-in condition are not limited to those described in the embodiment. For example, as the blurring-out condition, it is possible to use a condition in which a target pixel and an adjacent pixel after color reduction have different gradation values, and the adjacent pixel has not been rewritten.

4-4. Modified Example 5

When the gradation value $P(j, i)$ indicated by data is 0 or 15 (in other words, an instruction to display black or white is issued), the first through the third correction processings may not be performed. By so doing, it is possible to control shortcoming in which, for example, when a display is switched based on data with all pixels being in black, a part of the pixels would display white due to the correction. Also, it is possible to control shortcoming in which, for example, when a display is switched based on data with all pixels being in white, a part of the pixels would display black due to the correction.

4-5. Other Modified Examples

The electronic apparatus 1 is not limited to an electronic book reader. The electronic apparatus 1 may be a personal computer, a PDA (Personal Digital Assistant), a cellular phone, a smartphone, a tablet terminal, or a portable game console.

The equivalent circuit of pixels 14 is not limited to the one described in the embodiment. Switching elements and capacitance elements may be combined in any way, as long as a controlled voltage can be applied between the pixel electrodes 114 and the common electrode 131. Also, the method of driving the pixels may be a bipolar drive method in which electrophoretic elements 143 applied with voltages of different polarities are present in each single frame or a unipolar drive method in which voltages with a single polarity are applied to all electrophoretic elements 143 in each single frame.

The structure of the pixel 14 is not limited to the structure described in the embodiment. For example, the polarities of charged particles are not limited to those described in the embodiment. Black electrophoretic particles may be negatively charged, and white electrophoretic particles may be positively charged. In this case, the polarities of voltages to be applied to the pixels become inversed to the polarities described in the embodiment. Also, the display elements are not limited to electrophoretic type display devices using microcapsules. Other display elements, such as, liquid crystal elements, organic EL (Electro Luminescence) elements or the like may be used. In the embodiment, the display section 10 has the display function of displaying monochrome two gradation levels, but may be provided with a display function of displaying monochrome three or more gradation levels, or a color display function.

The structure of the controller 20 is not limited to the structure described with reference to FIG. 5. A part of the functions described with reference to FIG. 5 may be omitted. Also, a part of the structure, such as, the storage device 27 and the like, may be provided as an external device with respect to the controller 20.

The entire disclosure of Japanese Patent Application No. 2011-148559, filed Jul. 4, 2011 is expressly incorporated by reference herein.

What is claimed is:

1. A control device comprising:
    a first storage device that stores a dither matrix of two-dimensionally arranged dither values to be used for a color reduction process for converting data of a-gradation levels to data of b-gradation levels (a>b);
    a second storage device that stores data of the a-gradation levels indicative of gradation values expressed in the a-gradation levels for each of a plurality of two-dimensionally arranged pixels;
    a third storage device that stores a correction value for blurring-out for each of the plurality of pixels to an adjacent pixel;
    a first correction device that performs a first correction processing of calculating a first correction value for correcting gradation blurring-out from a target pixel that is a pixel specified in a predetermined order among the plurality of pixels to an adjacent pixel;
    a second correction device that performs a second correction processing of calculating a second correction value for correcting gradation blurring-in from the adjacent pixel to the target pixel;
    a third correction device that performs a third correction processing of calculating a third correction value indicative of gradation blurring-out from the target pixel to the adjacent pixel from among correction values stored in the third storage device;
    a gradation value deciding device that decides a gradation value of the target pixel expressed in the b-gradation levels by using a value obtained by adding a corresponding one of the dither values stored in the first storage device, a corresponding one of the gradation values stored in the second storage device and at least one of the first correction value and the second correction value;
    a write device that writes the correction value for gradation blurring-out from the target pixel to the adjacent pixel to the third storage device, when the gradation value decided by the gradation value deciding device indicates that the gradation value of the target pixel expressed in the b-gradation levels is to be changed; and
    an output device that outputs, based on the gradation value decided by the gradation value deciding device, a signal for controlling a gradation value of a corresponding one of display elements corresponding to the plurality of pixels of a display device.

2. A control device according to claim 1, wherein one of the first correction processing by the first correction device, the second correction processing by the second correction device and the third correction processing by the third correction device is executed for the target pixel.

3. A control device according to claim 1, wherein
    the first correction device performs the first correction processing when the gradation of an adjacent pixel processed prior to the target pixel is the same as the gradation of the target pixel prior to the process,
    the second correction device performs the second correction processing when the gradation of the adjacent pixel is different from the gradation of the target pixel prior to the process, and the correction value for gradation blurring-out from the adjacent pixel to the target pixel stored in the third storage device is not 0, and
    the third correction device performs the third correction processing when the gradation of the adjacent pixel is different from the gradation of the target pixel prior to the process, the second correction processing is not performed, and the correction value for gradation blurring-out from the target pixel to the adjacent pixel stored in the third storage device is not 0.

* * * * *